US011818566B2

(12) United States Patent
Mohamed et al.

(10) Patent No.: US 11,818,566 B2
(45) Date of Patent: *Nov. 14, 2023

(54) UNIFIED AUTHENTICATION FOR INTEGRATED SMALL CELL AND WI-FI NETWORKS

(71) Applicant: IPLA HOLDINGS INC., New York, NY (US)

(72) Inventors: Ahmed Mohamed, Miramar, FL (US); Michael F. Starsinic, Newtown, PA (US); Vinod Kumar Choyi, Conshohocken, PA (US); Qing Li, Princeton Junction, NJ (US)

(73) Assignee: IPLA HOLDINGS INC., New York, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 17/321,913

(22) Filed: May 17, 2021

(65) Prior Publication Data
US 2021/0321257 A1    Oct. 14, 2021

Related U.S. Application Data

(63) Continuation of application No. 15/579,703, filed as application No. PCT/US2016/035757 on Jun. 3, 2016, now Pat. No. 11,032,706.
(Continued)

(51) Int. Cl.
*H04W 12/08* (2021.01)
*H04L 9/40* (2022.01)
(Continued)

(52) U.S. Cl.
CPC ......... *H04W 12/08* (2013.01); *H04L 63/0892* (2013.01); *H04W 12/04* (2013.01);
(Continued)

(58) Field of Classification Search
None
See application file for complete search history.

(56) References Cited

U.S. PATENT DOCUMENTS

| 8,332,912 B2 | 12/2012 | Naeslund et al. |
| 9,392,502 B2 | 7/2016 | Suh et al. |

(Continued)

FOREIGN PATENT DOCUMENTS

| CN | 101610507 A | 12/2009 |
| CN | 102075938 A | 5/2011 |

(Continued)

OTHER PUBLICATIONS

Tomici (Tomici et al., "Integrated small cell and Wi-Fi networks", 2015 IEEE Wireless Communications and Networking Conference (WCNC), Mar. 2015) (Year: 2015).*

(Continued)

*Primary Examiner* — Piotr Poltorak
(74) *Attorney, Agent, or Firm* — CHIP LAW GROUP

(57) ABSTRACT

Multi-RAT UEs currently have 2 independent paths to authenticate with HSS (e.g., via the MME or the 3GPP AAA Server causing repeated authentication messages to HSS). The use of one unified authentication path between the UE and HSS for Small Cell and Wi-Fi authentication is described. First, a new 3GPP EPC-TWAN interworking architecture has the MME manage all the authentication requests from multi-RAT UEs. Second, new unified authentication procedures are added, which allow the ISWN-based multi-RAT UE to be authenticated directly with the HSS, irrespective of its current access network (TWAN or HeNB). Third, new fast re-authentication procedures for Inter-RAT handover scenarios are done. Finally, the needed extensions to the various standard protocol messages to execute the authentication procedures are described.

19 Claims, 30 Drawing Sheets

Related U.S. Application Data

(60) Provisional application No. 62/171,497, filed on Jun. 5, 2015.

(51) Int. Cl.

| | | |
|---|---|---|
| *H04W 12/04* | (2021.01) | |
| *H04W 36/14* | (2009.01) | |
| *H04W 36/00* | (2009.01) | |
| *H04W 12/062* | (2021.01) | |
| *H04W 12/06* | (2021.01) | |
| *H04W 76/15* | (2018.01) | |
| *H04W 36/08* | (2009.01) | |
| *H04W 48/02* | (2009.01) | |
| *H04W 88/06* | (2009.01) | |
| *H04W 84/04* | (2009.01) | |
| *H04W 84/12* | (2009.01) | |
| *H04W 88/02* | (2009.01) | |
| *H04W 88/08* | (2009.01) | |

(52) U.S. Cl.
CPC ......... *H04W 12/06* (2013.01); *H04W 12/062* (2021.01); *H04W 36/0038* (2013.01); *H04W 36/08* (2013.01); *H04W 36/14* (2013.01); *H04W 48/02* (2013.01); *H04W 76/15* (2018.02); *H04W 84/042* (2013.01); *H04W 84/12* (2013.01); *H04W 88/02* (2013.01); *H04W 88/06* (2013.01); *H04W 88/08* (2013.01)

(56) References Cited

U.S. PATENT DOCUMENTS

| | | |
|---|---|---|
| 2003/0154446 A1 | 8/2003 | Constant et al. |
| 2004/0203346 A1 | 10/2004 | Myhre et al. |
| 2006/0128362 A1 | 6/2006 | Bae et al. |
| 2007/0101406 A1* | 5/2007 | Zavalkovsky ........ H04L 9/3273 726/4 |
| 2007/0249352 A1 | 10/2007 | Song et al. |
| 2008/0101400 A1 | 5/2008 | Auterinen |
| 2008/0192925 A1 | 8/2008 | Sachs et al. |
| 2008/0205345 A1 | 8/2008 | Sachs et al. |
| 2010/0323700 A1 | 12/2010 | Bachmann et al. |
| 2011/0223885 A1 | 9/2011 | Salkintzis et al. |
| 2012/0005731 A1 | 1/2012 | Lei et al. |
| 2013/0064221 A1 | 3/2013 | Pampu et al. |
| 2013/0077482 A1* | 3/2013 | Krishna ............ H04W 36/0011 370/230 |
| 2013/0083661 A1 | 4/2013 | Gupta et al. |
| 2013/0095789 A1* | 4/2013 | Keevill ............... H04W 12/062 455/411 |
| 2013/0198817 A1 | 8/2013 | Haddad et al. |
| 2013/0298209 A1 | 11/2013 | Targali et al. |
| 2013/0324170 A1 | 12/2013 | Watfa |
| 2014/0029513 A1 | 1/2014 | Takahashi et al. |
| 2014/0051393 A1 | 2/2014 | Mildh et al. |
| 2014/0093071 A1 | 4/2014 | Qiang |
| 2014/0204832 A1 | 7/2014 | Van et al. |
| 2015/0099488 A1 | 4/2015 | Mildh et al. |
| 2015/0103780 A1 | 4/2015 | Kaippallimalil et al. |
| 2015/0173000 A1* | 6/2015 | Basilier ............... H04W 12/062 370/328 |
| 2015/0208309 A1 | 7/2015 | Taneja et al. |
| 2015/0271668 A1 | 9/2015 | Sun et al. |
| 2016/0156748 A1* | 6/2016 | Yang ....................... H04L 47/24 370/328 |
| 2016/0174123 A1 | 6/2016 | Hedberg et al. |
| 2016/0262020 A1 | 9/2016 | Zalzalah et al. |
| 2017/0223538 A1 | 8/2017 | Hahn et al. |
| 2017/0230826 A1* | 8/2017 | Mestanov ............ H04L 9/0838 |
| 2017/0289883 A1 | 10/2017 | Kiss et al. |
| 2018/0184297 A1 | 6/2018 | Mohamed et al. |

FOREIGN PATENT DOCUMENTS

| | | | |
|---|---|---|---|
| CN | 102238544 A | | 11/2011 |
| CN | 103402201 A | | 11/2013 |
| CN | 103828299 A | | 5/2014 |
| GB | 2495550 | * | 10/2011 |
| KR | 10-0755394 B1 | | 9/2007 |
| KR | 10-2009-0004896 | | 1/2009 |
| WO | 2007/102702 A2 | | 9/2007 |
| WO | 2015/200326 | | 12/2015 |

OTHER PUBLICATIONS

Orlandi et al., "Improving the Customer Experience for Heterogeneous Wireless Access", Bell Labs Technical Journal 15(4), 23-44 (2011) © 2011 Alcatel-Lucent. • DOI: 10.1002/bltj.20470, (Year: 2011).*

Dhawan et al., "Macro and Small Cell/Wi-Fi Networks: An Analysis of Deployment Options as the Solution for the Mobile Data Explosion," Bell Labs Technical Journal 18(1), 59-79 (2013) © 2013 Alcatel-Lucent. • DOI: 10.1002/bltj.21593. (Year: 2013).*

3GPP TSG-RAN WG2#90 R2-152775, "WLAN Authentication and Security Aspects of LTE/WLAN Aggregation", May 2015, 7 pages.

3rd Generation Partnership Project; 3GPP TS 23.003, V12.4.1, Technical Specification Group Core Network and Terminals; Numbering, Addressing and Identification (release 12), Oct. 2014, 90 pages.

3rd Generation Partnership Project; 3GPP TS 23.401, V12.4.0, Technical Specification Group Services and System Aspects; General Packet Radio Service (GPRS) Enhancements for Evolved Universal Terrestrial Radio Access Network (E-UTRAN) Access (Release 12), Mar. 2014, 302 pages.

3rd Generation Partnership Project; 3GPP TS 23.402, V12.4.0, Technical Specification Group Services and System Aspects; Architecture Enhancements for non-3GPP Accesses (release 12), Mar. 2014, 288 pages.

3rd Generation Partnership Project; 3GPP TS 24.301, V12.0.0, Technical Specification Group Core Network and Terminals; Non-Access-Stratum (NAS) Protocol for Evolved Packet System (EPS); Stage 3 (release 12), Mar. 2013, 345 pages.

3rd Generation Partnership Project; 3GPP TS 29.272, V12.6.0, Technical Specification Group Core Network and Terminals; Evolved Packet System (EPS); Mobility Management Entity (MME) and Serving GPRS Support Node (SGSN) Related Interfaces Based on Diameter Protocol (release 12), Sep. 2014, 134 pages.

3rd Generation Partnership Project; 3GPP TS 33.102, V12.1.0, Technical Specification Group Services and System Aspects; 3G Security; Security Architecture (release 12), Jun. 2014, 76 pages.

3rd Generation Partnership Project; 3GPP TS 33.401, V12.12.0, Technical Specification Group Services and System Aspects; 3GPP System Architecture Evolution (SAE); Security Architecture (release 12), Sep. 2014, 129 pages.

Chris Johnson, "RRC Connection Establishment", http://lte-bullets.com/LTE%20in%20Bullets%20%20RRC%20Establishment.pdf, retrieved from the Internet on Sep. 12, 2018, 4 pages.

IEEE Standards 802.11—2012, "IEEE Standard for Information Technology—Telecommunications and Information Exchange Between Systems—Local and Metropolitan area Networks—Specific requirements—Part 11: Wireless LAN Medium Access Control (MAC) and Physical Layer (PHY) Specifications", Mar. 29, 2012, 2793 pages.

IETF RFC 3748, "Extensible Authentication Protocol (EAP)", Jun. 2004, 68 pages.

IETF RFC 4072, "Diameter Extensible Authentication Protocol (EAP) Application", Aug. 2005, 33 pages.

IETF RFC 4187, Extensible Authentication Protocol Method for 3rd Generation Authentication and Key Agreement (EAP-AKA), Jan. 2006, 80 pages.

IETF RFC 4282, "The Network Access Identifier", Dec. 2005, 17 pages.

IETF RFC 5448, Improved Extensible Authentication Protocol Method for 3rd Generation Authentication and Key Agreement (EAP-AKA), May 2009, 29 pages.

(56) References Cited

OTHER PUBLICATIONS

IETF RFC 5996, "Internet Key Exchange Protocol Version 2 (IKEv2)", Sep. 2010, 139 pages.
IETF RFC 6696, "EAP Extensions for the EAP Re-authentication Protocol (ERP)", Jul. 2012, 48 pages.
Kazem Sohraby and Mehmet Ulema, "Integrated Services and Integration Issues in Wireless Networks", IEEE Communications Magazine, DOI: 10.1109/MCOM. 1996.536555 (Year: 1996).
Kwon et al., Consideration of UMTS-WLAN Seamless Handover, Seventh IEEE International Symposium on Multimedia (ISM'05), IEEE, © 2005, 6pgs.
RFC7458, Valmikam and Koodli, "Extensible Authentication Protocol (EAP) Attributes for Wi-Fi Integration with the Evolved Packet Core", IPCQM000240768D (Year: 2015).
Shi et al., "IEEE802.11 Roaming and Authentication in Wireless LAN/Cellular Mobile Networks", IEEE Wireless Communications, 1536-1284/04, 2004.
Targali et al., "ORTA—Seamless Authentication and Mobility Across Heterogeneous Networks using Federated Identity Systems", IEEE ICC Workshops, Jun. 2013, 6 pages.
Third Generation Partnership Project (3GPP), 3GPP 36.331, V12.1.0, Technical Specification Group Radio Access Network; Evolved Universal Terrestrial Radio Access (E-UTRA); Radio Resource Control (RRC); Protocol Specification (Release 12), Mar. 2014, 356 pages.
Third Generation Partnership Project (3GPP), 3GPP TS 24.302, V12.6.0, Technical Specification Group Core Network and Terminals; Access to the 3GPP Evolved Packet Core (EPC) via non-3GPP access networks; Stage 3 (Release 12), Sep. 2014, 98 pages.
Third Generation Partnership Project (3GPP), 3GPP TS 29.212, V12.4.0, Technical Specification Group Core Network and Terminals; Policy and Charging Control (PCC); Reference points (Release 12), Mar. 2014, 220 pages.
Third Generation Partnership Project (3GPP), 3GPP TS 29.273, V13.5.0, Technical Specification Group Core Network and Terminals; Evolved Packet System (EPS); 3GPP EPS AAA interfaces (Release 13), Sep. 2016, 172 pages.
Third Generation Partnership Project (3GPP), 3GPP TS 33.203, V12.7.0, Technical Specification Group Services and System Aspects; 3G Security; Access Security for IP-based services (Release 12), Sep. 2014.
Third Generation Partnership Project (3GPP), 3GPP TS 36.413, V12.1.0, Technical Specification Group Radio Access Network; Evolved Universal Terrestrial Radio Access Network (E-UTRAN); S1 Application Protocol (S1AP) (Release 12), Mar. 2014, 285 pages.
Third Generation Partnership Project (3GPP); 3GPP TS 33.402, V12.4.0, Technical Specification Group Services and System Aspects; 3GPP System Architecture Evolution (SAE); Security aspects of non-3GPP accesses (Release 12), Sep. 2014, 56 pages.
Wikiepedia, "EnodeB", found aten.wikipedia.org/wiki/ENodeB; author unknown, Apr. 2015.

\* cited by examiner

UNIFIED AUTHENTICATION FOR INTEGRATED SMALL CELL AND WI-FI NETWORKS

CROSS REFERENCE TO RELATED APPLICATIONS

This Application is a continuation of U.S. patent application Ser. No. 15/579,703 filed Dec. 5, 2017 which is a National Stage Application filed under 35 U.S.C. § 371 of International Application No. PCT/US2016/035757 filed Jun. 3, 2016, which claims benefit of U.S. Provisional Patent Application No. 62/171,497, filed Jun. 5, 2015, the disclosures of which are hereby incorporated by reference as if set forth in their entirety.

BACKGROUND

Recently, Mobile Network Operators (MNOs) have shown much interest in deploying Integrated Small Cell and Wi-Fi (ISW) networks to accommodate the widespread increase in wireless data usage. More specifically, the ISW networks leverage the deployment of long term evolution (LTE) small cells in the licensed spectrum along with Wireless Local Area Network (WLAN) Access Points (APs) in the unlicensed spectrum. The ISW topic has been addressed by standardization, academic, and industrial bodies such as 3rd Generation Partnership Project (3GPP), Small Cell Forum (SCF), and Wireless Broadband Alliance (WBA). Such huge interest will drive development of a variety of network architectures, subscriber service options, and policy management mechanisms to the ISW networks.

In 3GPP TS 23.402 a 3GPP technical specification for core-network (CN)-based interworking between the Evolved Packet Core (EPC) and non-3GPP networks (e.g., WLAN) has been introduced. The 3GPP TS 23.402 document provides the complete architecture, interfaces, access, and handover procedures for the interworking between Trusted Wide Area Network (TWAN) and 3GPP Evolved Packet Core (EPC). FIG. 1 shows the network architecture for TWAN interworking with the 3GPP EPC network. As shown, the TWAN accesses the Packet Data Network (PDN) GW via the S2a interface. Therefore, the developed 3GPP EPC-WLAN interworking architecture forces the inter-system handover Long Term Evolution (LTE) to Wi-Fi and vice versa) to happen at the Packet Data Network Gateway (P-GW), which may cause a huge burden on the Mobile Core Network (MCN), especially with the expected large number of small cell deployment.

Since a fundamental architecture principle of the EPC is to handle the data plane and control plane separately (i.e. MME/S-GW), Mobility Management Entity (MME) extensions along with TWAN extensions can provide a logical choice for inter-system mobility management signaling while corresponding S-GW extensions can support inter-system user plane functionality. The Mobility Management Entity (MME) can be extended into a common control plane entity for both LTE and Wi-Fi access, while enabling the S-GW to function as a common user plane gateway for both LTE and Wi-Fi access. The reference points S1a-MME and S1a-U shown in FIG. 2 were previously introduced in the 3GPP EPC-WLAN integrated architecture. The MME 202 is connected to the WLAN AN 204 via the S1a-MME reference point for control plane signaling, and the S1a-U reference point is defined between the WLAN AN 204 and the Serving Gateway S-GW 206 for the user plane. Having such MME/S-GW integration anchor points will lead to more efficient handover procedures.

These extensions can improve performance by enabling execution of inter-system mobility procedures closer to the edge of the network. Latency can be reduced by minimizing the need for signaling procedures deep in the core network, i.e., toward the PDN Gateway (P-GW) 208. This can be especially beneficial when an Mobile Network Operator (MNO) deploys both small cell and Wi-Fi access in a common geographic area. Scalability is also improved by reducing the P-GW 208 processing burden, e.g., by distributing some inter-system mobility functions to the MME 202 and S-GW 206.

A general background on the AKA algorithm is given below including the mutual authentication between the User Equipment (UE) 214 and network along with key generation hierarchies. Then, such generic Authentication and Key Agreement (AKA) algorithm is described with respect to 3GPP (EPS AKA) and WLAN (EAP-AKA') networks.

FIG. 3 depicts the AKA procedure (Clause 6.3 of 3GPP TS 33.102), used for mutual authentication between the UE 214 and the network including MME 202 and Home Subscriber Server (HSS) 210 (Home Environment (HE) or Authentication Centre (AuC) 304). As shown, the MME sends "Authentication data request" to the HSS/AuC. In response, the HSS/AuC generates multiple Authentications Vectors (AVs) and orders them based on sequence number (SQN). An authentication vector consists of: a random number (RAND), an expected response (XRES), a cipher key (CK), an integrity key (IK), and an authentication token (AUTN).

The process of generating AVs is explained in FIG. 4. First, the AuC 304 starts with generating a fresh sequence number, SQN, and an unpredictable challenge, RAND. K is the permanent key stored on the Universal Subscriber Identity Module (USIM) and in the AuC 304. An authentication and key management field (AMF) is included in the authentication token of each authentication vector. The functions f1 and f2 are message authentication functions that generate message authentication code (MAC) and an XRES, respectively. Functions f3, f4, and f5 are key generation functions, which are used to generate the CK, IK, and an anonymity key (AK). AK is an anonymity key used to conceal the sequence number as the latter may expose the identity and location of the user. Finally the authentication token AUTN is formed based on SQN, AK, AMF, and MAC. Each authentication vector is good for only one AKA process between the MME 202 and the UE 214.

Back to FIG. 3, once the AuC/HSS generates the AVs, it sends them to the MME 202. Consequently, the MME 202 starts the mutual authentication process with the UE 214. First, the MME 202 selects the next unused authentication vector from the ordered array of authentication vectors AV and sends a "user authentication request" (RAND, AUTN) message to the UE.

Upon receipt of RAND and AUTN the USIM/UE applies the user authentication procedure shown in FIG. 5. First the USIM computes the AK and retrieves the sequence number SQN. Next, it calculated an expected MAC (XMAC). The USIM authenticates the network by verifying that the received AUTN is the same like the generated one. More specifically, verifying that the generated XMAC is the same like the received MAC, and that the received SQN is in the correct range.

Finally and back to FIG. 3, once the UE 302 authenticates the network it sends its generated response (RES) to the MME 202. Then, the MME 202 compares the received RES with its XRES (generated by and received from HSS). If RES and XRES match, then the MME 202 authenticates the UE 302. That being so, the mutual authentication and the AKA processes between the UE and the network are successfully completed. Finally, the remaining keys at the UE 214 and MME 202, namely, CK and IK, are utilized to derive more keys for ciphering and integrity functions.

For the LTE, the "User Authentication Request" is implemented in the "NAS: Authentication Request". Similarly, the "User Authentication Response" is implemented in the "NAS: Authentication Response". For the WLAN case, the "User Authentication Request" is implemented via the "Diameter-EAP-Answer" and "EAP-Request/AKA'-Challenge" messages. The "User Authentication Response", is implemented using the "EAP-Response/AKA'-Challenge" and "Diameter-EAP-Request".

The security procedures between the UE 214 and EPC network 216 is explained in details in Clause 6 of 3GPP TS 33.401. The security procedure is a fundamental step of the initial attachment procedure (Clause 5.3.2 of 3GPP TS 23.401). This section focuses on the exact authentication-related messages in 3GPP EPC. In particular, this section focuses on Diameter-based messages, exchanged between the MME 202 and HSS 210 over the S6a reference point. The presented messages correspond to the generic "Authentication data request" and "Authentication data response", shown in FIG. 3.

In order for the MME to request authentication vectors for the HSS, it sends the Diameter-based "Authentication-Information-Request (AIR)" command over the S6a reference point, as indicated in Clause 5.2.3 of 3GPP TS 29.272. Some of the relevant Attribute-Value Pairs (AVPs) of the AIR command are shown in Table 1. The UE 302 will be identified using its 'International Mobile Subscriber Identity (IMSI)'. The 'Requested-EUTRAN-Authentication-Info' AVP (Clause 7.3.11 of 3GPP TS 29.272) shall contain the information related to the authentication requests for E-UTRAN, namely, 'Number-Of-Requested-Vectors', 'Immediate-Response-Preferred', and 'Re-synchronization-Info' AVPs. The 'Visited-PLMN-Id' AVP (Clause 7.3.9 of 3GPP TS 29.272), also referred to as Serving Network Identity (SN ID), shall contain the concatenation of Mobile Country Code (MCC) and Mobile Network Code (MNC).

TABLE 1

"Authentication Information Request" message
(Table 5.2.3.1.1/1 of 3GPP TS 29.272)

| Information element name | Mapping to Diameter AVP | Cat. | Description |
| --- | --- | --- | --- |
| IMSI | User-Name (See IETF RFC 3588) | M | This information element shall contain the user IMSI, formatted according to 3GPP TS 23.003, clause 2.2. |
| Requested E-UTRAN Authentication Info (7.3.11, 3GPP TS 29.272) | Requested-EUTRAN-Authentication-Info | C | This information element shall contain the information related to authentication requests for E-UTRAN. |
| Visited PLMN ID (7.3.9, 3GPP TS 29.272) | Visited-PLMN-ID | M | This IE shall contain the MCC and the MNC of the visited PLMN (3GPP TS 23.003). |

In response to the AIR command, the HSS provides the authentication vectors to the MME in the "Authentication-Information-Answer (AIA)" command over the S6a reference point, as indicated in Clause 5.2.3 of 3GPP TS 29.272. Table 2 provides some of the relevant AVPs of the AIA command. The 'Authentication-Info' AVP (Clause 7.3.17 of 3GPP TS 29.272) contains the required authentication vectors for multiple 3GPP RATs, namely, 'E-UTRAN-Vector', 'UTRAN-Vector', and 'GERAN-Vector'. Of special interest is the 'E-UTRAN-Vector' AVP (Clause 7.3.18 of 3GPP TS 29.272), which is an E-UTRAN vector that includes the following authentication information 'Item-Number', 'RAND', 'XRES', 'AUTN', and '$K_{ASME}$'. The $K_{ASME}$ is the Access Security Management Entity key (ASME).

TABLE 2

"Authentication Information Answer" message
(Table 5.2.3.1.1/2 of 3GPP TS 29.272 [4])

| Information element name | Mapping to Diameter AVP | Cat. | Description |
| --- | --- | --- | --- |
| Authentication Info (7.3.17, 3GPP TS 29.272) | Authentication-Info | C | This IE shall contain the Authentication Vectors. |

Non-3GPP access authentication signaling is executed between the UE 214 and HSS 210 through the 3GPP AAA 212 server 212 across the STa reference point (TWAN-AAA Server) and SWx (AAA Server-HSS). First, the UE initiates the Extensible Authentication Protocol (EAP) authentication process towards the TWAN 218, which forwards the EAP messages to the 3GPP AAA Server 212. The 3GPP AAA Server 212 and HSS 210 interact according to the standard AKA procedure shown previously in FIG. 3. The EAP-AKA' security procedure for TWAN's access to the EPC network is explained in details in Clause 6.2 of TS 33.402. The following explains details of the Diameter-based messages between the AAA Server 212 and HSS 210, which map to the generic "Authentication data request" and "Authentication data response", shown previously in FIG. 3.

In order for the 3GPP AAA Server 212 to authenticate a TWAN-connected UE 214, it sends Diameter-based "Authentication Request" message to the HSS 210 over the SWx reference point. Table 3 shows a few AVPs of the "Authentication Request" message, which are of our interest. As shown, the 3GPP AAA Server 212 includes the 'IMSI', 'Number of Authentication Items', 'Access Network Identity (=WLAN)', and 'Access Type (=WLAN)' AVPs.

Access Network Identity (=WLAN)', and 'Access Type (=WLAN)' AVPs.

TABLE 3

"Authentication request" message
(Table 8.1.2.1.1/1 of 3GPP TS 29.273)

| Information element name | Mapping to Diameter AVP | Cat. | Description |
| --- | --- | --- | --- |
| IMSI | User-Name (See IETF RFC 3588) | M | This information element shall contain the user IMSI, formatted according to 3GPP TS 23.003, clause 2.2. |
| Number Authentication Items | SIP-Number-Auth-Items | M | This information element shall indicate the number of authentication vectors requested |
| Access Network Identity | ANID | C | This IE shall contain the access network identifier used for key derivation at the HSS. (See 3GPP TS 24.302 for all possible values). |

TABLE 3-continued

"Authentication request" message
(Table 8.1.2.1.1/1 of 3GPP TS 29.273)

| Information element name | Mapping to Diameter AVP | Cat. | Description |
|---|---|---|---|
| Access Type | RAT-Type | M | This IE shall be present if the Authentication Method is EAP-AKA'. This IE shall contain the radio access technology that is serving the UE. (See 3GPP TS 29.212 for all possible values) |

As a response to the "Authentication Request" message from the 3GPP AAA Server 212, the HSS 210 responds by sending "Authentication Answer" message to the AAA Server 212. The "Authentication Answer" command is sent over the SWx reference point. The most relevant AVPs of the Diameter-based "Authentication Answer" command are shown in Table 4. As shown, it includes 'Authentication Data' AVP, whose contents are shown in Table 5. As indicated, the 'Authentication Data' AVP contains all the needed authentication/authorization parameters (RAND, AUTN, XRES) and keys (CK, IK).

TABLE 4

"Authentication answer" message
(Table 8.1.2.1.1/4 of 3GPP TS 29.273)

| Information element name | Mapping to Diameter AVP | Cat. | Description |
|---|---|---|---|
| IMSI | User-Name (See IETF RFC 3588) | M | This information element shall contain the user IMSI, formatted according to 3GPP TS 23.003, clause 2.2. |
| Authentication Data | SIP-Auth-Data-Item | C | If the SIP-Number-Auth-Items AVP is equal to zero or it is not present, then this AVP shall not be present. Table shows the contents of this information element. |

TABLE 5

'Authentication Data' contents
(Table 8.1.2.1.1/5 of 3GPP TS 29.273 [6])

| Information element name | Mapping to Diameter AVP | Cat. | Description |
|---|---|---|---|
| Authentication Method | SIP-AuthenticationScheme | M | This IE shall contain one of the values EAP-AKA or EAP-AKA'. |
| Authentication Information AKA | SIP-Authenticate | M | This IE shall contain, binary encoded, the concatenation of the authentication challenge RAND and the token AUTN. See 3GPP TS 33.203 for further details about RAND and AUTN. |
| Authorization Information AKA | SIP-Authorization | M | This IE shall contain binary encoded, the expected response XRES. See 3GPP TS 33.203 for further details about XRES. |

TABLE 5-continued

'Authentication Data' contents
(Table 8.1.2.1.1/5 of 3GPP TS 29.273 [6])

| Information element name | Mapping to Diameter AVP | Cat. | Description |
|---|---|---|---|
| Confidentiality Key AKA | Confidentiality-Key | M | This information element shall contain the confidentiality key CK or CK'. It shall be binary encoded. |
| Integrity Key AKA | Integrity-Key | M | This information element shall contain the integrity key IK or IK'. It shall be binary encoded. |

The key hierarchy for EPS/E-UTRAN access is shown in FIG. 6 (3GPP TS 33.401. As shown, the permanent key, K, is stored at both the UE (USIM) and network (HSS/AuC 304). First, both the UE 214 and HSS 210 derive the intermediate key pairs CK and IK. Then, they derive the $K_{ASME}$, using CK, IK and Serving Network Identity (SN ID) as explained in Annex A.2 of 3GPP TS 33.401. The $K_{ASME}$ is sent to the MME 202 afterwards using the "Authentication-Information-Answer" message described previously in Table 2.

Then the UE 214 and MME 202 derive the NAS keys, namely, $K_{NASenc}$ (NAS encryption key) and $K_{NASint}$ (NAS integrity protection key), using the key derivation functions (KDF) described in Annex A.7 of 3GPP TS 33.401. Furthermore, the MME 202 and UE 214 derive the eNB security key ($K_{eNB}$) using the $K_{ASME}$ and the uplink NAS COUNT, as defined in Annex A.3 of 3GPP TS 33.401. Afterwards, the eNB receives the $K_{eNB}$ from the MME 202, contained in the "Initial Context Setup Request" message. Finally, the UE 214 and eNB derive the needed keys for user plane ($K_{UPint}$, $K_{UPenc}$) and RRC ($K_{RRCint}$, $K_{RRCenc}$) transmissions using the KDFs described in Annex A.7 of 3GPP TS 33.401.

The MME 202 uses the "Initial Context Setup Request" message to send the ($K_{eNB}$) to the eNB. In general, the "Initial Context Setup Request" message is sent to request the setup of a UE context (Clause 9.1.4 of TS 36.413). The 'Security Key' Information Element (IE) ($K_{eNB}$) is used to apply security in the eNB (Clause 9.2.1.41 of TS 36.413).

In this section, the AKA' key hierarchy for TWAN, which is shown in FIG. 7, is discussed. Similar to the EPS scenario in FIG. 6, the key pairs CK and IK are derived at the UE 214 and HSS. Then a new pair of keys, namely, CK' and IK', are derived making use of the 'access network identity'. Annex A.2 of 3GPP TS 33.402 shows how to derive CK', IK' from CK, IK and the 'access network identity'. The keys CK', IK' are sent to the 3GPP AAA Server using the "Authentication Answer" message explained previously in Table 4. Then, a Master Key (MK) is derived at the UE and 3GPP AAA Server as follows (Clause 3.3 of IETF RFC 5448):

MK = PRF'(IK'|CK',"EAP-AKA'"|Identity)
K_encr = MK[0..127]; K_aut = MK[128..383]; K_re = MK[384..639];
MSK = MK[640..1151]; EMSK = MK[1152..1663], where PRF' is a pseudo-random function, K_encr is a 128-bit encryption key (for data encryption), K_aut is a 256-bit authentication key (for MAC), K_re is a 256-bit re-authentication key (for fast re-authentication), MSK is a 512-bit Master Session Key, and EMSK is a 512-bit Extended Master Session Key.

The MSK is exported by the EAP method IETF RFC 3748 to the TWAN. More specifically, the 3GPP AAA server transports the MSK to the TWAN by sending the Diameter-based "Diameter-EAP-Answer" (EAP-Payload, EAP-Master-Session-Key) message, as discussed in IETF RFC 4072. The 'EAP-Master-Session-Key' AVP represents the MSK to be used over the WLAN link.

In Intra-LTE handover, in which a UE 214 experiences handover from one eNB to another, the UE 214 does not need to be authenticated again to the network. Instead only a new $K_{eNB}$ is generated at the UE and target eNB. The procedure to update the $K_{eNB}$ is shown in FIG. 8 and can be summarized as follows (Clause 7.2.8 of 3GPP TS 33.401). First, the UE 214 and MME 202 will derive a $K_{eNB}$ and a Next Hop parameter (NH) using the $K_{ASME}$ key. An NH Chaining Counter (NCC) is associated with each $K_{eNB}$ and NH parameter. The MME 202 can send the $K_{eNB}$ key or the {NH, NCC} pair to the eNB. On handovers, A basis $K_{eNB}$® is first derived using either $K_{eNB}$ (horizontal key derivation) or NH (vertical key derivation). Finally, NH or $K_{eNB}$ is further bound to the target Physical Cell ID (PCI) and its downlink Evolved Absolute Radio Frequency Channel Number (EARFCN-DL).

Fast re-authentication can be done for TWAN 218 access to EPC 216. In this case, the HSS 210 will not be involved as it was in the full authentication case. The fast re-authentication procedure aims to generate new MSK to be used between the UE and TWAN. Clause 6.3 of 3GPP TS 33.402 describes it in details.

The "EAP-Request/AKA'-Reauthentication" Message (Clause 9.7 of IETF RFC 4187) message is sent from the 3GPP AAA Server to the UE, once the 3GPP AAA Server receives the re-authentication ID. It includes the following attributes: COUNTER, NONCE, MAC, and new re-authentication ID. First, the COUNTER is a 16-bit unsigned integer counter value (Clause 10.16 of IETF RFC 4187). The COUNTER is initialized to one in the full authentication procedure. Second, the NONCE is random number (16 bytes) that is freshly generated by the AAA server for this EAP-AKA' fast re-authentication (Clause 10.18 of IETF RFC 4187. The random number is used as a challenge for the UE and also as a seed value for the new keying material. Third, the MAC attribute contains a message authentication code (MAC) covering the EAP packet in general. The MAC is calculated over the whole EAP packet (NONCE in this case) and concatenated with optional message-specific data (Clause 10.15 of IETF RFC 4187). Finally, the new re-authentication ID will be used in the next fast re-authentication.

In fast re-authentication, the following keys are calculated (IETF RFC 5448):

---

MK = PRF'(K_re, "EAP-AKA' re-auth"|Identity| COUNTER| NONCE)
MSK = MK[0..511]

--- where MK is Master Key and PRF is a Pseudo-Random number Function. On fast re-authentication, the same pseudo-random number generator can be used to generate a new MSK (IETF RFC4187). K_re is the re-authentication key from the preceding full authentication and stays unchanged over any fast re-authentication(s) that may happen based on it. Finally, COUNTER and NONCE are generated at the server.

In the current 3GPP Inter-Working Architecture, a multi-RAT (LTE/WLAN) UE that decides to make an Inter-RAT handover will need to run the full authentication procedure before making the handover, TS 23.402. When the Small Cell is collocated with the Wi-Fi network, it is inefficient to require that the UE Detailed Description run a complete re-authentication at each handover between LTE and WLAN.

SUMMARY

Multi-RAT UEs currently have two independent paths to authenticate with HSS (either via the MME or the 3GPP AAA Server causing repeated authentication messages to HSS. Embodiments described below use one unified authentication path between the UE and HSS for Small Cell and Wi-Fi authentication.

First, a new 3GPP EPC-TWAN interworking architecture has the MME manage the authentication requests from multi-RAT UEs. In other words, the 3GPP AAA Server will not handle any authentication procedures from ISWN-based UEs. To do so, a new reference point, namely, STb is added, between the TWAN and MME.

Second, new unified authentication procedures are added, which allow the ISWN-based multi-RAT UE to be authenticated directly with the HSS, irrespective of its current access network (TWAN or HeNB). The unified authentication procedures enable mutual authentication between the UE and MME and provide keys for both WLAN and LTE access networks. Both TWAN-initiated and HeNB-initiated authentication can be done by a UE via either the TWAN or HeNB respectively.

Third, new fast re-authentication procedures for Inter-RAT handover scenarios are done. The re-authentication procedures simplify the mutual authentication step by focusing only on generating the required keys. In other words, the fast re-authentication procedures do not involve the HSS in the re-authentication process, which reduces the burden on the core network. Both Intra-ISWN (TWAN-to-HeNB and HeNB-TWAN) and TWAN-to-eNB handover scenarios are described.

Finally, the extensions to the various standard protocol messages to execute the authentication procedures are described. The extended messages span the following layer, protocols, and reference points: RRC, S1-AP, NAS, EAP, and Diameter over the S6a reference point (MME-HSS).

These changes need not replace the existing 3GPP inter-working architecture. Rather, they can provide a more efficient alternative that can be used when the Small Cell and Wi-Fi network are tightly integrated.

While the examples in this document deal with handover between a radio access technology that operates in licensed spectrum such as LTE and a radio access technology that operates in unlicensed such as Wi-Fi, it should be appreciated that the concepts can apply to handover between any two radio access technologies.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 9:
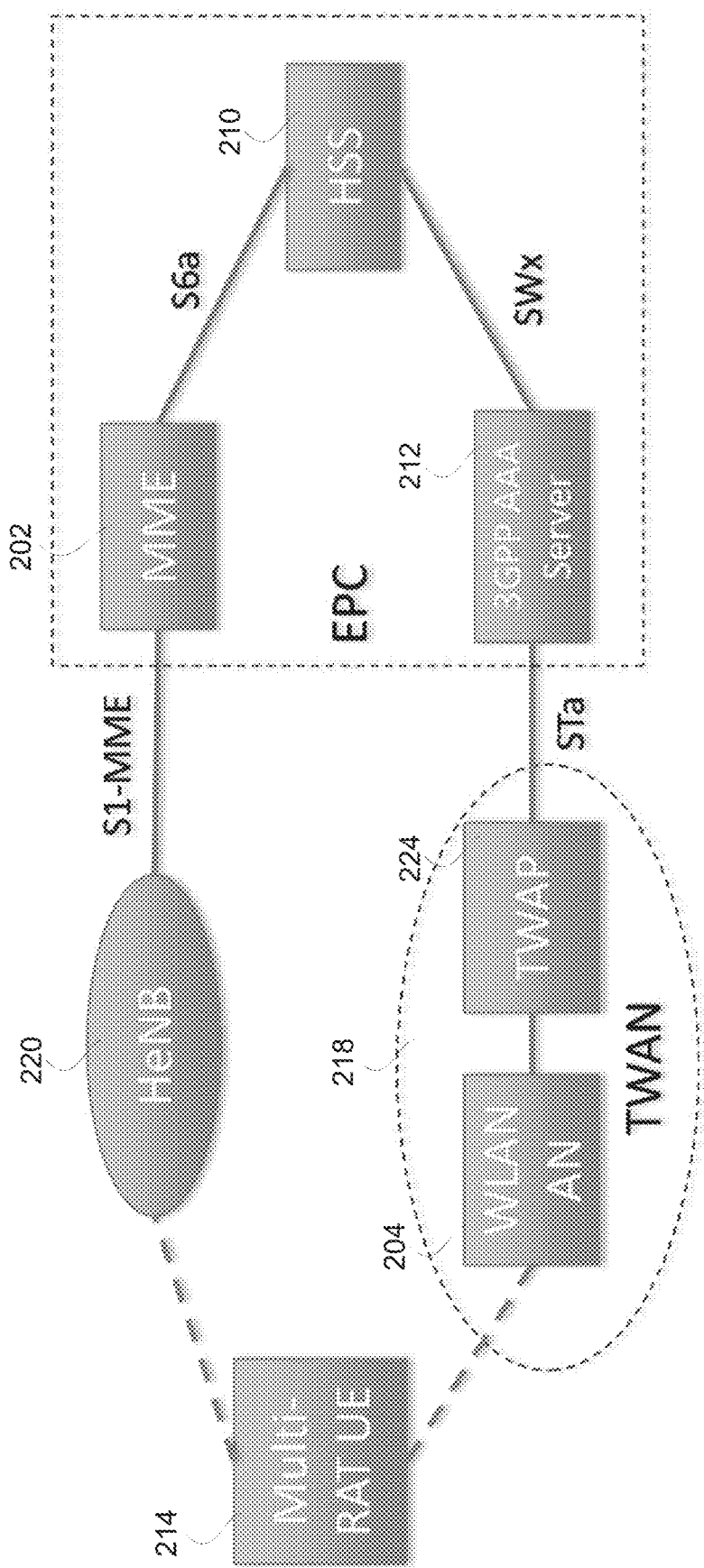
FIG. 9 is a diagram that illustrates two parallel authentication paths for ISWN UEs.

FIG. 9 depicts the two different authentication paths for a multi-RAT UE 214 accessing EPC 216 via an ISWN. A UE 214 performs the AKA algorithm with the HSS 210 through the HeNB 220 and MME 202 for an LTE connection on the upper path, or exercises the AKA algorithm with the HSS 210 through the TWAN and AAA Server for a WLAN connection on the lower path. When a UE 214 makes an inter-RAT handover it needs to re-run the authentication procedure with the HSS 210, via either the MME 202 or the AAA Server 212. The roles of the MME 202 and 3GPP AAA Server 212 are similar.

In an Integrated Small Cell/Wi-Fi Network, it is inefficient to re-run the full authentication procedure at each handover event with similar functionality provided by both MME 202 and AAA Server 212.

It is understood that the functionality illustrated in FIG. 9, may be implemented in the form of software (i.e., computer-executable instructions) stored in a memory of, and executing on a processor of, a wireless device or other apparatus (e.g., a server, gateway, device, or other computer system), such as one of those illustrated in FIG. 21C or 21D described below. It is also understood that the functionality illustrated in FIG. 9 may implemented as a set of virtualized network functions. The network functions may not necessarily communicate directly, rather, they may communicate via forwarding or routing function. It is also understood that the functionality illustrated in FIG. 9 may implemented as a set of virtualized network functions. The network functions may not necessarily communicate directly, rather, they may communicate via forwarding or routing function.

Figure 10:
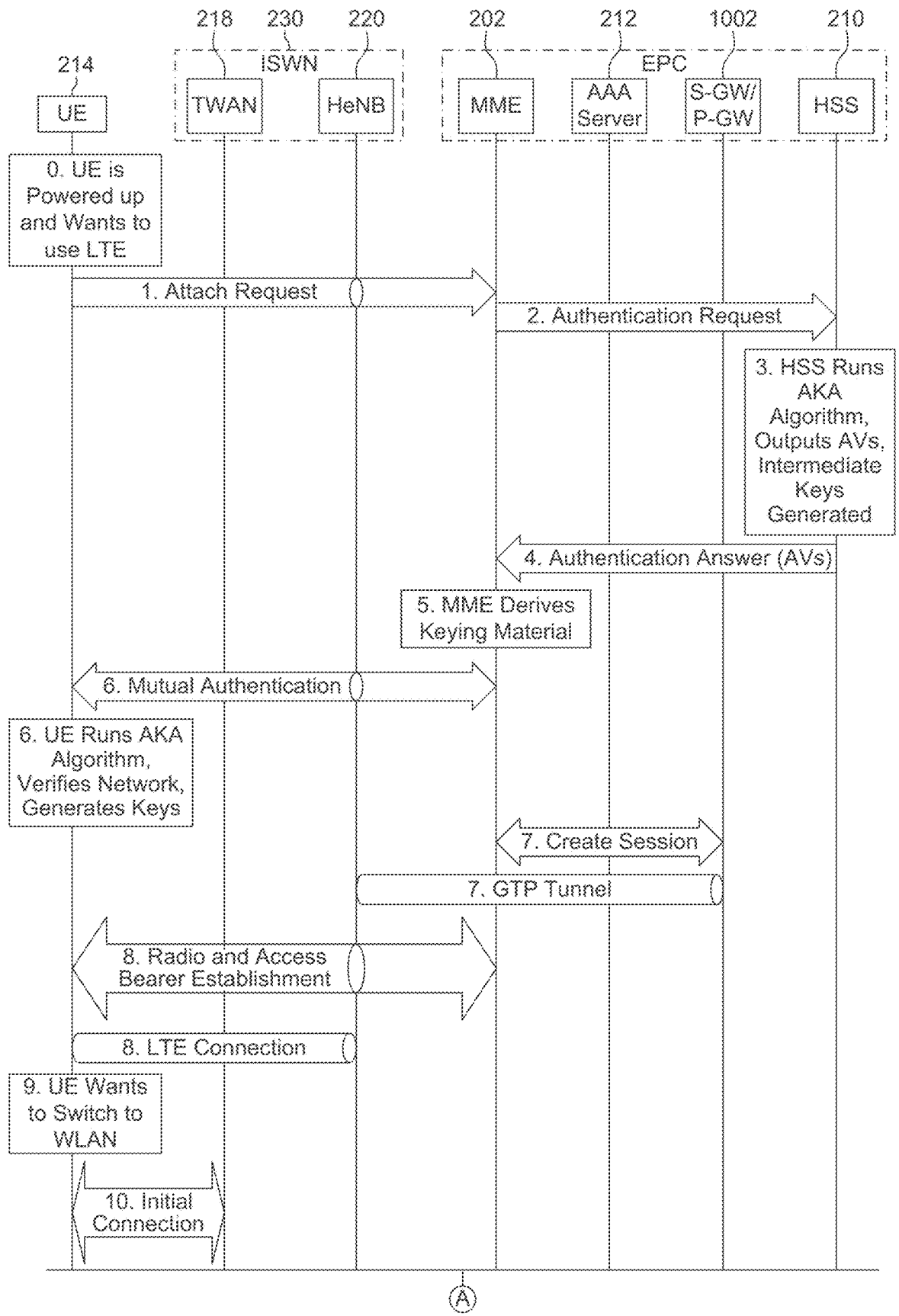
FIG. 10 is a diagram that illustrates a call flow of frequent TWAN-HeNB handover in ISWN.
Figure 10:
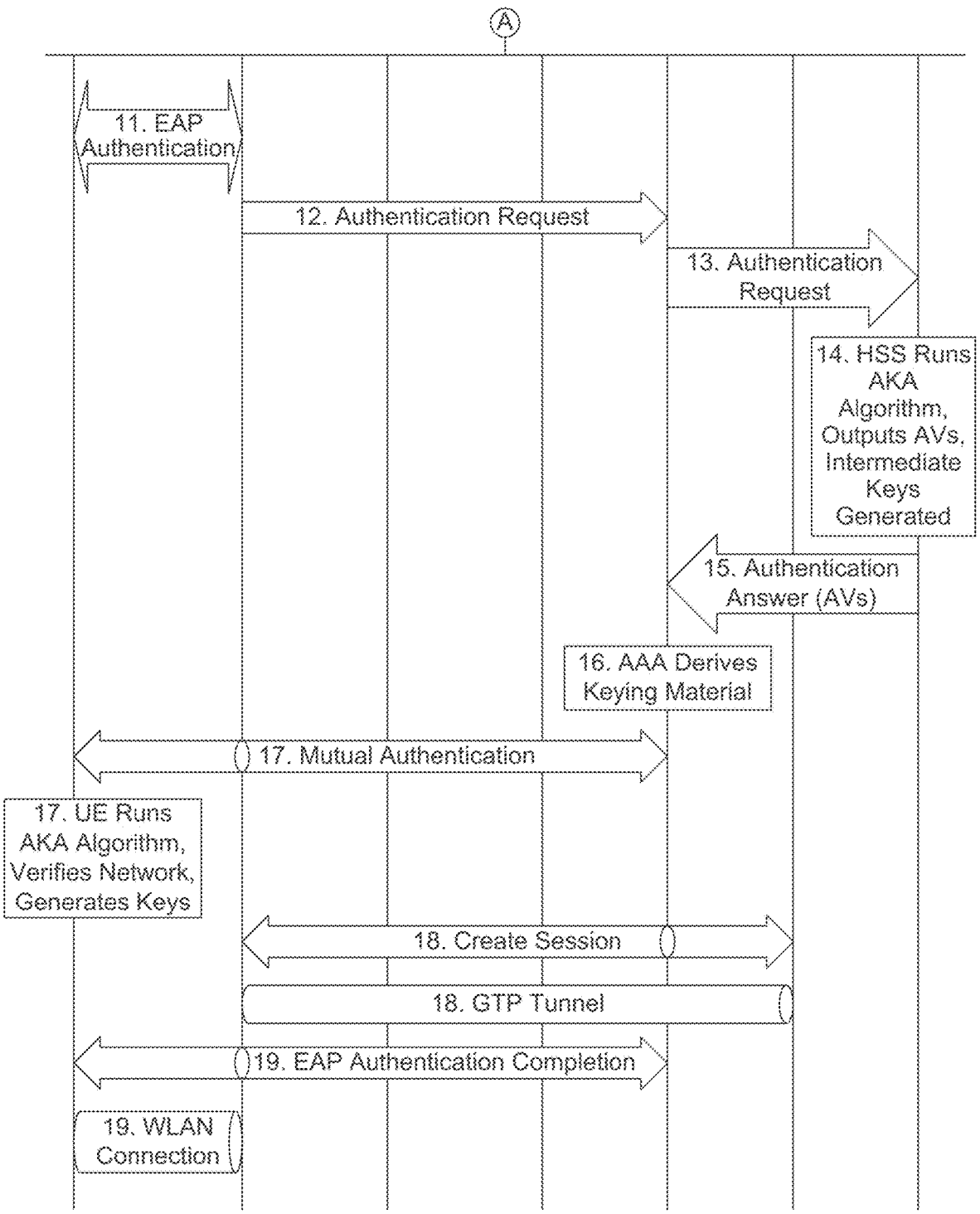

FIG. 10 explains this procedure details. Initially, it is assumed that the UE 214 is powered up and wants to use LTE. In step 1 of FIG. 10, the UE 214 initiates the "Attach Request" procedure towards the MME 202, via the HeNB. In response, the MME 202 sends "Authentication Request" message to the HSS 210 in step 2 of FIG. 10. In step 3 of FIG. 10, the HSS 210 runs the AKA algorithm to generate the authentication vectors and intermediate keys.

The HSS sends the authentication vectors and keys to the MME in step 4 of FIG. 10. Then the MME derives the needed keys. The mutual authentication procedure between the UE 214 and MME 202 is executed in step 6 of FIG. 10, during which the UE runs the AKA algorithm to generate the needed keys and verifications. Once the authentication is done, the MME initiates the Create Session procedure towards the S-GW/P-GW in step 7 of FIG. 10. As a result a GTP tunnel is established between the HeNB 220 and S-GW/P-GW 1002. Furthermore, the LTE procedure for radio and access bearer establishment is done between the UE 214, HeNB 220, and MME 202 in step 8 of FIG. 10.

After a while, the UE 214 discovers a WLAN and wants to make a handover to the TWAN 218 in step 9 of FIG. 10. Accordingly, the UE 214 will initiate the connection with the TWAN 218 in step 10 of FIG. 10. The TWAN 218 and UE 214 will have initial EAP authentication procedure in step 11 of FIG. 10. Once done, an "Authentication Request" is sent towards the AAA Server 212 and HSS 210 in step 14 and 15 of FIG. 10. The roles of the MME 202 and 3GPP AAA Server 212 are similar as in steps 2 and 13 of FIG. 10. In step 14 of FIG. 10, the HSS 210 runs the AKA algorithm (similar to step 3) to generate the authentication vectors and intermediate keys. These authentication vectors are needed to authenticate the UE 214, which was already authenticated previously in step 6 of FIG. 10.

The HSS 210 sends the authentication vectors and keys to the AAA Server in step 15 of FIG. 10. Accordingly in step 16, the AAA Server 212 derives the needed keys. Again, the roles of MME 202 and 3GPP AAA Server 212 are similar as in steps 5 and 16 of FIG. 10. Then, a mutual authentication, similar to the one in step 6 of FIG. 10, will be performed between the 3GPP AAA Server 212 and UE 214 in step 17 of FIG. 10. This procedure includes the key generation at the UE 214 side, similar to step 6 of FIG. 10. Consequently, the TWAN 218 initiates the "Create Session" procedure towards the S-GW/P-GW 1002 via the 3GPP AAA Server 212 (over the S2a reference point), which is concluded by having GTP tunnel between the TWAN 218 and S-GW/P-GW 1002 in step 18 of FIG. 10. Alternatively, the TWAN 218 can initiate the session creation via the MME 202 over the S1a-MME reference point (shown in FIG. 2). Finally, the authentication procedure is completed and the WLAN connection is established in step 19 of FIG. 10.

From FIG. 10, if UE 214, which is using LTE access, wants to handover to TWAN 218 then in the current standards it will contact the HSS 210 again via the 3GPP AAA server 212 for authorization. In other words, FIG. 10 clarifies redundant authentication procedure in Intra-ISWN Inter-RAT handover. More precisely, the drawbacks of the handover procedure in FIG. 10 are:

1. The HSS 210 runs the AKA algorithm to generate authentication vectors twice, as in steps 3 and 14 of FIG. 10.
2. The UE 214 runs the AKA algorithm to generate authentication vectors twice, as in steps 6 and 17 of FIG. 10.
3. The UE 214 and EPC 216 exchange the mutual authentication set of messages twice, as in steps 6 and 17 of FIG. 10.

In observing this issue, if a UE 214, which is attached to the HeNB side of an ISWN, wants to handover to the TWAN side of the ISWN then there is no need to perform full authentication procedure again with the HSS 210 via the AAA server 212. Based on the previously explained use case, the problems considered in this disclosure can be formulated as follows:

How to authenticate the ISWN-attached UE 214 with the EPC 216 for both LTE and WLAN at one time to reduce repeated messaging towards the HSS 210 in EPC 216?

In this case, there will no need to run the full authentication procedure at Intra-ISWN Inter-RAT handover. Instead, we will have a fast re-authentication procedure.

How to conduct fast re-authentication at Inter-RAT handover scenarios?

For example, the HSS 210 may not be needed to get involved in the re-authentication process.

Figure 21A:
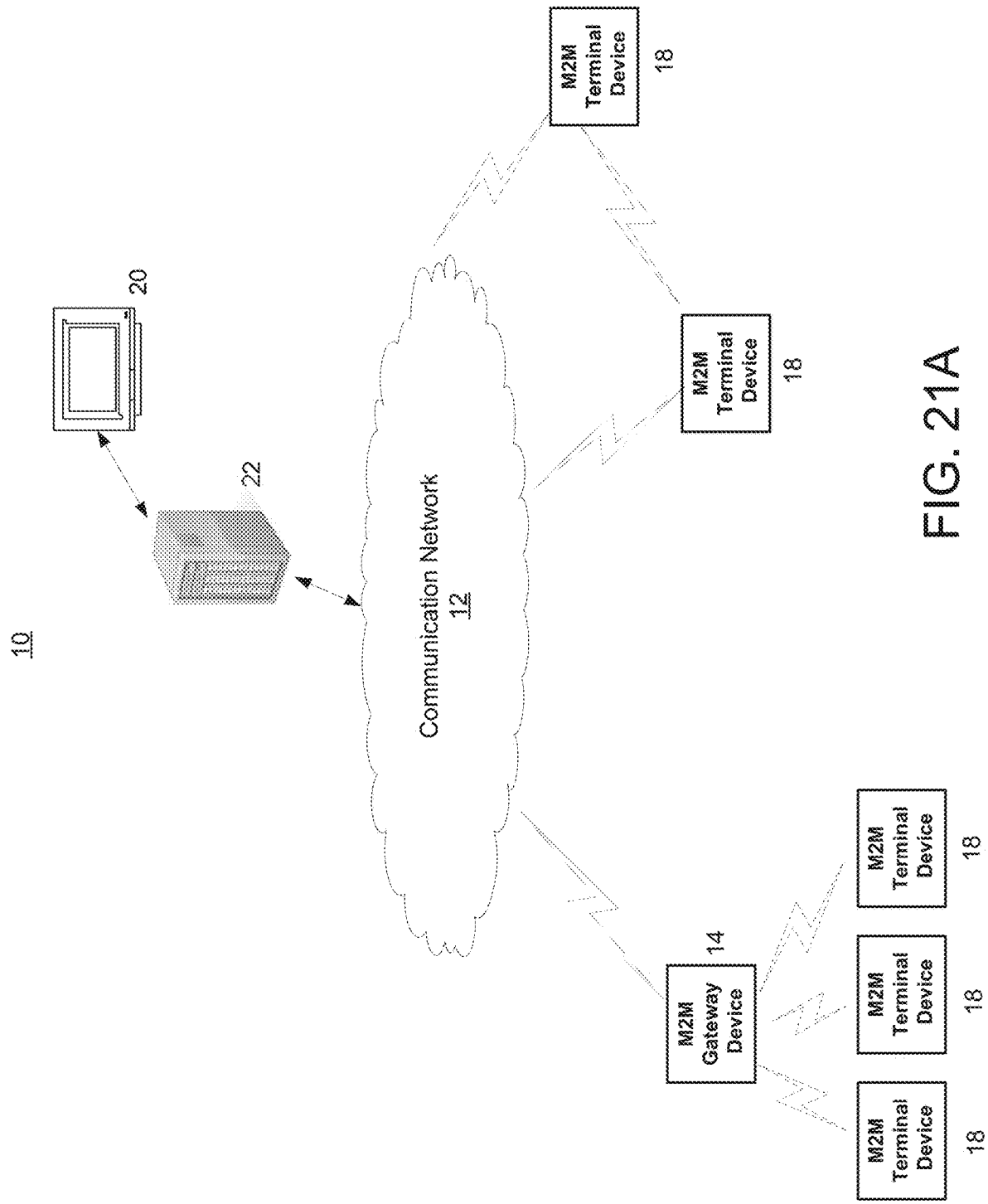
FIG. 21A is a diagram of an example machine-to machine (M2M) or Internet of Things (IoT) communication system in which one or more disclosed embodiments of IoT event management systems and methods may be implemented.
Figure 21B:
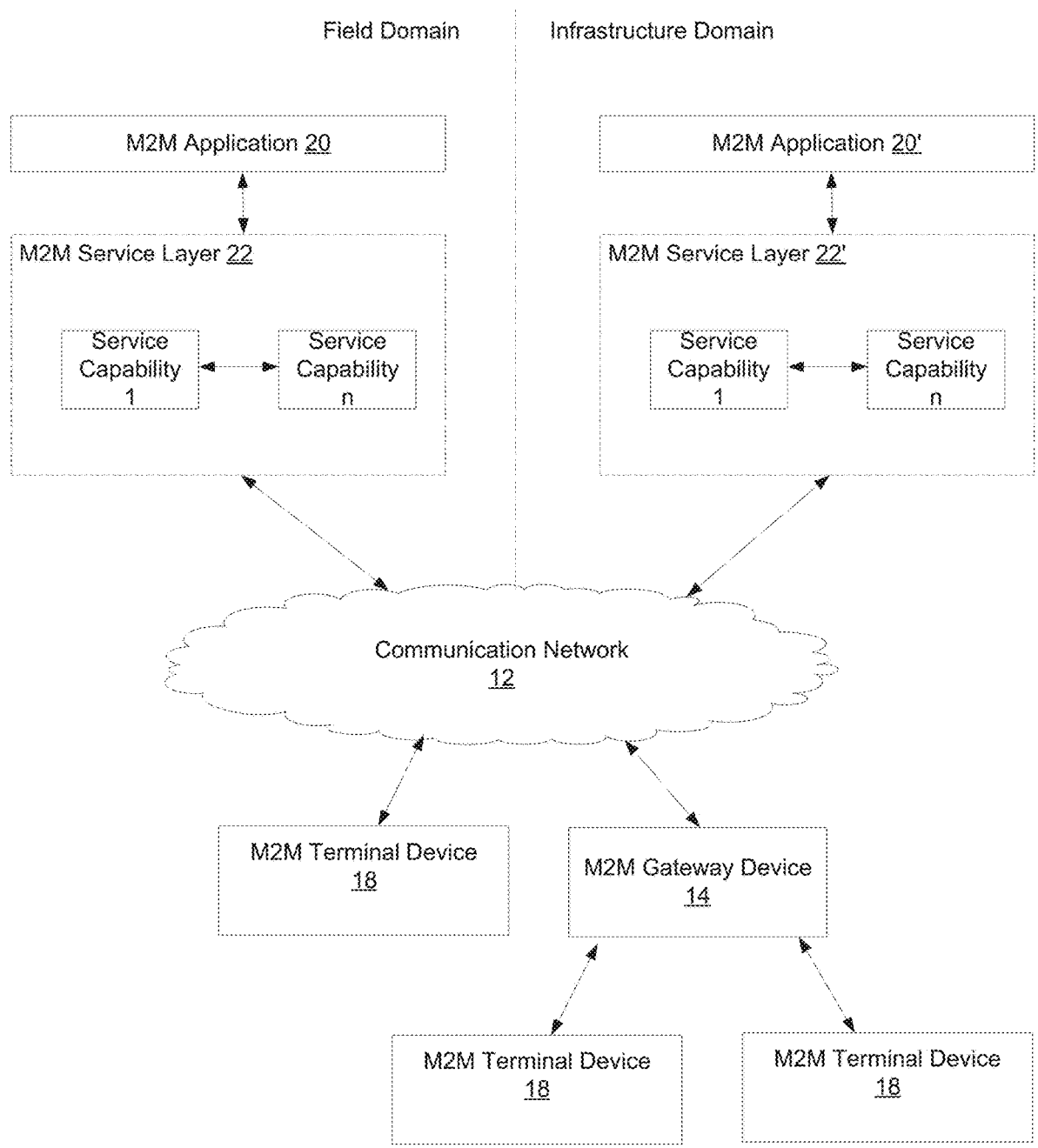
FIG. 21B is a system diagram of an example architecture that may be used within the M2M/IoT communications system illustrated in FIG. 21A.
Figure 21C:
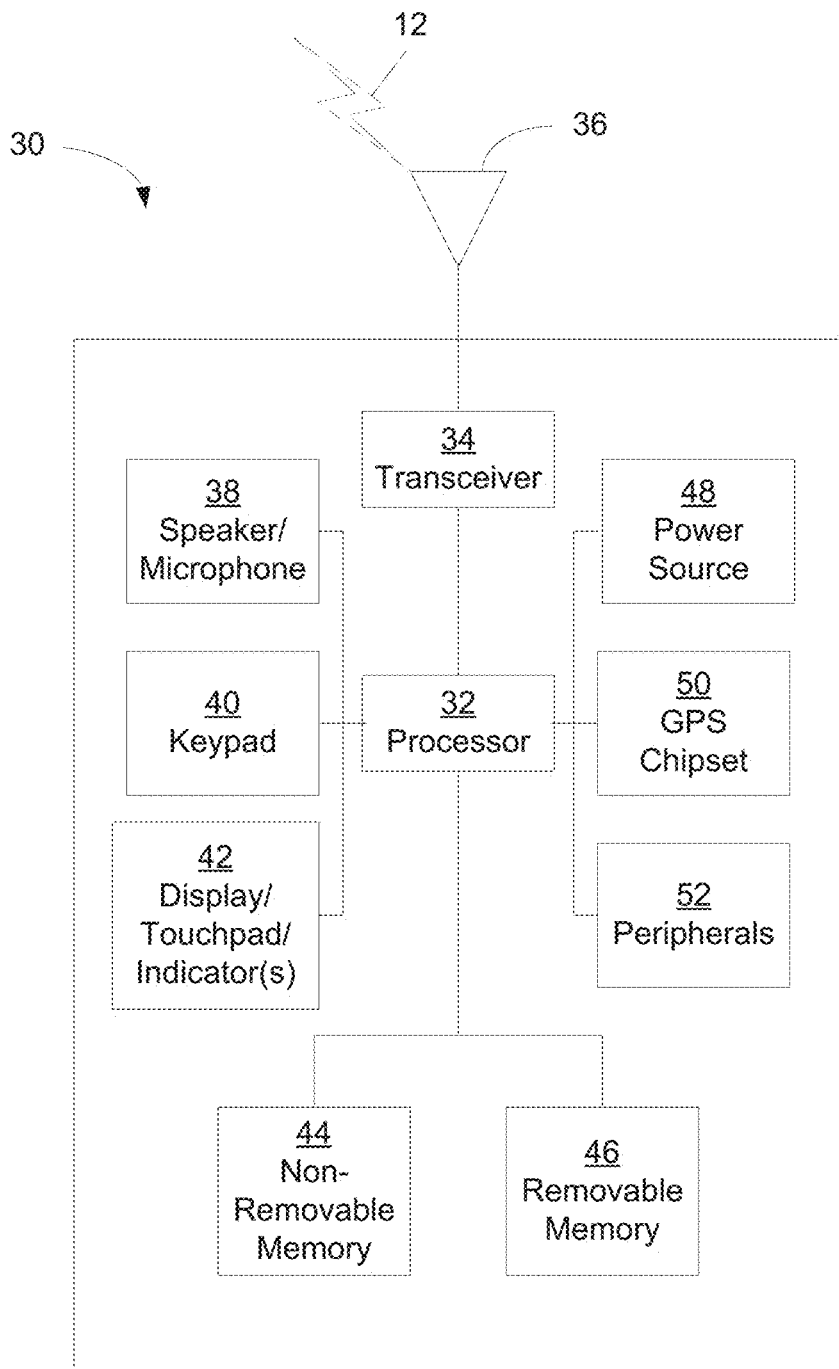
FIG. 21C is a system diagram of an example M2M/IoT terminal or gateway device that may be used within the communications system illustrated in FIG. 21A.
Figure 21D:
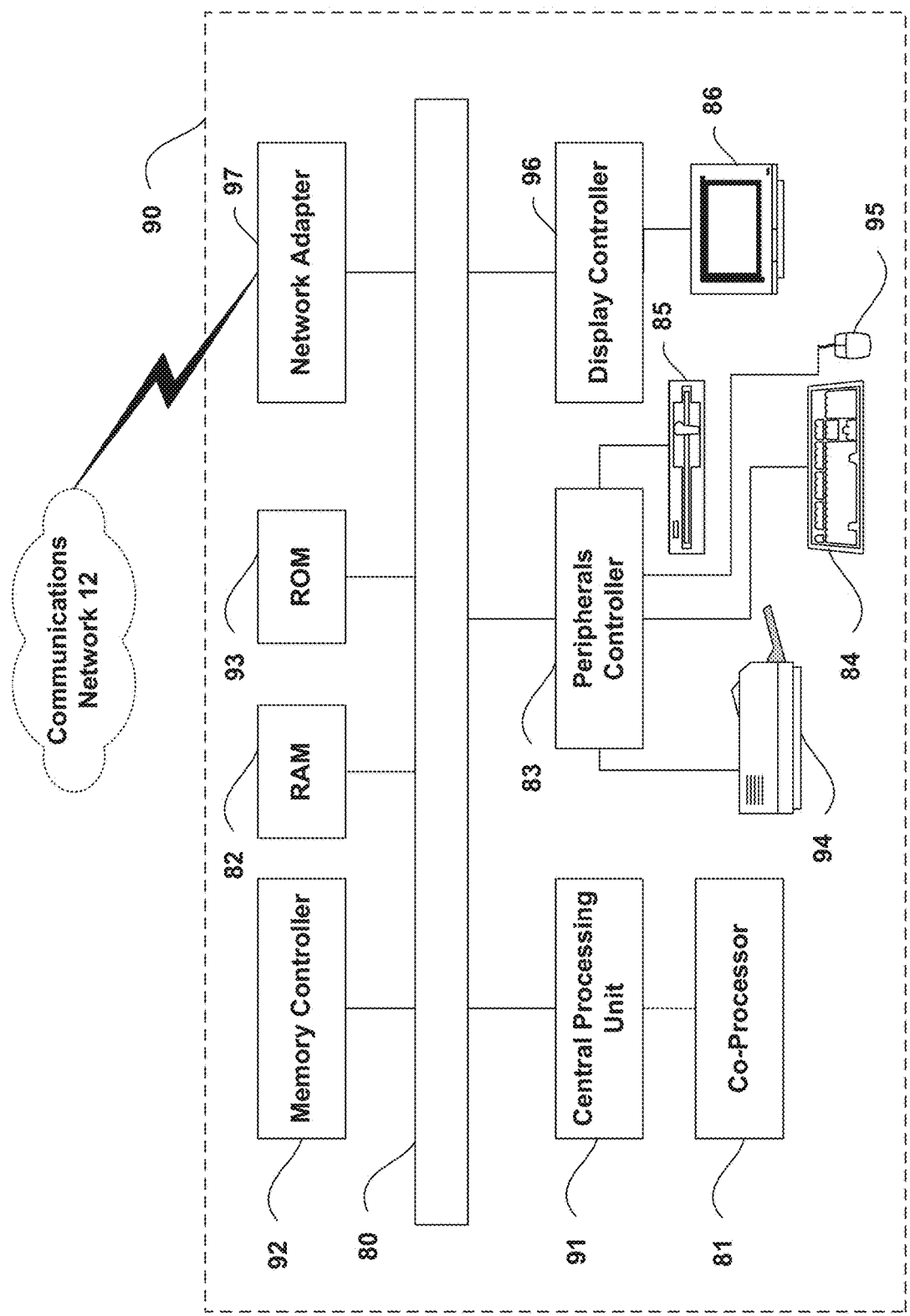
FIG. 21D is a block diagram of an example computing system in which aspects of the communication system of FIG. 21A may be embodied.

It is understood that the entities performing the steps illustrated in FIG. 10 may be logical entities that may be implemented in the form of software (i.e., computer-executable instructions) stored in a memory of, and executing on a processor of, an apparatus configured for wireless and/or network communications or a computer system such as those illustrated in FIG. 21C or FIG. 21D. That is, the method(s) illustrated in FIG. 10 may be implemented in the form of software (i.e., computer-executable instructions) stored in a memory of an apparatus, such as the apparatus or computer system illustrated in FIG. 21C or FIG. 21D, which computer executable instructions, when executed by a processor of the apparatus, perform the steps illustrated in FIG. 10. It is also understood that the functionality illustrated in FIG. 10 may implemented as a set of virtualized network functions. The network functions may not necessarily communicate directly, rather, they may communicate via forwarding or routing function. It is also understood that any transmitting and receiving steps illustrated in FIG. 10 may be performed by communication circuitry of the apparatus under control of the processor of the apparatus and the computer-executable instructions (e.g., software) that it executes. It is also understood that the functionality illustrated in FIG. 10 may implemented as a set of virtualized network functions. The network functions may not necessarily communicate directly, rather, they may communicate via forwarding or routing function.

Figure 1:
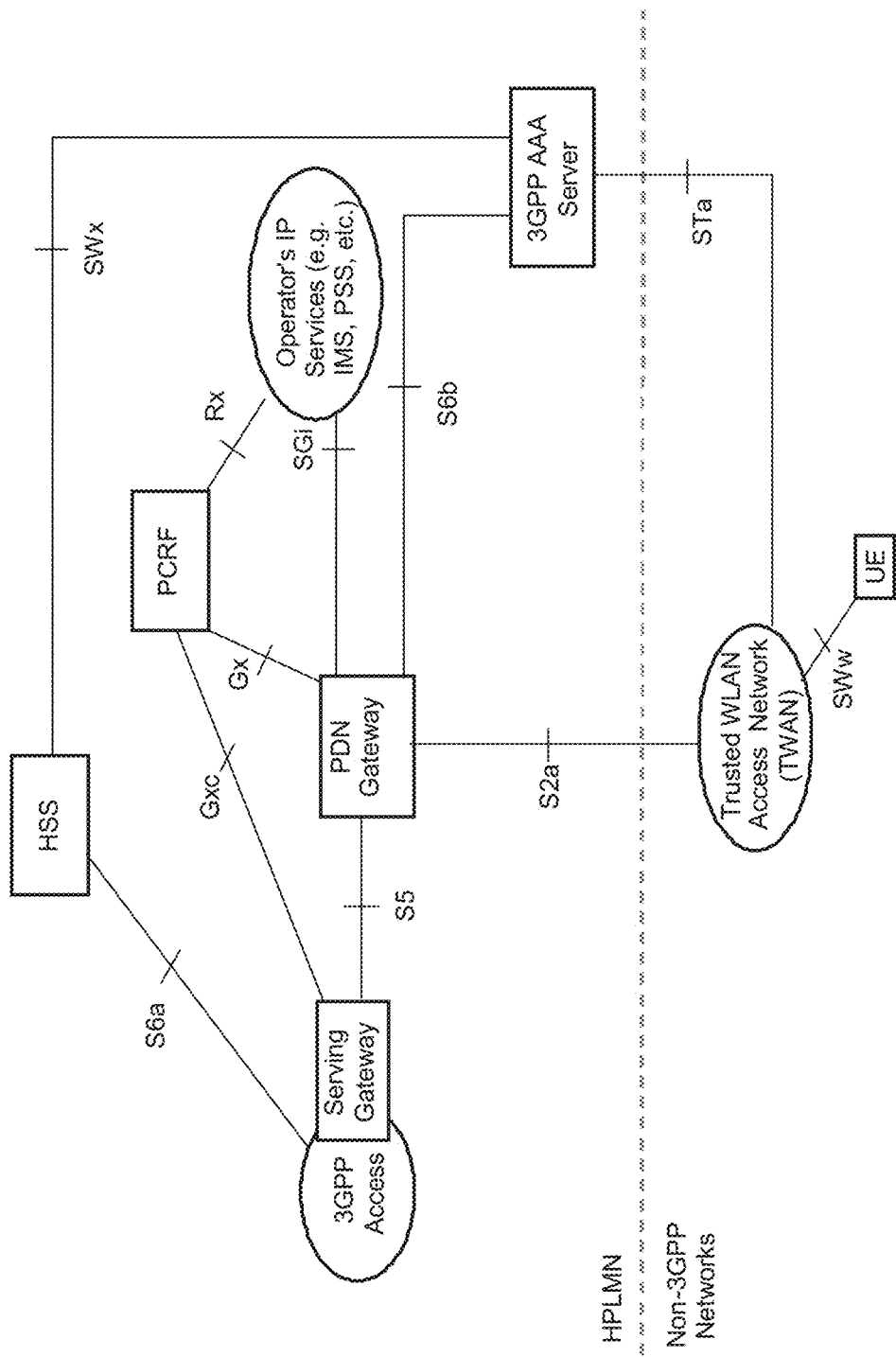
FIG. 1 is a diagram that illustrates a non-roaming architecture for Trusted WLAN access to EPC.
Figure 2:
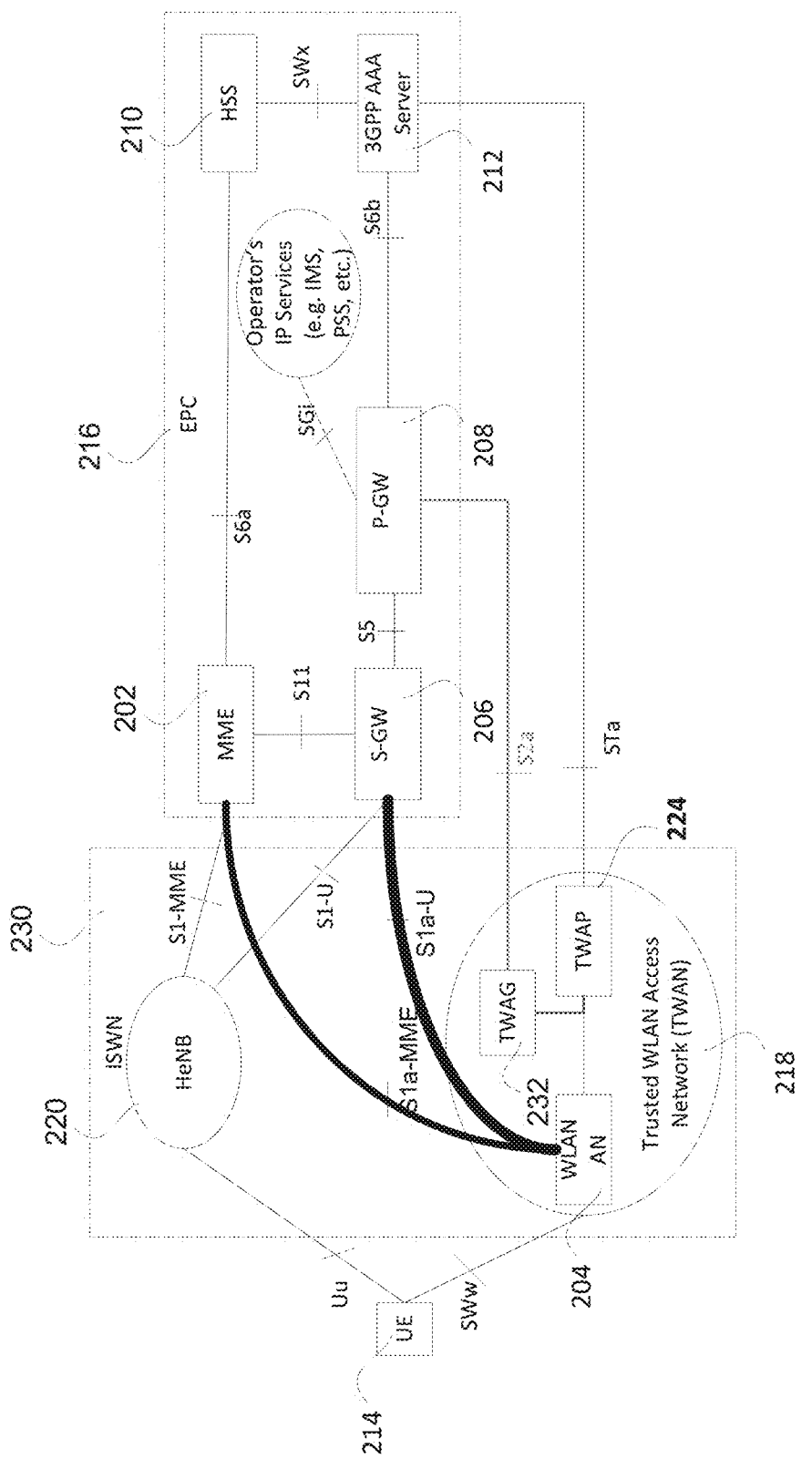
FIG. 2 is a diagram that illustrates 3GPP EPC-WLAN MME/S-GW anchored ISWN architecture with additional reference points in bold.
Figure 3:
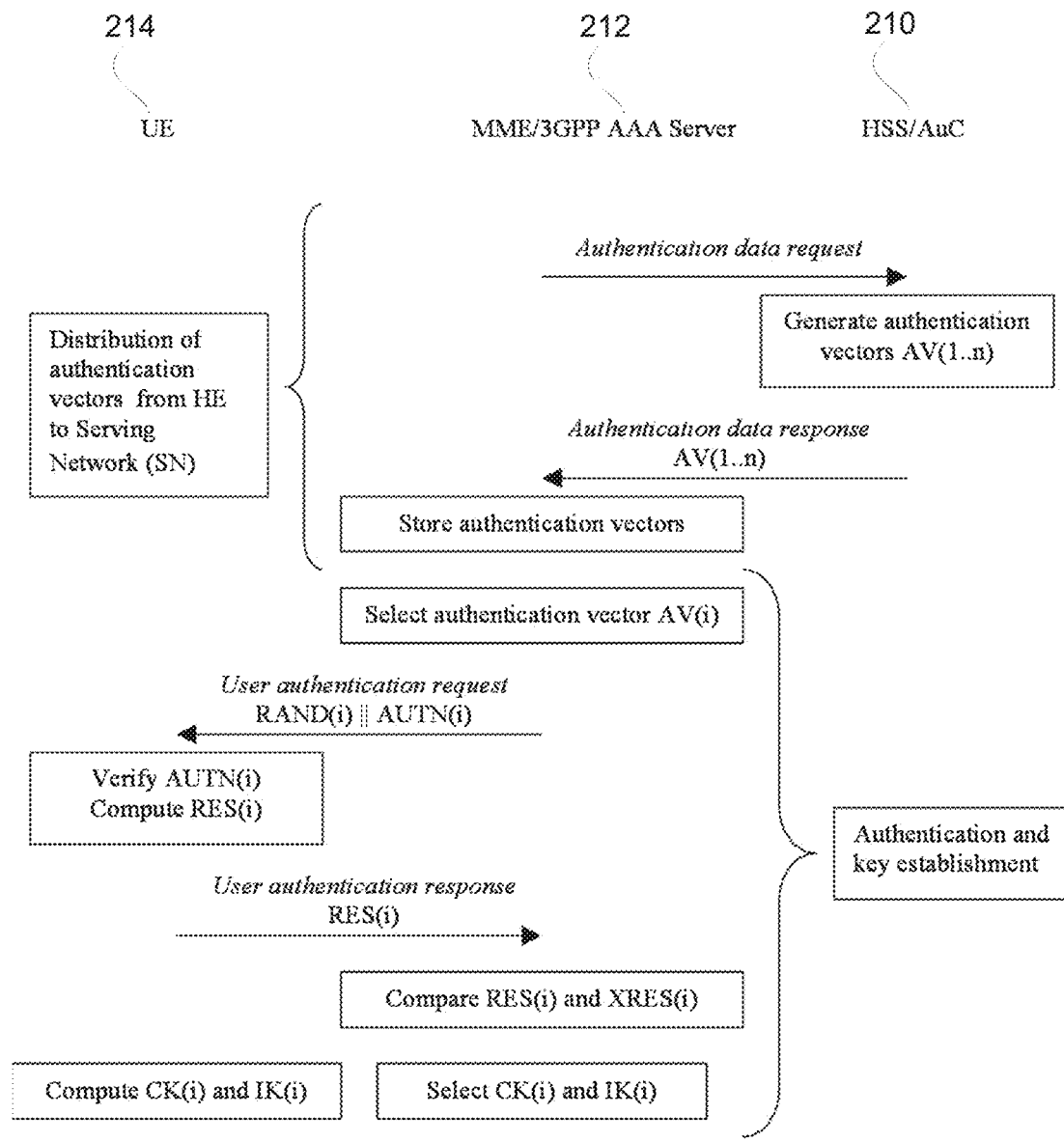
FIG. 3 is a diagram that illustrates Authentication and Key Agreement (AKA).
Figure 11:
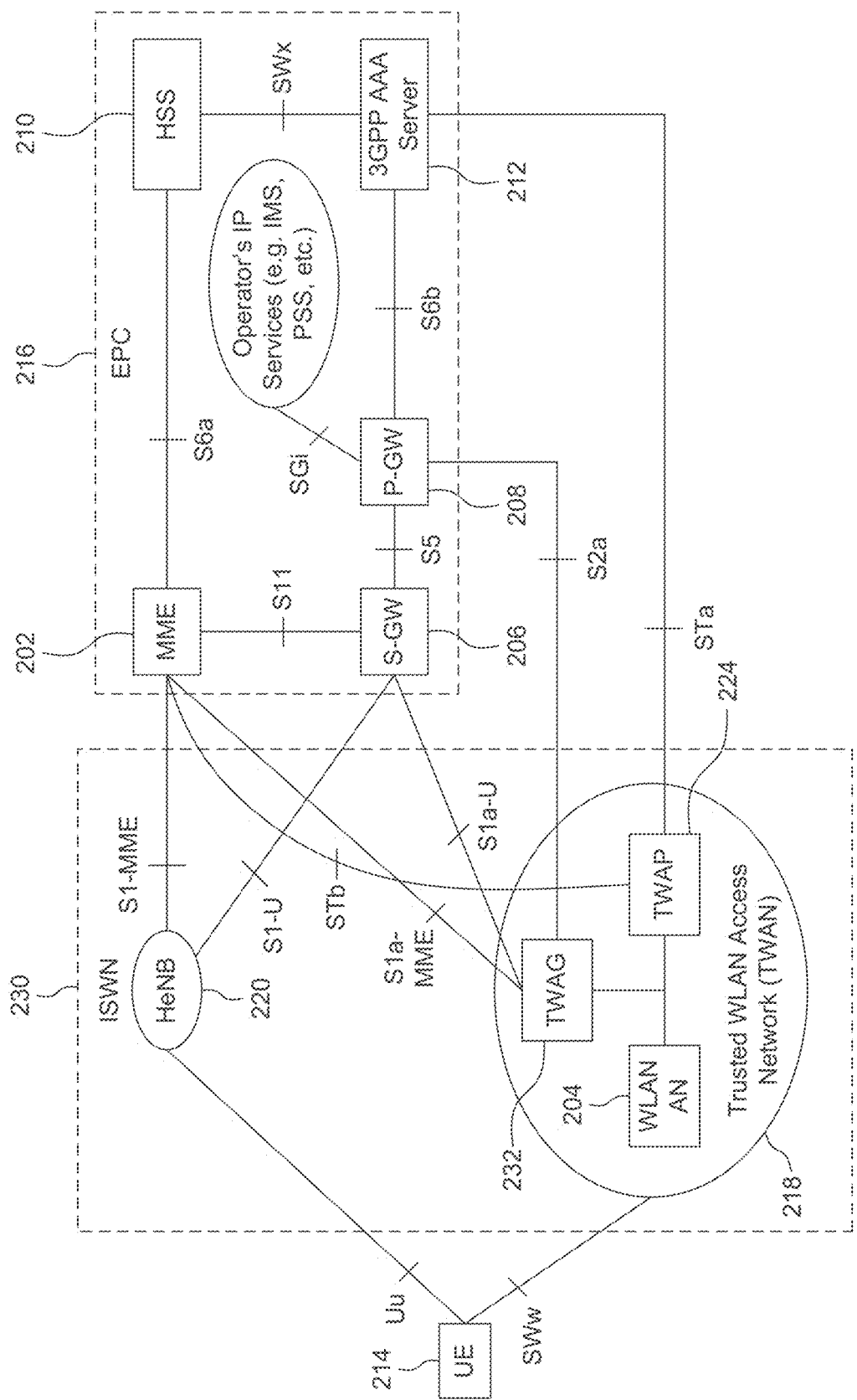
FIG. 11 is a diagram that illustrates a unified-authentication integrated EPC-TWAN architecture.

FIG. 11 shows the interworking architecture for the EPC-TWAN integration. Existing reference points with modified messages are Uu, SWu, S1-MME, and SGa. Additional reference points that were previously discussed in FIG. 2 are S1a-MME and S1a-U. A new reference point STb is added between TWAP 224 and MME 202. FIG. 11 shows HeNB 220 and TWAN 218 integrated within an ISWN 230. The ideas presented in this disclosure are also applicable to the case where the HeNB small cell 220 and TWAN 218 are integrated in a same physical box.

In this example, the 3GPP AAA Server 212 will not be utilized. Instead for the authentication procedures, the TWAP 224 will be connected to the MME 202 via a new STb reference point. As for the Session Management (SM) procedure and similar to FIG. 2, the TWAN 218 (TWAG 232 in this case) will be connected to the MME 202 and S-GW 206 via the S1a-MME and S1a-U reference points, respectively.

The unified authentication procedure can bypass the 3GPP AAA server 212 and only use HSS 210 and MME 202 for authentication of ISWN 230. However, the 3GPP AAA Server 212 can still co-exist in the same network for authentication of other networks not allowed for unified authentication, or used when unified authentication is not supported. Finally, we point out that such interworking architecture can be generalized to other non-3GPP systems, which utilize the 3GPP AAA Server 212, such as CDMA2000.

As was shown in FIG. 11, an ISWN 230 consists of TWAN 218 and HeNB 220. We assume that each access node (HeNB 220 or TWAN 218) is configured with a few parameters about the ISWN 230. These configuration parameters aim to include the E-UTRAN Network Type (as in 3GPP TS 33.401 and the WLAN access network identity (as in 3GPP TS 24.302. Table 6 depicts the added configuration parameters. As indicated, first 'Access Type' is added to indicate the integration nature as 'ISWN'. Second, we include the 'Network Type' of the HeNB side of the ISWN 230 to be 'E-UTRAN'. Finally, we indicate the 'Network Access Identity' of the TWAN 218 side to be WLAN. These ISWN configuration parameters will be stored at both the HeNB 220 and TWAN 218, and will be sent by any of them to the MME 202 within the authentication/attachment procedure.

It is understood that the functionality illustrated in FIG. 11, may be implemented in the form of software (i.e., computer-executable instructions) stored in a memory of, and executing on a processor of, a wireless device or other apparatus (e.g., a server, gateway, device, or other computer system), such as one of those illustrated in FIG. 21C or 21D described below. It is also understood that the functionality illustrated in FIG. 11 may implemented as a set of virtualized network functions. The network functions may not necessarily communicate directly, rather, they may communicate via forwarding or routing function. It is also understood that the functionality illustrated in FIG. 11 may implemented as a set of virtualized network functions. The network functions may not necessarily communicate directly, rather, they may communicate via forwarding or routing function.

TABLE 6

ISWN configuration parameters

| Configuration Parameter | Value | Description |
| --- | --- | --- |
| Access Type | ISWN | ISWN indicates both E-UTRAN and WLAN accesses |
| Network Type | E-UTRAN | The HeNB side of the ISWN |
| Access Network Identity | WLAN | The TWAN side of the ISWN |

Unified Authentication Procedures

In this section, we introduce the unified authentication procedure which allows the UE 214 and the network to perform the full AKA algorithm, for both RATs of the ISWN 230. The authentication step is the first important step in the initial attachment procedure. Hence, we will explain the authentication procedure, as a part of the initial attachment process. We will cover two cases, depending on whether the UE 214 initiates attachment towards the TWAN 218 or HeNB 220 of the ISWN 230.

HeNB-Based Unified Authentication/Attachment Procedure

In this section, we assume that the UE 214 will initiate the attachment to the ISWN 230 via the HeNB 220. Accordingly, we aim to have the UE 214 to be mutually authenticated with the HSS 210 via the MME 202. Furthermore, key materials for both E-UTRAN and WLAN 218 are to be derived. The unified procedure depends on running the AKA algorithm one time only taking into consideration the ISWN configuration parameters in Table 6.

Figure 12:
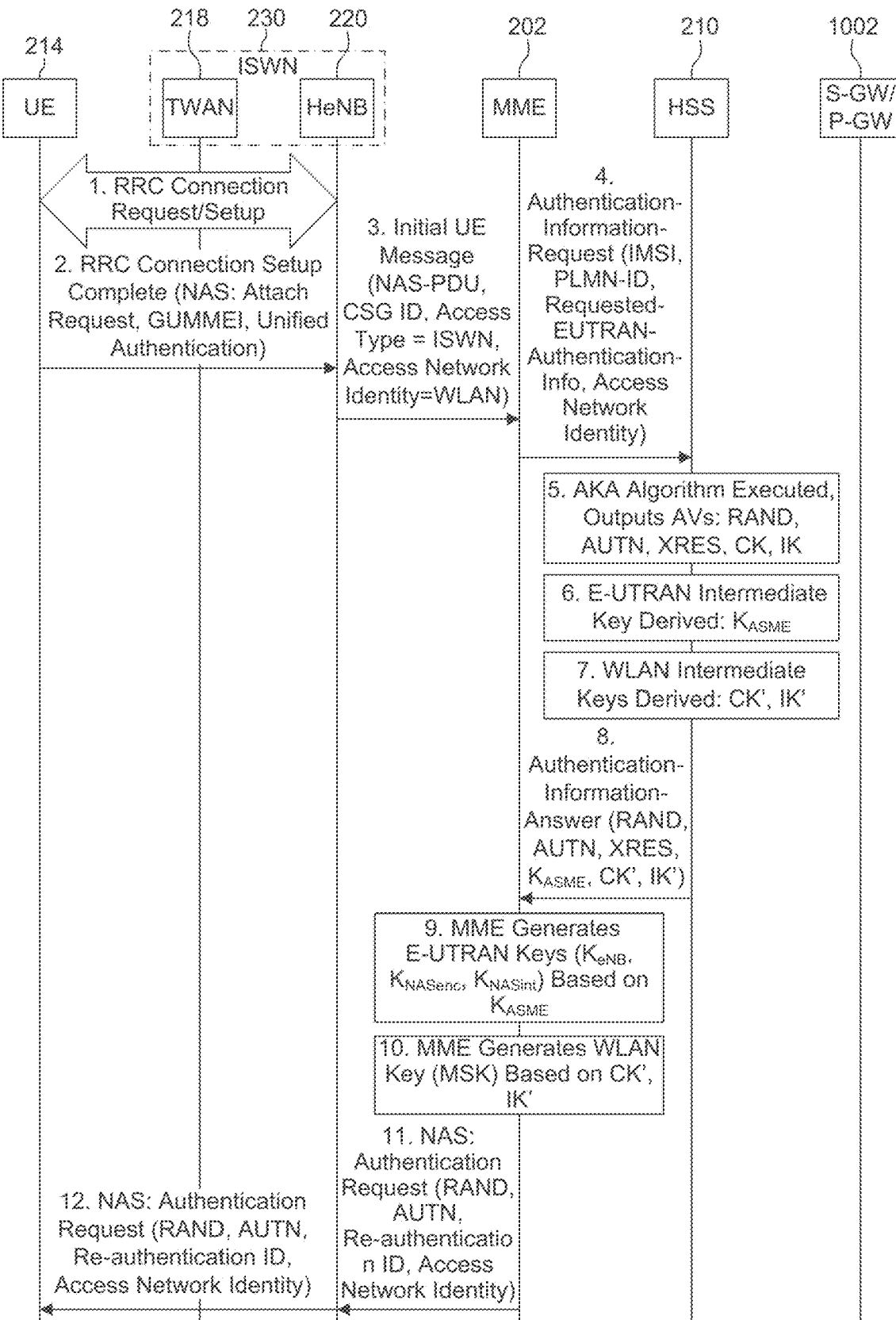
FIG. 12 is a diagram that illustrates a call flow of HeNB-based unified authentication/attachment procedure.
Figure 12:
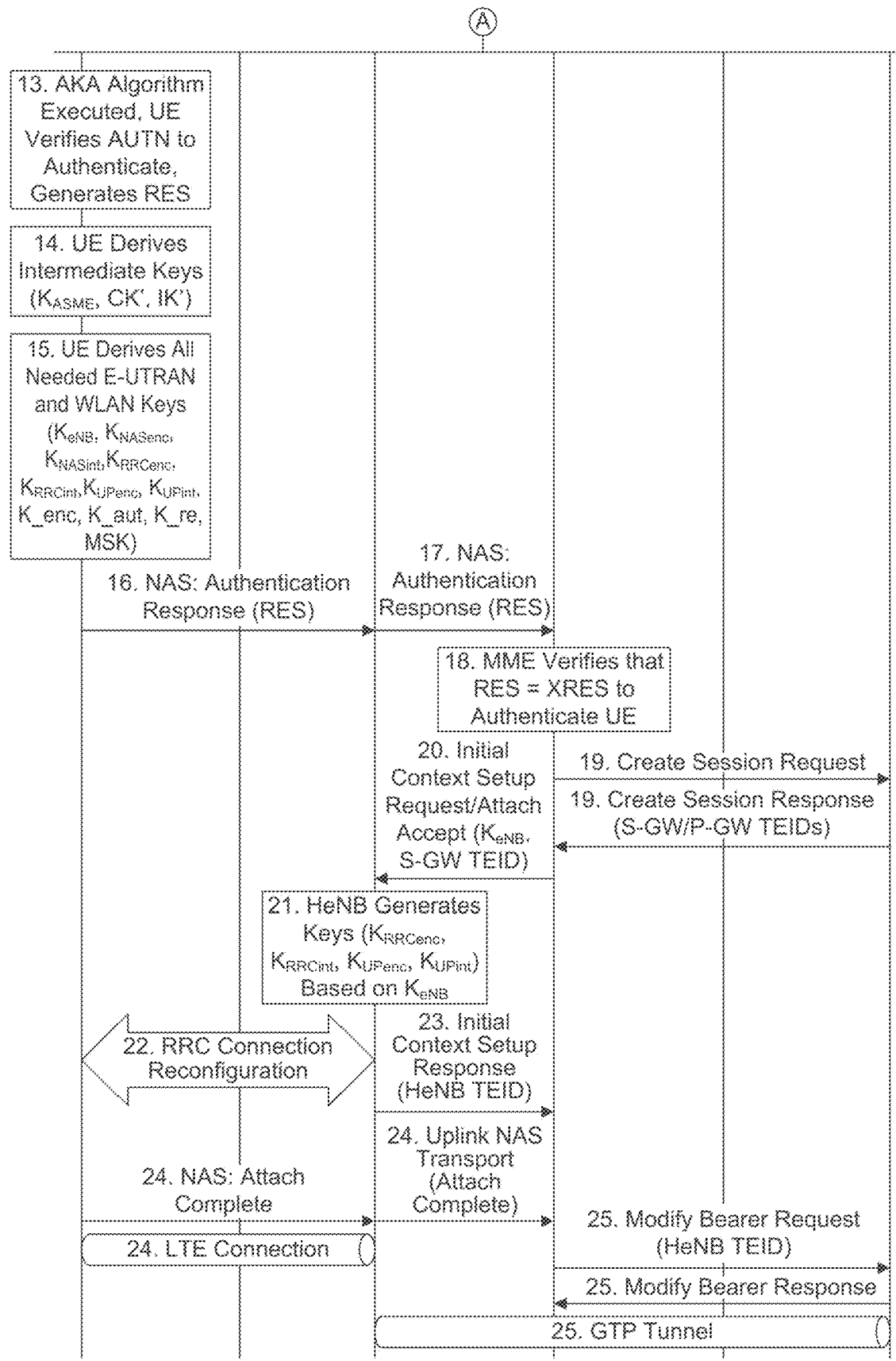

FIG. 12 depicts the call flow of the HeNB-based unified authentication/attachment procedure, and it can be described as follows.

In step 1 of FIG. 12, the UE 214 starts to establish the connection by conducting the "RRC Connection Establishment" procedure with the HeNB 220, as described in Clause 5.3.3 of 3GPP TS 36.331. More precisely, it sends "RRC Connection Request" message to the HeNB 220. In response, the HeNB 220 sends "RRC Connection Setup" message to the UE 214.

In step 2 of FIG. 12, consequently, the UE 214 sends the "RRC Connection Setup Complete" (NAS: Attach Request, GUMMEI, Unified Authentication) message to the HeNB carrying the NAS "Attach Request" (old GUTI, Old GUTI type, UE Core Network Capability, Attach Type, . . . etc.) contents. The list of the information elements included in the "Attach Request" message is mentioned in Clause 5.3.2 of 3GPP TS 23.401, and also listed in Table 8.2.4.1 of 3GPP TS 24.301. The Globally Unique Temporary Identity (GUTI), as defined in 3GPP TS 23.003, is allocated to the UE 214 by the MME 202. If the UE 214 does not have a valid old GUTI, the IMSI shall be included instead. The "UE Core Network Capability" information element includes the indication of supported AS and NAS security procedures. In addition to the "Attach Request" NAS contents, the "RRC Connection Setup Complete" message also carries RRC parameters indicating the Selected Network and the old Globally Unique MME Identifier (GUMMEI), as indicated in Clause 6.2.2 of 3GPP TS 36.331.

A new 'Unified Authentication' information element to the "RRC Connection Setup Complete" message. This new information element is used by the UE 14 to indicate its desire to the HeNB 220 to perform the unified authentication including the TWAN side of the ISWN too. We point out that by adding such IE, the UE 214 will be backward-compatible as it may perform the typical authentication procedure. Similarly, new information element, namely "Unified Authentication" is added in the "RRC Connection Setup" message from the HeNB 220 to the UE 214 in step 1 of FIG. 12. Such information element is used by the HeNB 220 to indicate its support for unified authentication procedure to the UE 214.

In step 3 of FIG. 12, the HeNB 220 extracts the MME 202 from the received "RRC Connection Setup Complete" message using the 'old GUMMEI' information element. Then, the HeNB 220 sends the "Initial UE message" (NAS-PDU, Selected Network, CSG ID, Access Type, Access Network Identity) message to the MME 202. The original S1-MME "Initial UE message" control message is presented in (Clause 8.6.2.1 of 3GPP TS 36.413). The CSG ID indicates the identifier of the Closed Subscriber Group (CSG).

We assume that the HeNB 220 sends some information about its integrated TWAN 218. Such information can be configured in both the HeNB 220 and TWAN 218 once the ISWN is established. More specifically, the HeNB 220 will send the "Initial UE message" message conveying the 'Access Type=ISWN' and 'Access Network identity=WLAN' to the MME 202. The 'Access Network identity=WLAN' represents the TWAN side (Table 8.1.1.2 of 3GPP TS 24.302). Furthermore, we define a new 'Access type' of ISWN to inform the MME 202 that the UE 214 is connected to an ISWN 230 (TWAN 218 and HeNB 220).

In step 4 of FIG. 12, in order to establish the EPS security parameters (authentication, NAS security setup), the MME 202 initiates the AKA procedure. In particular, the MME 202 sends "Authentication-Information-Request" (IMSI, PLMN-ID, Requested-EUTRAN-Authentication-Info, Access Type, Access Network Identity) message to the HSS 210. The PLMN-ID or the Serving Network Identity (SN ID) identity is equal to MCC+MNC. The standard AVPs of the "Authentication-Information-Request" message were shown previously in Table 1.

The "Authentication-Information-Request" message is extended to include 'Access Type=ISWN' and 'Access Network identity=WLAN' of the TWAN 218 side.

In step 5 of FIG. 12, upon receiving the "Authentication-Information-Request" message, the HSS 210 runs the AKA procedure. As a result, the HSS 210 generates an authentication vector (AV), which consists of RAND, XRES, CK, IK, and AUTN.

Figure 6:
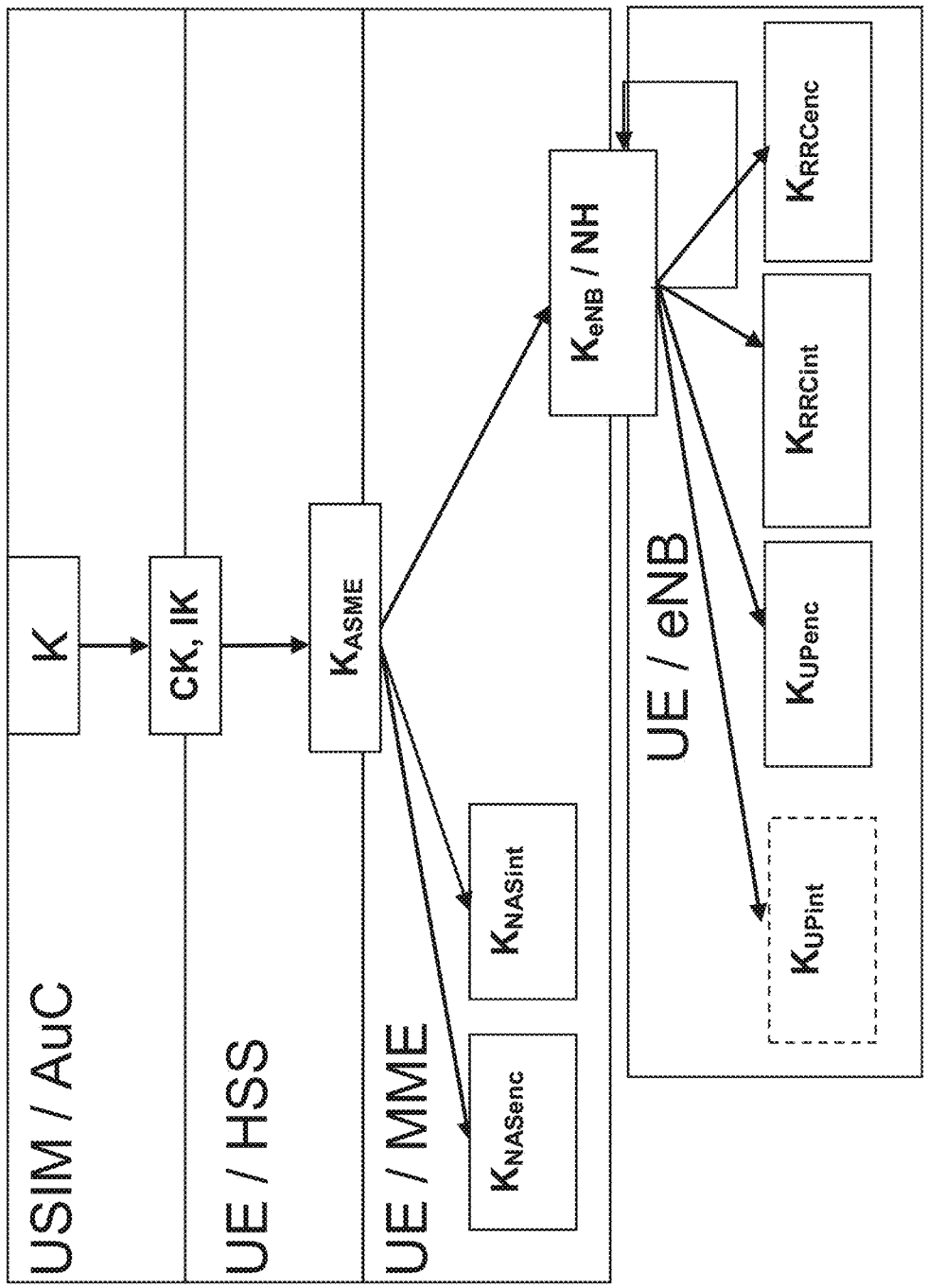
FIG. 6 is a diagram that illustrates a key hierarchy for E-UTRAN.

In step 6 of FIG. 12, in addition and for E-UTRAN, the set of CK, IK, and SN ID are fed to a cryptographic key derivation function (KDF) to generate a new key, namely, $K_{ASME}$, as was previously shown in FIG. 6.

Figure 7:
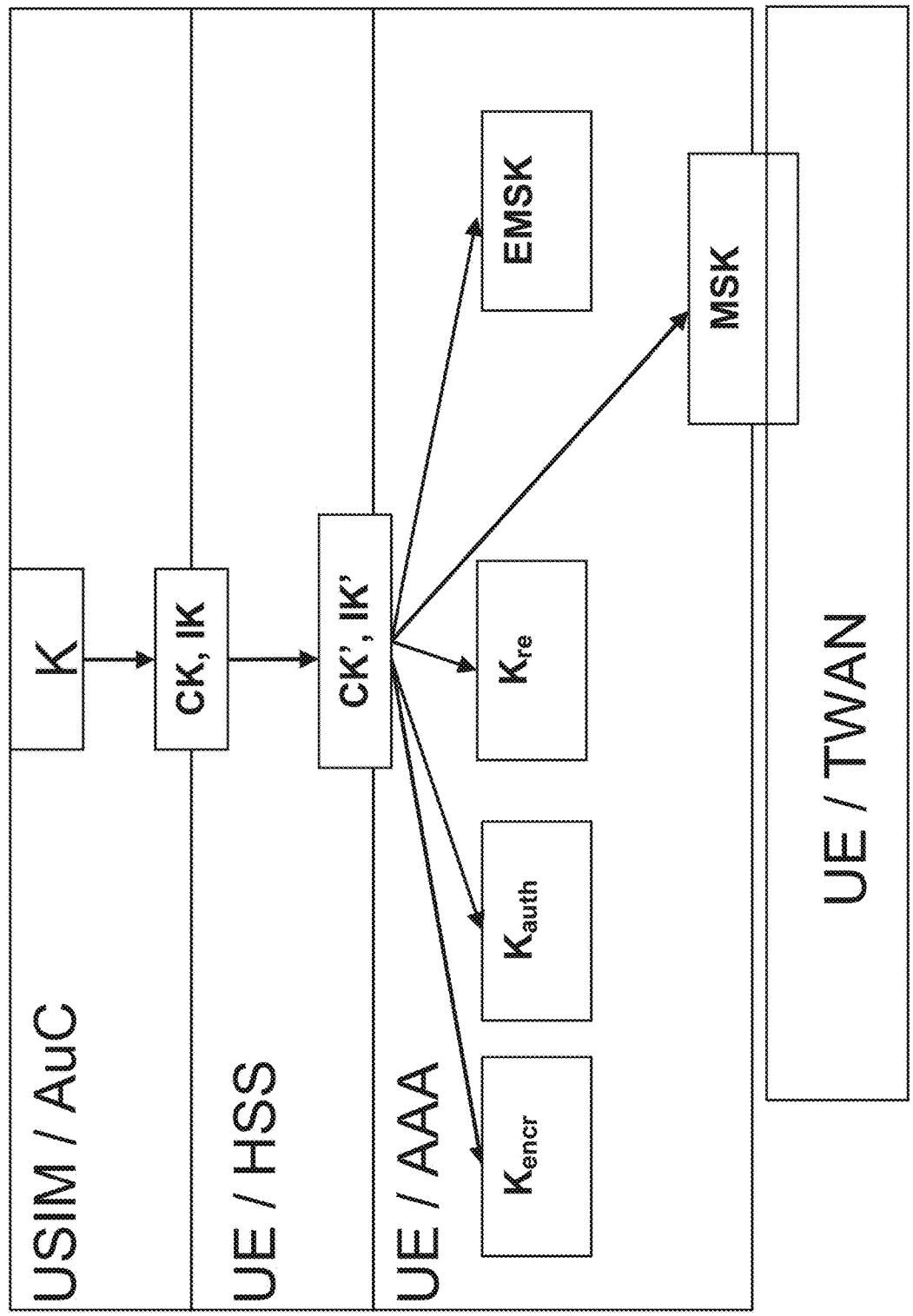
FIG. 7 is a diagram that illustrates a key hierarchy for TWAN.
Figure 8:
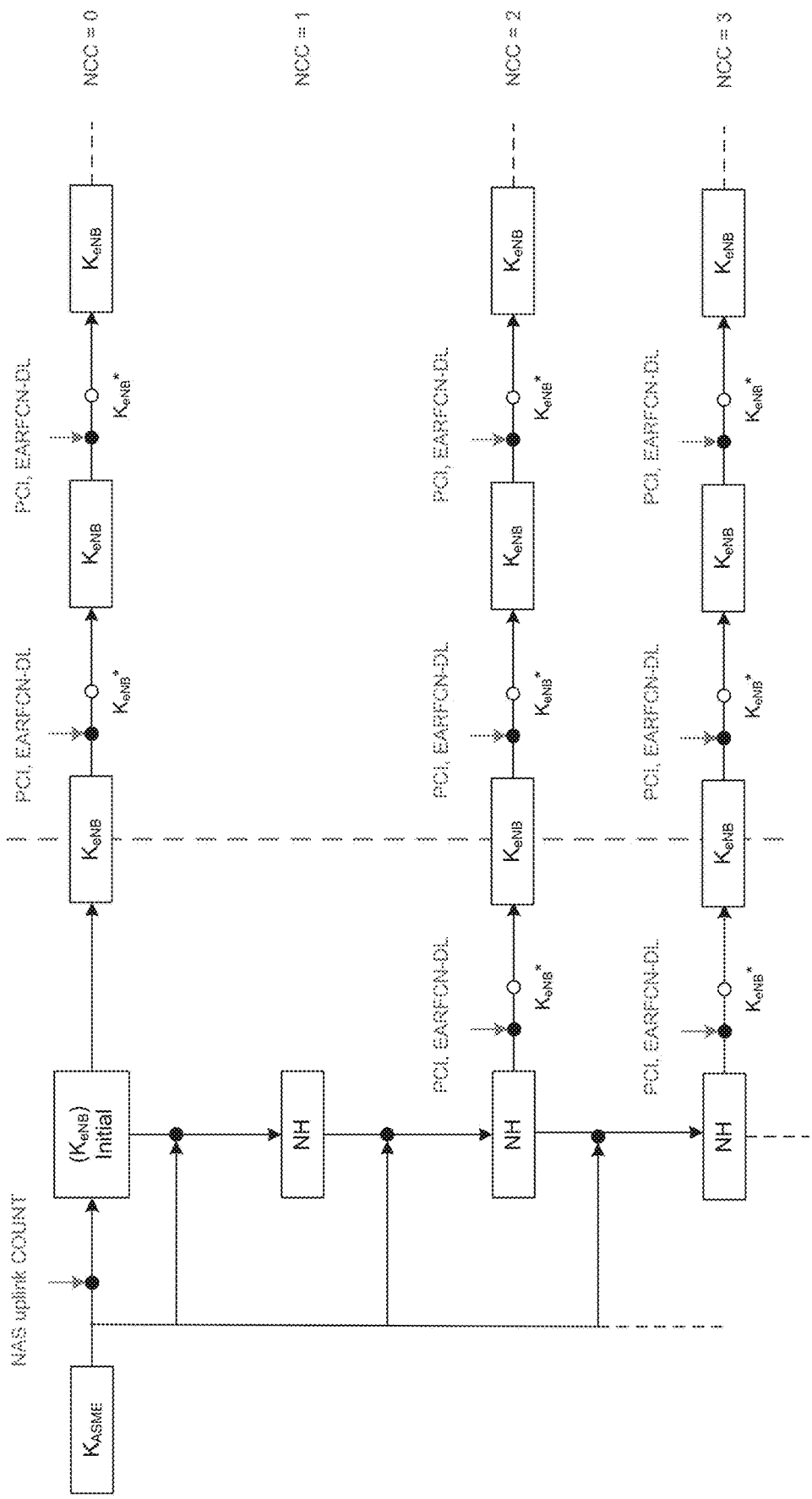
FIG. 8 is a diagram that illustrates a model for the handover key chaining.

In step 7 of FIG. 12, furthermore and for WLAN 218, the set of CK, IK, access network identity, and sequence number (SQN) are fed to a cryptographic KDF to generate a new pair of keys, namely, CK' and IK', as was previously shown in FIG. 7.

In step 8 of FIG. 12, once the HSS 210 generated the AVs and keys, it forwards them to the MME 202 in the "Authentication-Information-Answer" (RAND, AUTN, XRES, $K_{ASME}$, CK', IK', re-authentication ID) message. The standard AVPs of the "Authentication-Information-Answer" message were previously shown in Table 2.

Three information elements are added to the "Authentication-Information-Answer" message, which are CK' and IK'.

In step 9 of FIG. 12, the MME 202 generates the needed keys for NAS encryption ($K_{NASenc}$), NAS integrity ($K_{NASint}$), and also the HeNB security key ($K_{eNB}$). As was previously shown in FIG. 6, these keys are generated based on the intermediate key $K_{ASME}$, received earlier from the HSS 210 in step 8 of FIG. 12.

In step 10 of FIG. 12, similarly for the WLAN, the MME 202 generates all the needed keys for WLAN 218 presented in FIG. 7 namely, K_encr, K_aut, K_re, MSK, and EMSK. These keys are derived based on the intermediate keys CK' and IK', received earlier from the HSS in step 8 of FIG. 12.

The MME 202 can generates all the WLAN keys (K_encr, K_aut, K_re, MSK, and EMSK). Such a key generation function is moved from the 3GPP AAA Server 212 to the MME 202.

In step 11 of FIG. 12, once the AVs are received from the HSS 210 and the E-UTRAN and WLAN keys are generated, the MME 202 initiates mutual authentication process with the UE 214 by sending the NAS "Authentication Request" message. So first, the MME 202 sends the "Authentication Request" (RAND, AUTN, re-authentication ID, Access Network Identity) message to the HeNB 220. The complete list of Information Elements of the NAS "Authentication Request" message is shown in Table 8.2.7.1 of 3GPP TS 24.301. The re-authentication ID will be generated by the MME 202 to be used by the UE 214 in case it will connect later to the TWAN 218 side of the ISWN 230.

Two new information elements are added, which are the 'Access Network Identity' and 're-authentication ID' in the "Authentication Request" message. The 'Access Network Identity' information element conveys the WLAN access network identity to the UE (via HeNB). Such information element is needed at the UE to be used for WLAN key generation, in a similar fashion to 7 of FIG. 12.

In step 12 of FIG. 12, the HeNB 220 forwards the NAS "Authentication Request" message to the UE 214. The 're-authentication ID' will be stored at the UE 214 to be used later, whenever the UE 214 attempts to connect to the TWAN 218 of the ISWN 230.

In step 13 of FIG. 12, in response, the UE 214 runs the AKA algorithm described previously in FIG. 5. The UE 214 generates expected AUTN (or more specifically XMAC), RES, CK, and IK. First, the UE 214 verifies that the generated expected AUTN matches the received AUTN from the MME 202. If so, the UE 214 authenticates the network.

In step 14 of FIG. 12, similar to Steps 5 and 6 of FIG. 12, done at the HSS 210 side, the UE 214 uses the generated keys CK and IK along with other parameters such a SN ID' and 'Access Network Identity' (received from MME) to establish the intermediate keys $K_{ASME}$, CK', IK'. We note that the $K_{ASME}$ will be used to derive the E-UTRAN keys (as indicated in FIG. 6), while the CK', IK' will be used to derive the WLAN keys (as shown in FIG. 7).

In step 15 of FIG. 12, based on these intermediate keys, the UE 214 derives all the needed keys for the E-UTRAN and WLAN transmissions. First for the E-UTRAN (following FIG. 7), the UE 214 derives NAS encryption ($K_{NASenc}$), NAS integrity ($K_{NASint}$), RRC encryption key ($K_{RRCenc}$), RRC integrity key ($K_{RRCint}$), user plane encryption key ($K_{UPenc}$), and user plane integrity key ($K_{UPint}$). Second for the WLAN (following FIG. 7), the UE 214 derives the data encryption key (K_encr), MAC authentication key (K_aut), re-authentication key (K_re), Master Session Key (MSK), and Extended Master Session Key (EMSK).

In step 16 of FIG. 12, As the UE 214 has authenticated the network, it sends back the NAS "Authentication Response" (RES) message to the MME 202. The 'RES' information element was generated in Step 13 of FIG. 12 above. The complete list of the information elements of NAS "Authentication Response" message is tabulated in Table 8.2.8.1 of 3GPP TS 24.301.

In step 17 of FIG. 12, the HeNB 220 forwards the NAS "Authentication Response" (RES) message to the MME 202.

In step 18 of FIG. 12, once the MME 202 receives the 'RES', it compares it against the ARES' (received from HSS 210 in step 8 of FIG. 12). If verification is successful, the MME 202 authenticates the UE 214. Hence, mutual authentication between the UE 214 and network is successfully completed.

In step 19 of FIG. 12, the MME 202 initiates creating session towards the Serving GW (S-GW) 206 and PDN Gateway (P-GW) 208, by sending the standard "Create Session Request" message to the S-GW. In response, the P-GW 208 and S-GW 206 sends "Create Session Response" (S-GW TEID, P-GW TEIDs) message to the MME 202 identifying the Tunneling Endpoint Identifiers (TEIDs) to be used in the uplink transmissions from the HeNB 220.

In step 20 of FIG. 12, once the session towards the S-GW/P-GW 1002 is established, the MME 202 sends the HeNB 220 security key ($K_{eNB}$) to the HeNB 220 in the "Initial Context Setup Request/Attach Accept" ($K_{eNB}$) message. This message includes also the TEID and address of the S-GW, to be used in uplink transmission. It also includes EPS Bearer Identity, NAS SQN, and NAS-MAC. NAS SQN indicates the sequential number of the NAS message and NAS-MAC is the Message Authentication Code (MAC) for NAS for Integrity. For example, The TAU Request message shall be integrity protected by the NAS-MAC as described in 3GPP TS 33.401.

In step 21 of FIG. 12, upon receiving the "Attach Accept" message including the security key ($K_{eNB}$) from the MME 202, the HeNB 220 following FIG. 6 derives the E-UTRAN RRC and user plan keys, namely, $K_{RRCenc}$, $K_{RRCint}$, $K_{UPenc}$, and $K_{UPint}$.

Figure 5:
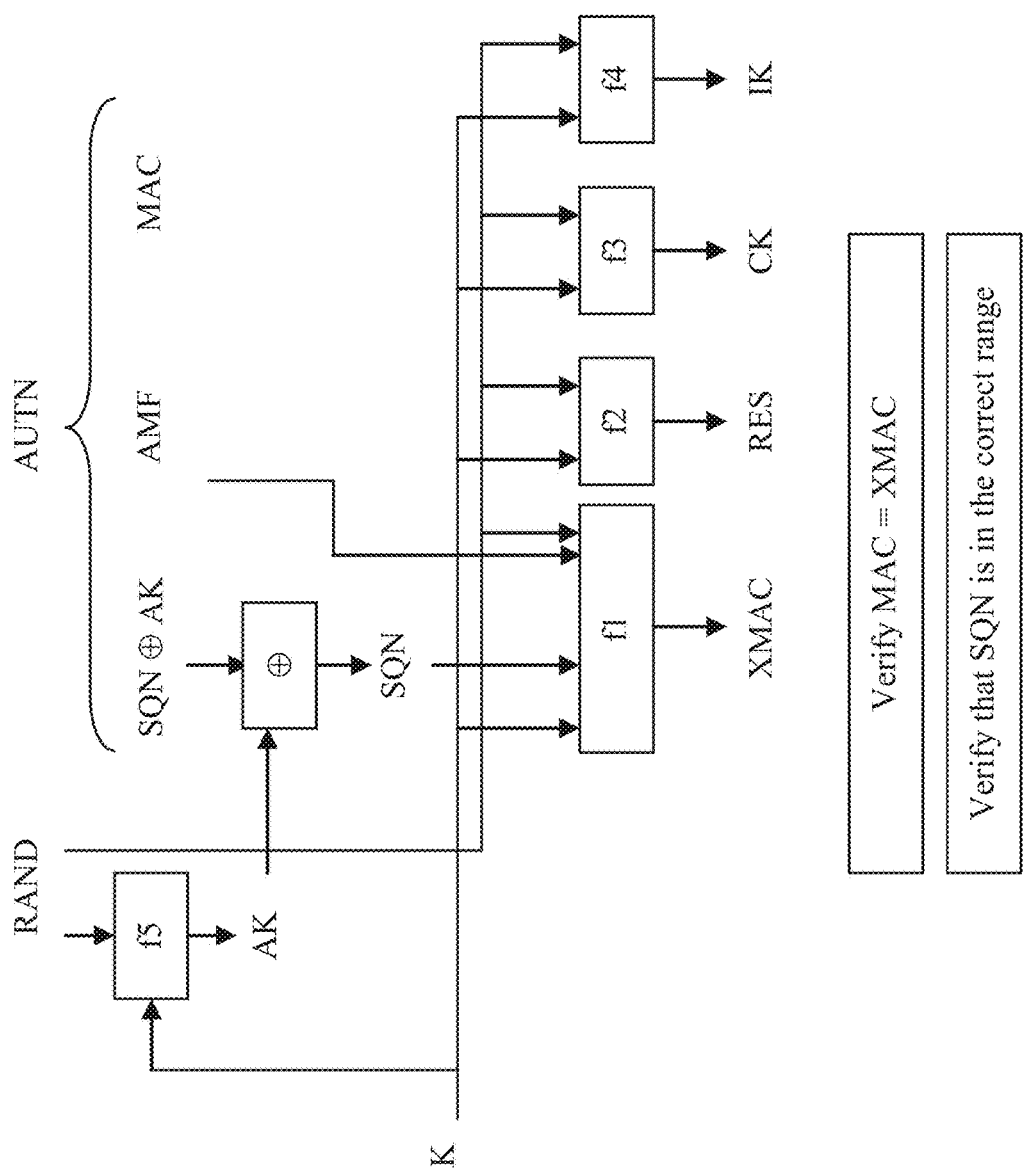
FIG. 5 is a diagram that illustrates a user authentication function in the USIM

In step 22 of FIG. 12, the HeNB 220 initiates the RRC connection reconfigurations procedure towards the UE 214 by sending the standard "RRC Connection Reconfiguration" message and getting back the standard "RRC Connection Reconfiguration Complete" message. FIG. 5.3.2.1-1 (Steps 18, 19) of 3GPP TS 23.401 explains these messages in details.

In step 23 of FIG. 12, once the RRC connection is reconfigured, the HeNB 220 replies to the MME 202 by sending "Initial Context Setup Response" (HeNB TEID, HeNB address) message. This message conveys the TEID and address of the HeNB 220 to be used for downlink traffic.

In step 24 of FIG. 12, to complete the E-UTRAN attachment, the UE 214 sends the NAS "Attach Complete" message the MME 202. More specifically, the UE 214 sends the "Attach Complete" (EPS Bearer Identity, NAS SQN, NAS-MAC) message to the HeNB 220. Then, the HeNB 220 forwards the NAS "Attach Complete" message to the MME 202 in an "Uplink NAS Transport" message. LTE transmissions between the UE 214 and HeNB 220 can now start.

In step 25 of FIG. 12, finally to establish the user plane tunnel for the downlink, the MME 202 conveys the HeNB TEID to the S-GW 206 in the "Modify Bearer Request" (HeNB TEID) message to the S-GW 206. The S-GW 206 confirms by sending back by the "Modify Bearer Response" message. Now, a GTP tunnel is established between the HeNB 220 and S-GW/P-GW.

TWAN-Based Unified Authentication/Attachment Procedure

In this section, we assume that the UE 214 attempts to connect to the ISWN 230 via its TWAN 218 side. Similar to the unified authentication idea, presented in FIG. 12, the UE 214 aims to have unified authenticated with both TWAN 218 and HeNB 220. More precisely, first the UE 214 will establish EAP authentication with the TWAN 218. However and as opposed to the standard TWAN's transmission towards the 3GPP server, the TWAN 218 will communicate with the MME 202 to convey the authentication request over a new STb reference point. The Diameter protocol will be utilized over the STb reference point using two Diameter-based messages, namely, "Diameter-EAP-Request" and "Diameter-EAP-Answer" messages.

Figure 13:
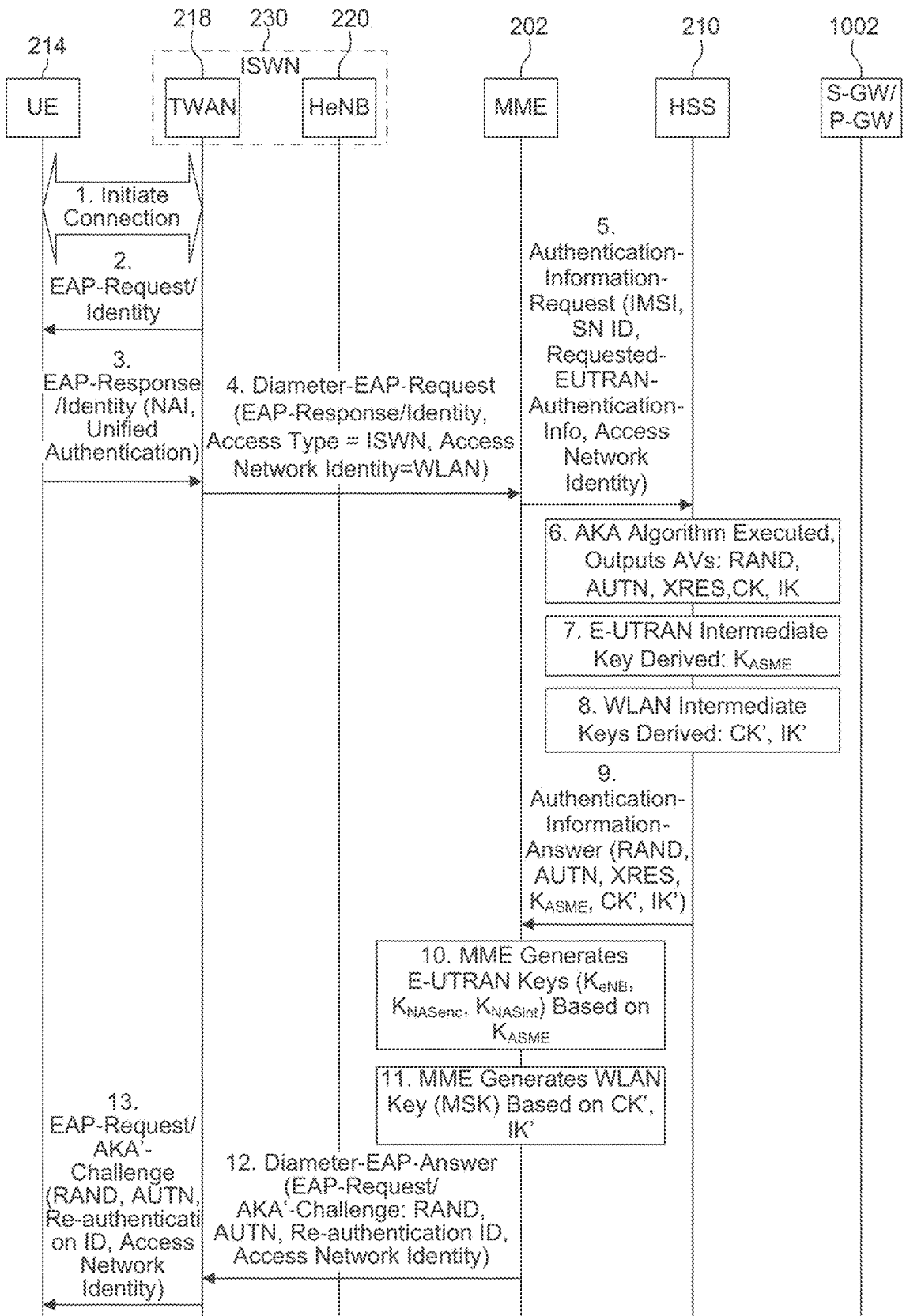
FIG. 13 is a diagram that illustrates a call flow of a TWAN-based unified authentication/attachment procedure.
Figure 13:
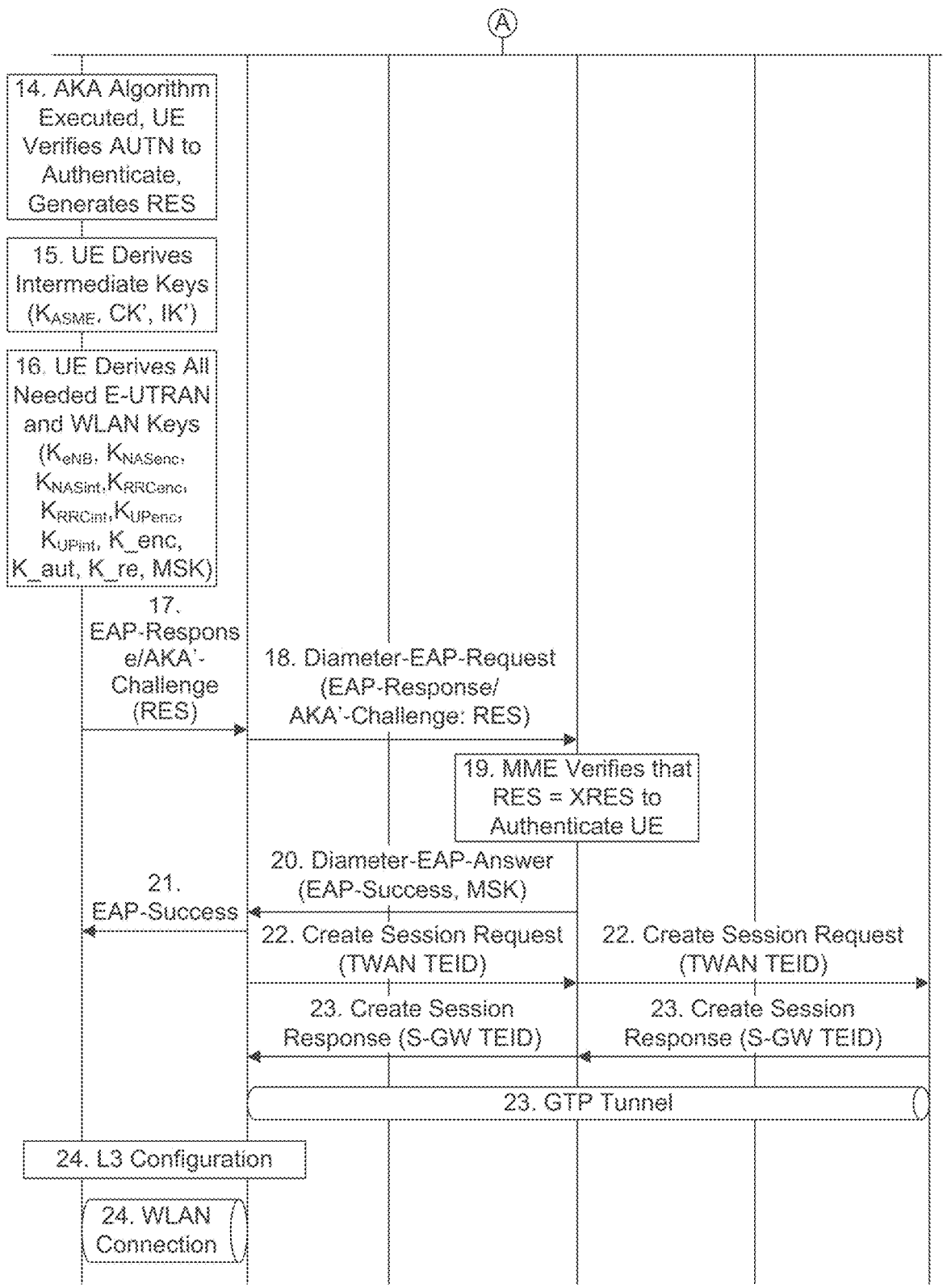

The standard AKA algorithm will be applied involving the HSS 210, MME 202, TWAN 218, and UE 214. Both the UE 214 and MME 202 will generate the needed keys to be used in the TWAN transmission. We notice that the 3GPP AAA Server 212 is not needed any more. FIG. 13 depicts the call flow of the TWAN-based unified authentication and attachment procedure.

The call flow in FIG. 13 can be described as follows.

In step 1 of FIG. 13, a connection is initiated between the UE 214 and the TWAN 218 according to IEEE 802.11 standards.

In step 2 of FIG. 13, as a first step for authentication, the TWAN 218 (specifically the TWAP) sends "EAP-Request/Identity" message to the UE 214 according to EAP-AKA' protocol, defined in the IETF RFC 5448.

In step 3 of FIG. 13, in response to the identity request, the UE 214 sends "EAP-Response/Identity" (NAI, Unified Authentication) message to the TWAN indicating its Network Access Identifier (NAI), (IETF RFC 4282, 3GPP TS 23.003). The NAI is either an allocated pseudonym if the UE 214 has been authenticated before. Otherwise the NAI is the IMSE in case of first authentication.

The EAP "EAP-Response/Identity" message can be extended by adding a 'Unified Authentication' information element. The 'Unified Authentication' information element is an indicator from the UE 214 that it needs to perform the ISWN-based unified authentication including both the TWAN 218 and HeNB 220 sides of the ISWN 220. We point out that the EAP messages can be extended as was done previously to include 'handover indicator' for example (Clause 16.1.4A.2 in 3GPP TS 23.402).

In step 4 of FIG. 13, as this TWAN 218 is part of an ISWN 230, the TWAN 218 can carry the identification information of itself and its ISWN 230 as well to the MME 202. More specifically, the TWAN 218 sends "Diameter-EAP-Request" (EAP-Response/Identity=NAI, Access Type=ISWN, Access Network Identity=WLAN) message to the MME 202. By including the ISWN Access Type, the MME 202 is made aware that a multi-RAT UE 214, attached to a TWAN 218, is trying to be authenticated to both the TWAN 218 and HeNB 220 of the ISWN 230.

A new message over the STb reference point is added, namely, "Diameter-EAP-Request" message, which is similar to the one defined over STa (between AAA Server and TWAP) in IETF RFC 4072. Furthermore, the 'Access Type=ISWN' and 'Access Network Identity=WLAN' can be added to the "Diameter-EAP-Request" message.

Steps 5-11 of FIG. 13 are similar to steps 4-10 of FIG. 12. These steps include the communication between MME 202 and HSS 210 regarding the request of authentication vectors. In addition, these steps also include the key generations of the E-UTRAN and TWAN 218 at the HSS 210 and MME 202.

In step 12 of FIG. 13, as the authentication vectors are available at the MME 202, it sends the "Diameter-EAP-Answer" (EAP-Request/AKA'-Challenge) message to the TWAN 218. The "EAP-Request/AKA'-Challenge" payload includes (RAND, AUTN, re-authentication ID, Access network Identity) needed for the authentication and key generation at the UE 214. The re-authentication ID will be used as the UE's identity in any upcoming fast re-authentication requests.

A new message is added over the STb reference point, namely, "Diameter-EAP-Answer" message, which is similar to the one defined over STa (between AAA Server 212 and TWAP 224) in the IETF RFC 4072. No new AVPs are added to the "Diameter-EAP-Answer" message.

In step 13 of FIG. 13, the TWAN 218 (particularly, the TWAP 224) forwards the EAP-Request/AKA'-Challenge (RAND, AUTN, re-authentication ID, Access network Identity) to the UE 214.

In steps 14-16 of FIG. 13, similar to steps 13-15 in FIG. 12, the UE 214 runs the AKA algorithm to generate AUTN and also the needed keys for WLAN and E-UTRAN in steps 14-16. The UE 214 authenticates the network by comparing the received AUTN with its own generated one. Finally, the UE 214 generates RES to be sent to the MME 202.

In step 17 of FIG. 13, as the network is authenticated by the UE 214, the UE 214 responds by sending "EAP-Response/AKA'-Challenge" (RES) message to the TWAN 218 (specifically, the TWAP 224).

In step 18 of FIG. 13, the TWAN forwards the EAP "EAP-Response/AKA'-Challenge" (RES) message, contained in "Diameter-EAP-Request" to the MME 202 over the new STb reference point.

In step 19 of FIG. 13, the MME 202 authenticates the UE 214 in a similar fashion to step 18 of FIG. 12.

In step 20 of FIG. 13, once the UE 214 is authenticated, the MME 202 sends "Diameter-EAP-Answer" (EAP-Success, EAP-Master-Session-Key) message to TWAN carrying the EPS payload (EAP-Success) to indicate the success of the EAP authentication. Furthermore, this message conveys the 'EAP-Master-Session-Key' (MSK) AVP to the TWAN 218, to be used between the UE 214 and TWAN 218 in their further communication.

In step 21 of FIG. 13, to complete the authentication procedure, the TWAN 218 forwards the "EAP-Success" message to the UE 214.

In step 22 of FIG. 13, in order to create the session, the TWAN 218 sends "Create Session Request" (TWAN TEID) message to the MME 202 over the S1-MME reference point, which is forwarded to the S-GW 206 and P-GW 208.

In step 23 of FIG. 13, in response, the P-GW/S-GW sends "Create Session Response" (S-GW TEID) message to the MME 202, which is forwarded to the TWAN 218 (over the S1-MME reference point). A GTP tunnel is now established between the TWAN 218, S-GW 206, and P-GW 208.

In step 24 of FIG. 13, the UE 214 may send standard layer 3 attach request, (e.g. a DHCPv4 request). In response, a DHCPv4 message with allocated IPv4 address is sent to the UE. WLAN communication using IEEE 802.11 standards is now established between the UE 214 and TWAN 218.

Fast Re-Authentication in Inter-RAT Handover Procedures

Fast Re-Authentication in Intra-ISWN HeNB-to-TWAN Handover Procedure

Figure 14:
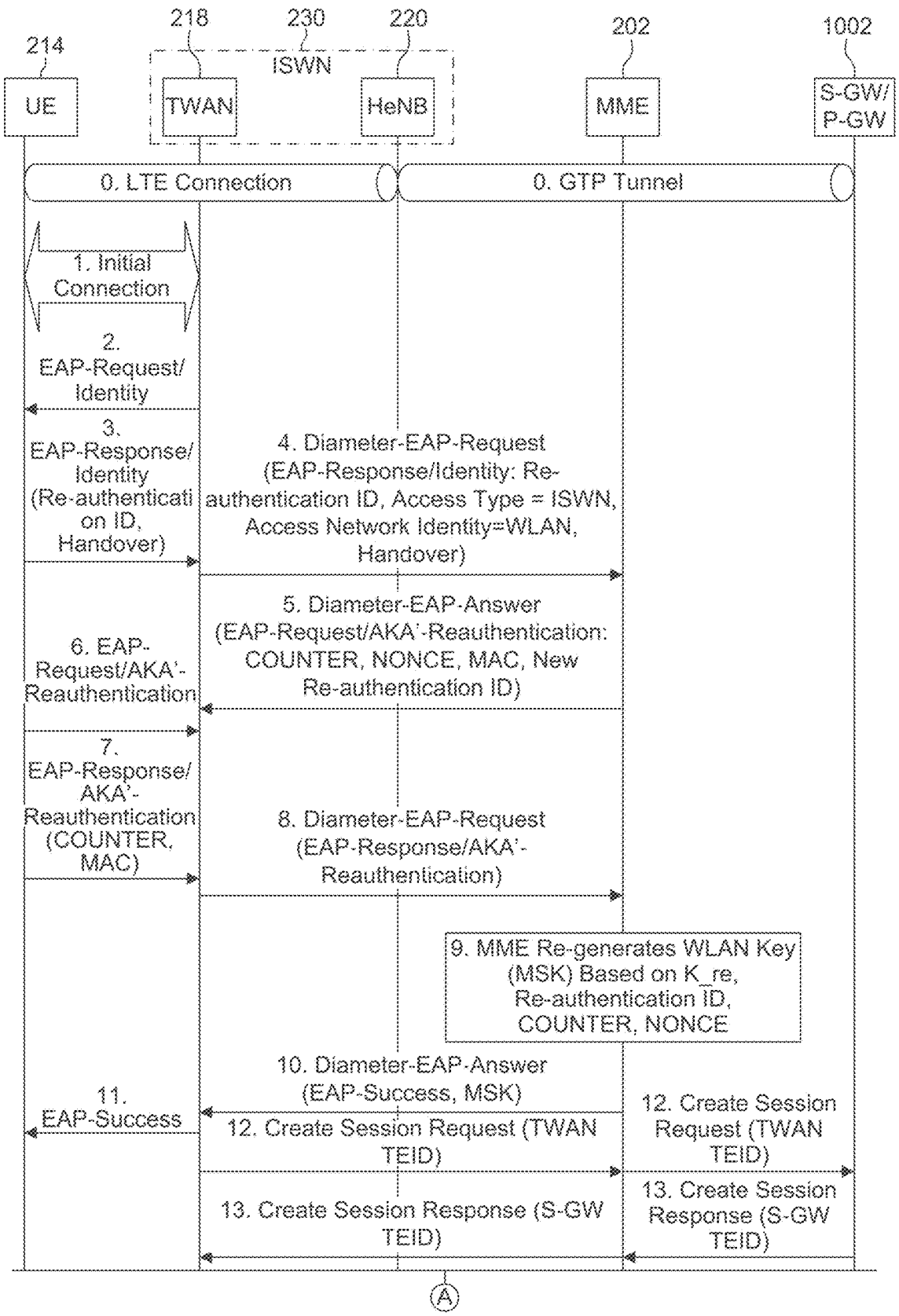
FIG. 14 is a diagram that illustrates a call flow of a HeNB-to-TWAN handover with fast re-authentication procedure.
Figure 14:
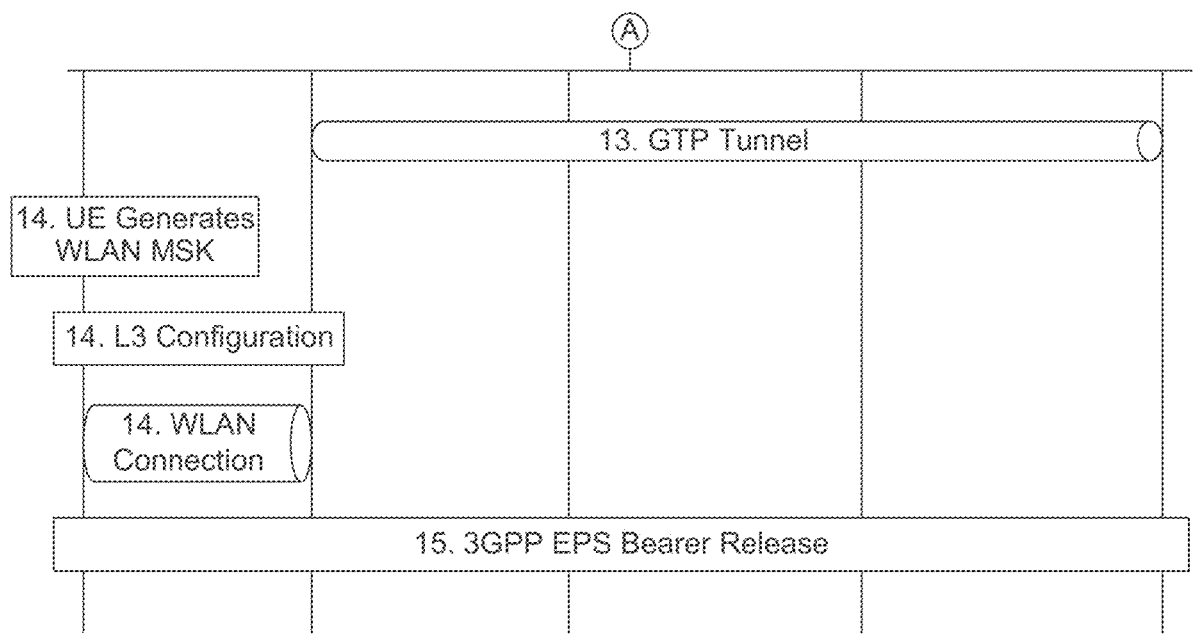

In this section, we consider a scenario in which a UE 214 has initially performed unified authentication by attaching to HeNB 220. Then, the UE 214 decides to switch to WLAN 218. As the UE 214 has been already authenticated with the HSS 210, there is no need to run the full authentication procedure again. Instead, the UE 214 and MME 202 need to run fast re-authentication only, in which only new keys for the WLAN access networks (e.g. MSK) are generated. FIG. 14 depicts the call flow for the fast re-authentication procedure in the HeNB-to-WLAN handover scenario within the same ISWN 230. As will be shown, there is no need to generate new authentication vectors.

The MME 202, not the TWAN 218, will be the responsible network entity for generating the new WLAN keys (e.g. MSK). This is in agreement with the 3GPP guidelines, which typically allow the AAA Server (not TWAN 218) to perform fast re-authentication (Clause 6.3 of 3GPP TS 33.402) or MME 202 (not HeNB 220) to generate intra-LTE E-UTRAN handover keys (Section 212).

The call flow in FIG. 14 can be described as follows.

In step 0 of FIG. 14, an LTE connection already exists between the UE 214, HeNB 220, and S-GW/P-GW. The HeNB 220 is assumed to be part of an ISWN. Furthermore, a unified authentication procedure with the ISWN 230, including both the HeNB 220 and WLAN 218, has been initially done according to the new procedure discussed above.

In step 1 of FIG. 14, the UE 214 decides to make inter-RAT handover to the TWAN 218, within the same ISWN. Accordingly, the UE 214 initiates a connection with the TWAN 218.

In step 2 of FIG. 14, as a first step from the TWAN 218 side, it sends "EAP-Request/Identity" message to the UE 214 to inquire after the UE's identity.

In step 3 of FIG. 14, in response, the UE 214 replies by sending "EAP-Response/Identity" (re-authentication ID, handover) message to the TWAN 218. In this message, the UE 214 indicates its identity using the re-authentication ID, which was sent to it in the preceded initial unified authentication procedure (Step 12 in FIG. 12). Furthermore, it indicates that it is making a handover towards TWAN 218. We note that the EAP-AKA' has been previously extended to carry 'handover indicator' and the 'requested APN' information elements (Clause 16.1.4A.2 in 3GPP TS 23.402). Therefore, we are making use of this EAP extension in this step by including the 'handover indicator'.

In step 4 of FIG. 14, the TWAN 218 carries over the received message to the MME (over the new STb reference point) by sending the "Diameter-EAP-Request" (EAP-Response/Identity: re-authentication ID, Access Type=ISWN, Access Network Identity=WLAN, Access Network Identity, Handover). This message indicates to the MME 202 that an existing UE 214 (recognized by its re-authentication ID) aims to make a handover to the WLAN 218 side of its ISWN 230.

In step 5 of FIG. 14, the MME 202 receives the 're-authentication ID' information element, it decides to use the fast re-authentication procedure. Therefore, it will skip steps 5-10 in FIG. 13. Then, the MME 202 sends "Diameter-EAP-Answer" (EAP-Request/AKA'-Reauthentication: COUNTER, NONCE, MAC, re-authentication ID) message to the TWAN 218 over the new STb reference point. In this message, the MME 202 includes a fresh COUNTER value (it was initialized to one in the full authentication procedure), NONCE, MAC, and new re-authentication ID. The MAC is calculated over NONCE and the new re-authentication ID will be used in the next fast re-authentication. These attributes follow the standard "EAP-Request/AKA'-Reauthentication" EAP message.

In step 6 of FIG. 14, once the TWAN 218 receives the message above, it forwards the "EAP-Request/AKA'-Reauthentication" message to the UE 214 including its payload (COUNTER, NONCE, MAC, re-authentication ID).

In step 7 of FIG. 14, upon receiving the message, the UE 214 verifies that the counter has fresh value and that the MAC is calculated correctly. Then, the UE 214 responds by sending "EAP-Response/AKA'-Reauthentication" (COUNTER, MAC) message to the TWAN 218. The COUNTER is the same as was received from the MME 202 and the MAC is calculated over EAP packet and NONCE (as received from the MME 202). These attributes follow the standard "EAP-Response/AKA'-Reauthentication" EAP message defined in Clause 9.8 of IETF RFC 4187.

In step 8 of FIG. 14, the TWAN 218 embeds the received EAP payload from the UE 214 into the "Diameter-EAP-Request" (EAP-Response/AKA'-Reauthentication) message and send it to the MME 202 over the new STb reference point.

In step 9 of FIG. 14, the re-authentication response is received, the MME 202 re-generates the WLAN Master Session Key (MSK). The new MSK is generated based on the re-authentication key ($K\_re$), re-authentication ID, COUNTER, and NONCE.

In step 10 of FIG. 14, the MME 202 sends the "Diameter-EAP-Answer" (EAP-Success, MSK) message to the TWAN 218 over the new STb reference point. Accordingly, the TWAN 218 will store the MSK to be used in its transmission with the UE 214.

In step 11 of FIG. 14, to complete the fast re-authentication procedure, the TWAN 218 forwards the "EAP-Success" message to the UE 214.

In step 12 of FIG. 14, furthermore, the TWAN 218 sends "Create Session Request" (TWAN TEID) to the MME 202 over the S1-MME reference point, which is forwarded to the S-GW 206 and P-GW 208.

In step 13 of FIG. 14, as a response and given the 'Handover' indication, the P-GW 208 re-allocates the same IP address to the UE 214. Then, it sends "Create Session Response" to the S-GW 206, which is forwarded to the MME 202, and finally to the TWAN 218 (over the S1-MME reference point). As a result, a GTP tunnel is established between the TWAN 218, S-GW 206, and P-GW 208.

In step 14 of FIG. 14, once the UE 214 receives the "EAP-Success: message from the TWAN, it generates the new WLAN MSK, similar to step 9 of FIG. 14. Furthermore, the UE 214 may send standard layer 3 attach request, (e.g. a DHCPv4 request). In response, a DHCPv4 message with allocated IPv4 address is sent to the UE. As a result, the handover is now complete and the UE 214 has a WLAN connection with the TWAN 218.

In step 15 of FIG. 14, finally, the 3GPP EPS bearer release procedure is initiated by the PGW 208. More specifically, the P-GW 208 Initiated PDN Disconnection procedure, described in clause 5.6.2.2 of 3GPP TS 23.402 is performed.

An alternative mechanism is described below, which describes an optimized re-authentication mechanism based on EAP-Re-authentication Protocol (EAP-RP) (RFC 6696). The EAP-RP protocol may be carried out after a full EAP authentication or an AKA authentication protocol or for that matter any full authentication protocol. EAP-RP achieves re-authentication using a single round-trip. Similar mechanisms may be used to perform the re-authentication such as One-Round-Trip Authentication (ORTA) may be employed. EAP-FAST mechanisms may also be employed.

Mechanisms such as ORTA may be employed in order further reduce the latency involved in Authentication/IP address assignment. ORTA makes use of an ORTA ID, so that a full authentication procedure is avoided and the UE may be able to optionally request for an IP address assignment using the ORTA messages without having to explicitly start a DHCP message after the EAP authentication has been carried out in a serial manner. Using ORTA, the DHCP process is either carried out implicitly or explicitly using ORTA messaging in a parallel manner.

The call flow in FIG. 15 can be described as follows.

Figure 15:
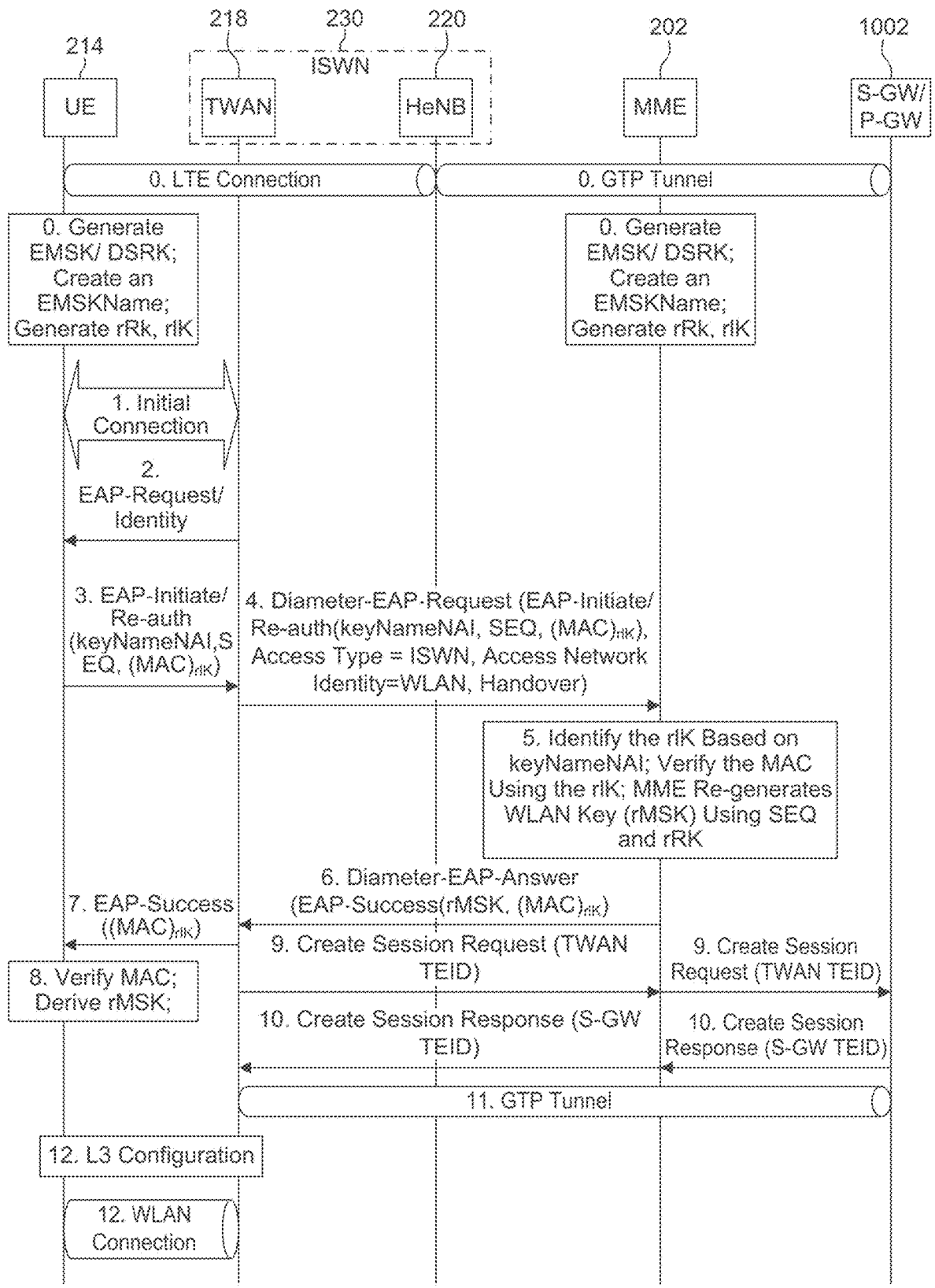
FIG. 15 is a diagram that illustrates a call flow of re-authentication based on EAP-RP.

In step 0 of FIG. 15, we assume that an LTE connection already exists between the UE 214, HeNB 215, and S-GW/P-GW 1002. The HeNB 220 is assumed to be part of an ISWN 230. Furthermore, a unified authentication procedure with the ISWN 230, including both the HeNB 220 and WLAN 218, has been initially done according to the new procedure discussed with respect to FIG. 12. As a result of the authentication process, a context for Re-authentication is created based on the EAP-RP protocol. An Extended Master Session Key (EMSK) that is generated as part of the EAP authentication may be used to generate a Re-authentication Root Key (rRK), which may be associated with the re-authentication context information identified by an EMSK-Name/keyNameNAI. Derivative keys based on the rRK, such as Re-authentication Integrity Key (rIK) and other associated keys may be generated at both the UE and at the MME 202. Domain-specific (e.g. DS-rRK) and associated keys (e.g. DS-rIK. DS-rCK) may also be generated.

In step 1 of FIG. 15, we assume that the UE 214 decides to make inter-RAT handover to the TWAN 218, within the same ISWN 230. Accordingly, the UE 214 initiates a connection with the TWAN 218.

In step 2 of FIG. 15, as a first step from the TWAN side, it sends "EAP-Request/Identity" message to the UE 214 to inquire after the UE's identity. This may be optional or replaced with a particular EAP re-authentication request identity message.

In step 3 of FIG. 15, the UE "EAP-Initiate/Re-auth/bootstrap" (keyNameNAI, SEQ, MAC) message to the TWAN 218. In this message, the UE 214 indicates the re-authentication context, keyNameNAI, which was generated as part of the preceding initial unified authentication procedure (Step 12 in FIG. 12). Furthermore, it indicates that it is making a handover towards TWAN 218. The "handover" indication may be explicit or implicit. If fresh and valid keys are not present that is associated with the particular TWAN 218, then the UE 214 may initiate this process even if a handover has not occurred. A Message Authentication Code or an Authentication Tag is created using mechanisms described in EAP-RP protocol. The SEQ value as well as the rIK is used along with the message in order to create the MAC/Auth Tag.

In step 4 of FIG. 15, the TWAN 218 carries over the received message to the MME 202 (over the new STb reference point) by sending the "Diameter-EAP-Request" (EAP-Initiate/Re-auth/bootstrap: keyNameNAI, Access Type=ISWN, Access Network Identity=WLAN, Access Network Identity, SEQ, MAC). This message indicates to the MME 202 that an existing UE (recognized by its keyNameNAI) aims to make a handover to the WLAN side of its ISWN 230.

In step 5 of FIG. 15, based on the keyNameNAI, received by the MME 202, the MME 202 checks for the re-authentication context information and obtains the rIK associated with the EMSKName. The MME 202 verifies the MAC/Auth Tag using mechanisms described by the EAP-RP protocol. The MME 202 generates an rMSK using the SEQ and the rRK.

In step 6 of FIG. 15, the MME 202 creates a "Diameter-EAP-Answer" (EAP-Success (rMSK, MAC)) and sends it to the TWAN 218.

In step 7 of FIG. 15, once the TWAN 218 receives the message, it stores the rMSK and then forwards the "EAP-Success" (MAC) message to the UE 214 including its payload that contains the MAC/Auth Tag.

In step 8 of FIG. 15, upon receiving the message, the UE 214 verifies that the SEQ is in order and that the MAC is calculated correctly. The UE 214 then derives the rMSK using similar mechanisms as the MME 202. Other relevant TWAN-specific keys are derived in order to protect the 802.11 messages.

In step 9 of FIG. 15, furthermore, the TWAN 218 sends "Create Session Request" (TWAN TEID) to the MME 202 over the S1-MME reference point, which is forwarded to the S-GW 206 and P-GW 208.

In step 10 of FIG. 15, as a response and given the 'Handover' indication, the P-GW 208 re-allocates the same IP address to the UE 214. Then, it sends "Create Session Response" to the S-GW 206, which is forwarded to the MME 202, and finally to the TWAN 218 (over the S1-MME reference point). As a result, a GTP tunnel is established between the TWAN 218, S-GW 206, and P-GW 208.

In steps 11-12 of FIG. 15 follow from the previous message flows.

Fast Re-Authentication in Intra-ISWN TWAN-to-HeNB Handover Procedure

Figure 16:
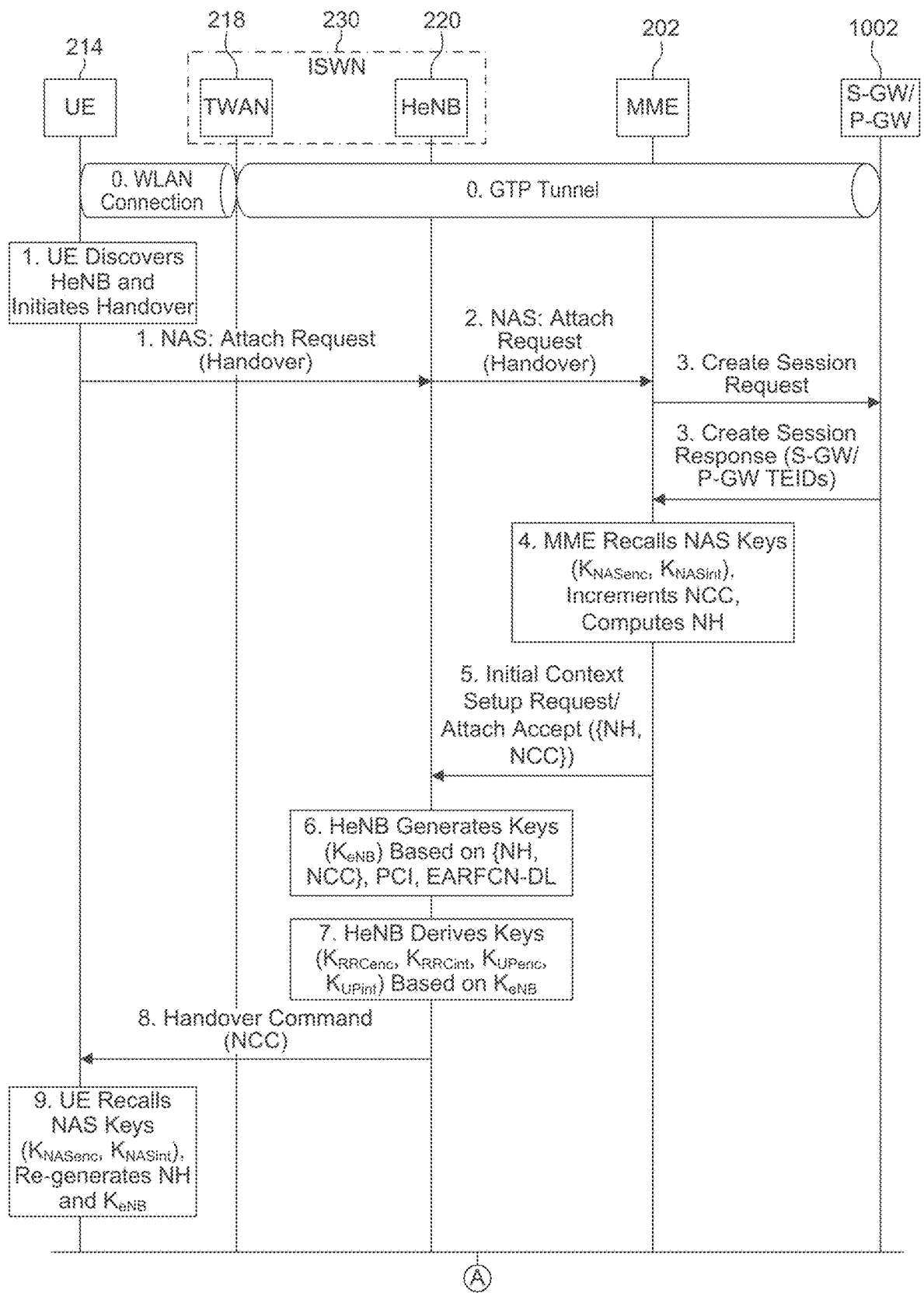
FIG. 16 is a diagram that illustrates a call flow of a TWAN-to-HeNB handover with fast re-authentication procedure
Figure 16:
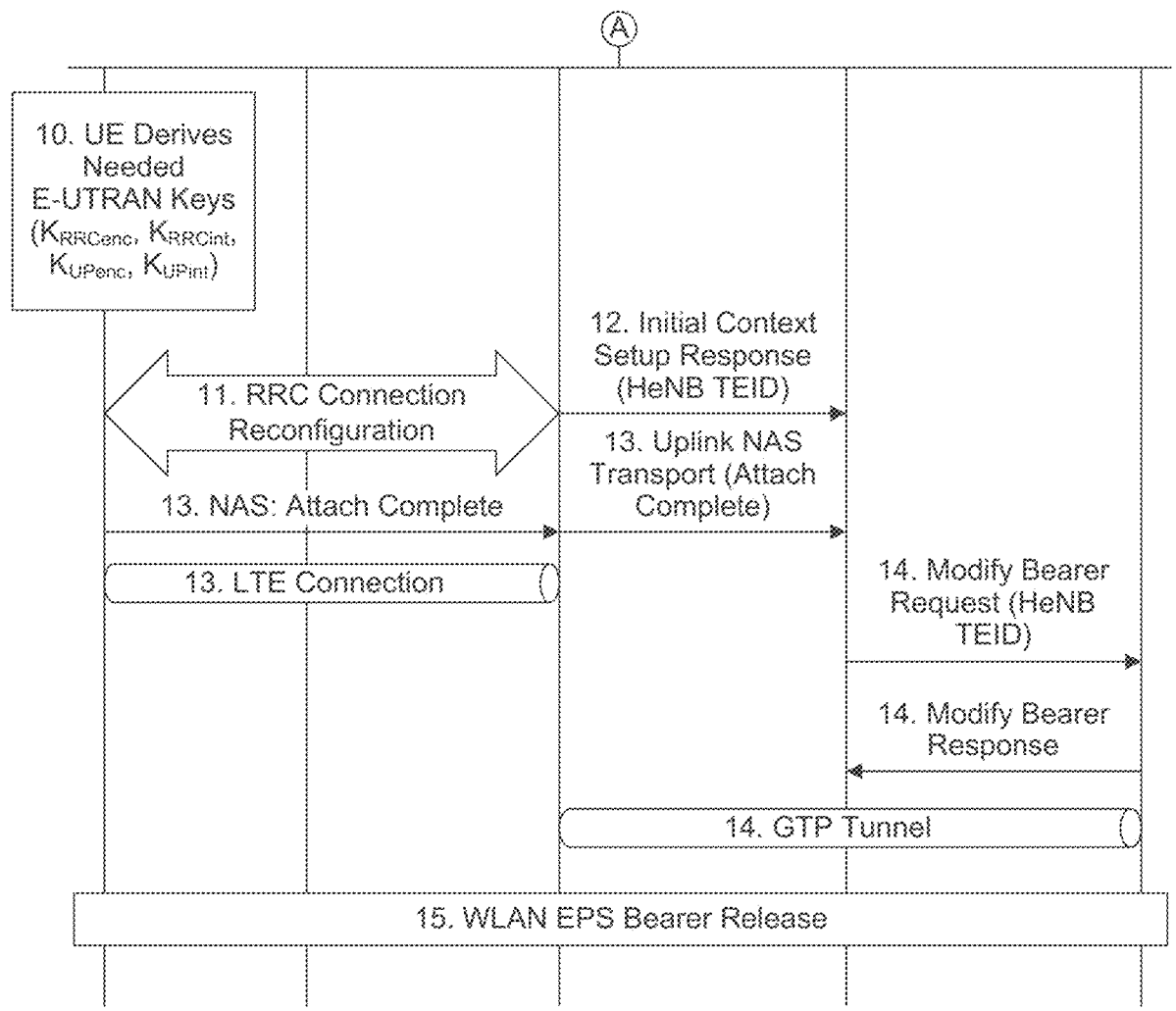

In this section, we consider the handover scenario from TWAN 218 to HeNB 220 in an ISWN 230. Initially, we assume that a unified authentication procedure has been performed to authenticate the UE 214 with TWAN 218 of an ISWN 230. Then, the UE 214 decides to make handover towards the HeNB 220 side of the ISWN. In this case, there is no need to run the full authentication procedure. Instead, a fast re-authentication procedure between the UE 214 and MME 202, which focuses on the key-regeneration only, can be performed. The HSS 210 will not be involved in the fast re-authentication procedure. FIG. 16 depicts the call flow for the fast re-authentication and handover procedures in the Intra-ISWN TWAN-to-HeNB handover scenario.

The call flow in FIG. 16 can be described as follows.

In step 0 of FIG. 16, we assume that a UE 214 has an existing connection with the TWAN 218 and the S-GW/P-GW 1002. The TWAN 218 is part of an ISWN 230. This connection was initially authenticated using the TWAN-based unified authentication/authorization procedure.

In step 1 of FIG. 16, we assume that the UE 214 decides to make handover to a HeNB 220, which is part of the previously-authenticated ISWN 230. At first, the UE 214 sends the NAS "Attach Request" (Handover) message to the HeNB 220, including a 'handover' indication.

In step 2 of FIG. 16, in response, the HeNB 220 forwards the "Attach Request" (Handover) message to the MME 202.

In step 3 of FIG. 16, once the MME 202 receives the Intra-ISWN Inter-RAT handover indication, it can run fast a re-authentication procedure. In other words, it skips steps 4-18 of FIG. 12. Then, the standard session creation procedure is conducted among the MME 202, S-GW 206, and P-GW 208 similar to step 19 in FIG. 12. The "Create Session Request" messages will include IMSI, Handover Indication, and APN. As a response and given the 'Handover' indication, the P-GW 208 re-allocates the same IP address to the UE 214. Then, the P-GW/S-GW 1002 will send the "Create Session Response" (IP address, S-GW TEDI, P-GW TEID) message back to the MME 202.

In step 4 of FIG. 16, once the handover session is created, the MME 202 increases its locally-kept NCC value by one and computes a fresh NH value using its stored $K_{ASME}$ and its locally-kept NH value (Annex A.4 of 3GPP TS 33.401). For the NAS security keys, we note that the MME 202 has already stored versions of $K_{NASenc}$ and $K_{NASint}$, which were derived in the initial unified authentication procedure (step 10 of FIG. 13).

In step 5 of FIG. 16, the MME 202 accepts the attach request by sending the "Initial Context Setup Request/Attach Accept" (NH, NCC) message to the HeNB 220.

In step 6 of FIG. 16, the HeNB 220 generates the new security key ($K_{eNB}$) using the received (NH, NCC) in addition to the target HeNB physical cell ID (PCI) and its frequency EARFCN-DL (target physical cell downlink frequency). The one generation function is described in Annex A.5 of 3GPP TS 33.401.

In step 7 of FIG. 16, once the new $K_{eNB}$ is generated, the HeNB will derive all the additional needed E-UTRAN keys, namely, ($K_{RRCenc}$, $K_{RRCint}$, $K_{UPenc}$, $K_{UPint}$) based on $K_{eNB}$.

In step 8 of FIG. 16, once the key generation process is completed at the HeNB 220, it sends "Handover Command" (NCC) message to the UE 214 carrying the new NCC value. The inclusion of the 'NCC' information element in the "Handover Command" message is mentioned in Clause 7.2.8.4.3 of 3GPP TS 33.401.

In step 9 of FIG. 16, once the UE 214 receives the NCC value, it first generates the fresh NH using its stored $K_{ASME}$ and its locally-kept NH, in a similar fashion to what the MME 202 did in step 4 of FIG. 16. Second, the UE 214 generates the $K_{eNB}$ using (NH, NCC, target PCI, frequency EARFCN-DL), similar to what the HeNB 220 did in step 6 of FIG. 16. For the NAS security keys, we note that the UE 214 has already stored versions of $K_{NASenc}$ and $K_{NASint}$, which were derived in the initial unified authentication procedure (step 16 of FIG. 13).

In step 10 of FIG. 16, finally, the UE 214 derives all the needed E-UTRAN keys ($K_{RRCenc}$, $K_{RRCint}$, $K_{UPenc}$, $K_{UPint}$) based on $K_{eNB}$, similar to what the HeNB 220 did in step of FIG. 16.

In steps 11-14 of FIG. 16, the "RRC Connection Reconfiguration", "Initial Context Setup Response", "Attach Complete", and "Modify Bearer Request/Response" messages are exchanged similar to steps 22-25 of FIG. 12. Finally, the handover procedure is completed and a new LTE connection and associated GTP tunnel are established.

In steps 15 of FIG. 16, the PDN GW 208 initiate resource allocation deactivation procedure in the TWAN 218 as defined in clause 6.12 of 3GPP TS 23.402.

Fast Re-Authentication in TWAN-to-eNB Handover Procedure

Figure 17:
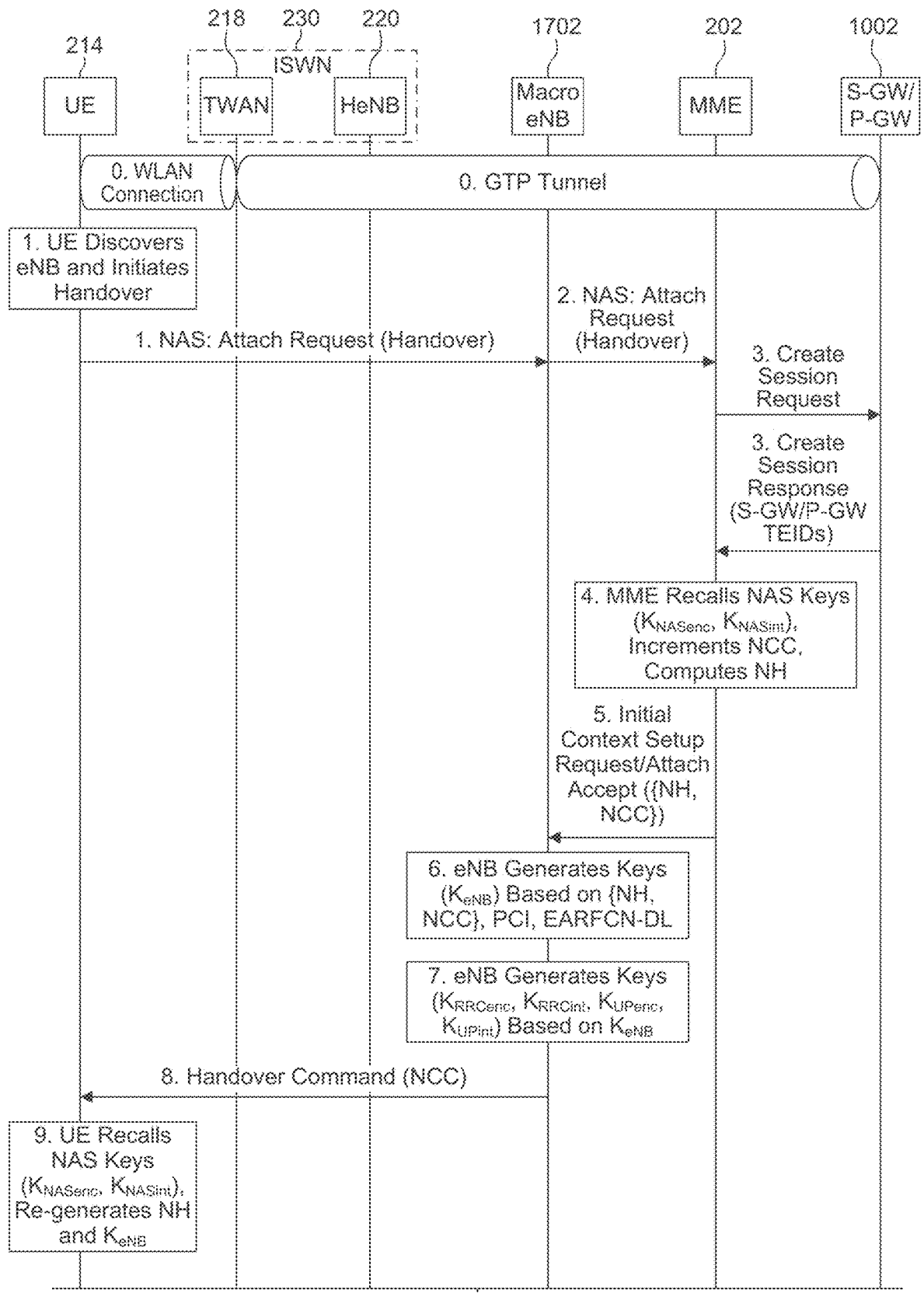
FIG. 17 is a diagram that illustrates a call flow of a TWAN-to-eNB handover with fast re-authentication procedure
Figure 17:
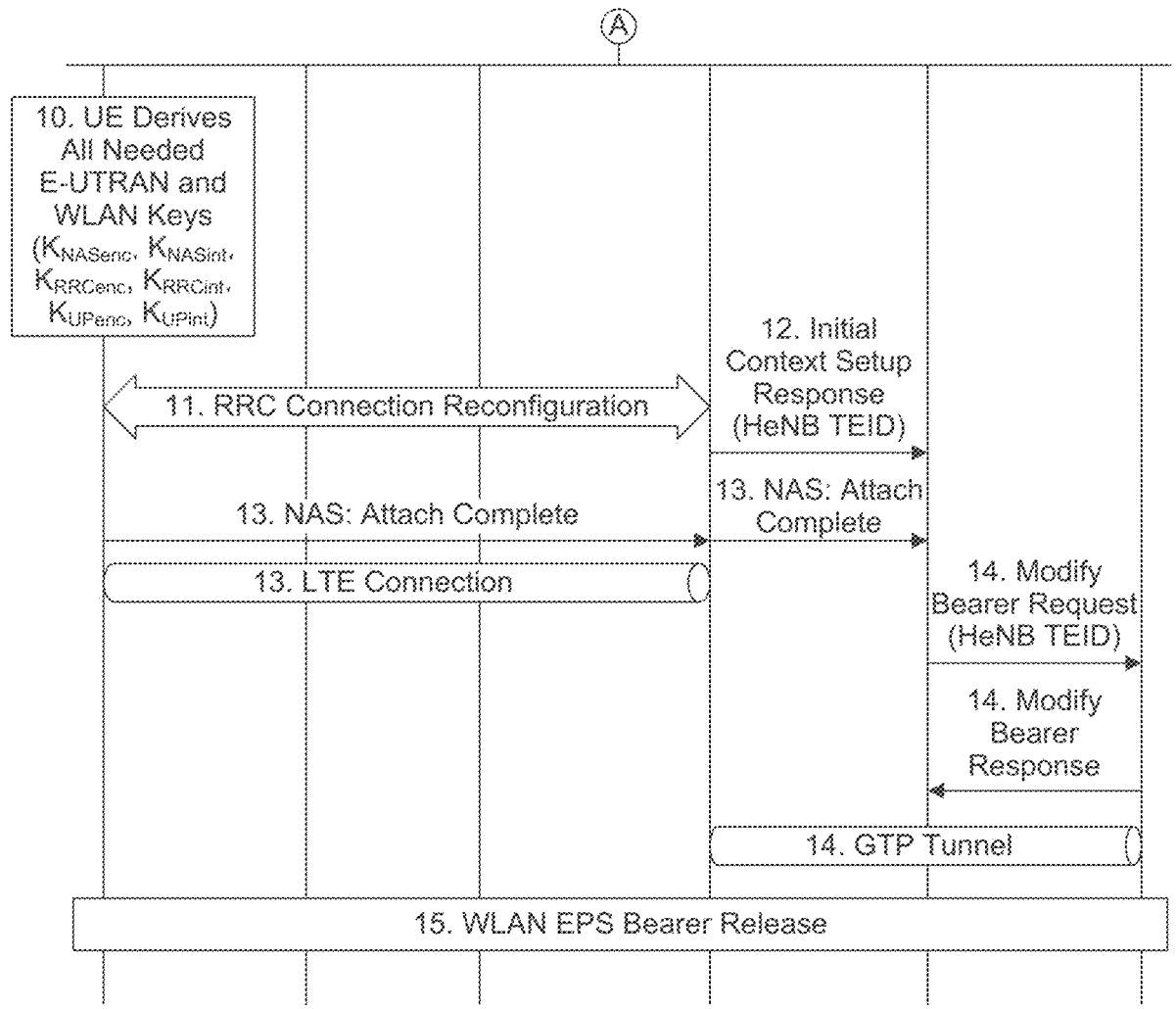

In this section, we consider a scenario in which a UE 214 goes from a TWAN 218, which is part of an ISWN 230, to a macro eNB 1702. This scenario resembles the case when a subscriber is getting out of his home or office (ISWN/TWAN) and going on the road (Macro eNB 1702). FIG. 17 depicts the call flow in this case. As shown, it is very similar to the fast re-authentication case in TWAN-to-HeNB. The details of the call flow are similar to the ones in FIG. 16, and hence there will be no need to repeat the steps again here.

Messages Extensions

In this section, we introduce the needed message and protocol extension to enable the procedures presented above.

RRC: "RRC Connection Setup Complete" Message

In Step 12 of FIG. 12, we modify the "RRC Connection Setup Complete" message to include the new 'Unified Authentication' information element. If the 'Unified Authentication' information element is set, it means that the UE 214 desires to have unified authentication procedure. Table 7 depicts the standard information elements of the "RRC Connection Setup Complete" message, in addition to the new 'Unified Authentication' information element shown in bold.

TABLE 7

"RRC Connection Setup Complete" information elements: Bold denotes new information elements

| | |
|---|---|
| RRC Transaction Identifier | 0 to 3 |
| Selected PLMN Identity | 1 to 6 |
| Registered MME | PLMN Identity |
| | MMEGI |
| | MMEC |
| Dedicated NAS Information | NAS-PDU |
| Unified Authentication | 0 or 1: |
| | 1: denotes unified authentication is needed |

S1-AP: "Initial UE Message" Message

In Step 12 of FIG. 12, we include some of the ISWN configuration parameters in the "Initial UE Message" message. Table 8 shows the standard information elements of the "Initial UE Message" message (Clause 9.1.7.1 of 3GPP TS 36.413), in addition to the new information elements, namely, 'Access Type=ISWN' and 'Access Network Identity=WLAN'.

TABLE 8

"Initial UE Message" information elements: Bold denotes new information elements

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| eNB UE S1AP ID | M | | 9.2.3.4 | | YES | reject |
| NAS-PDU | M | | 9.2.3.5 | | YES | reject |
| TAI | M | | 9.2.3.16 | Indicating the Tracking Area from which the UE has sent the NAS message. | YES | reject |
| E-UTRAN CGI | M | | 9.2.1.38 | Indicating the E-UTRAN CGI from which the UE has sent the NAS message. | YES | ignore |

TABLE 8-continued

"Initial UE Message" information elements: Bold denotes new information elements

| IE/Group Name | Presence | Range | IE type and reference | Semantics description | Criticality | Assigned Criticality |
|---|---|---|---|---|---|---|
| RRC Establishment Cause | M | | 9.2.1.3a | | YES | Ignore |
| S-TMSI | O | | 9.2.3.6 | | YES | reject |
| CSG Id | O | | 9.2.1.62 | | YES | reject |
| GUMMEI | O | | 9.2.3.9 | | YES | reject |
| Cell Access Mode | O | | 9.2.1.74 | | YES | reject |
| GW Transport Layer Address | O | | Transport Layer Address 9.2.2.1 | Indicating GW Transport Layer Address if the GW is collocated with eNB. | YES | ignore |
| Relay Node Indicator | O | | 9.2.1.79 | Indicating a relay node. | YES | reject |
| GUMMEI Type | O | | ENUMERATED (native, mapped, . . . ) | | YES | ignore |
| Tunnel Information for BBF | O | | Tunnel Information 9.2.2.3 | Indicating HeNB's Local IP Address assigned by the broadband access provider, UDP port Number. | YES | ignore |
| SIPTO L-GW Transport Layer Address | O | | Transport Layer Address 9.2.2.1 | Indicating SIPTO L-GW Transport Layer Address if the SIPTO L-GW is collocated with eNB. | YES | ignore |
| LHN ID | O | | 9.2.1.92 | | YES | ignore |
| Access Type | O | ISWN | | ISWN access type, needed for unified authentication procedure | | |
| Access Network Identity | O | WLAN | | The WLAN access network identity of the TWAN side of the ISWN | | |

NAS: "Authentication Request" Message

Figure 4:
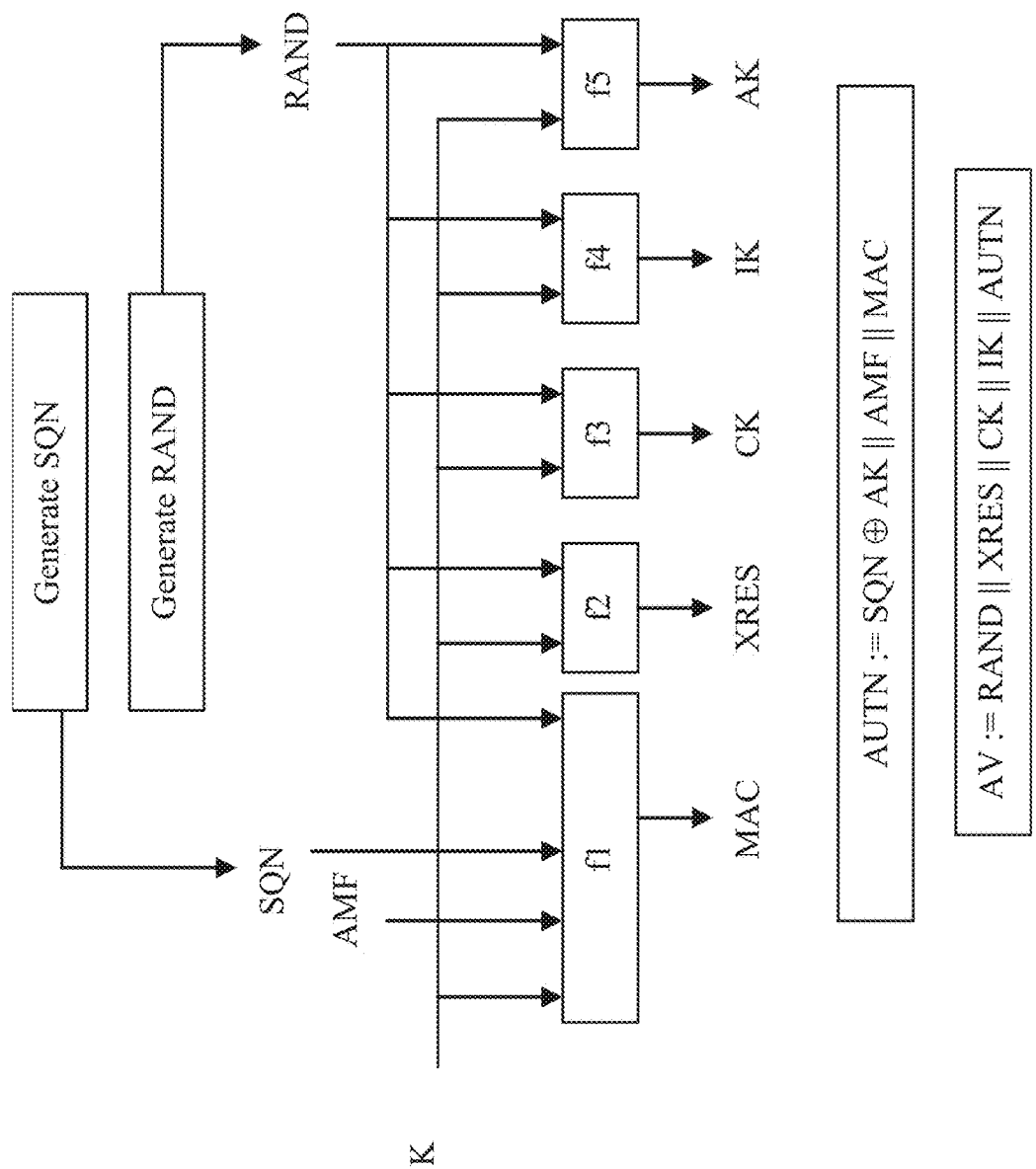
FIG. 4 is a diagram that illustrates the generation of authentication vectors.

In Steps 11 and 12 of FIG. 12, The MME 202 sends the NAS "Authentication Request" message to the ISWN 230. In addition to the authentication vectors (RAND, AUTN), the MME 202 sends two new information elements, which are 'Re-authentication ID' and 'Access Network Identity=WLAN'. The re-authentication ID will be used to identify the UE 214 in the upcoming fast re-authentication procedure for handover (e.g. step 3 of FIG. 5-4). The Access Network Identity is fed to the UE in order to utilize it in deriving the CK' and IK' keys (step 14 of FIG. 12). Table 9 depicts the standard information elements of the "Authentication Request" message (Clause 8.2.7 of 3GPP TS 24.301) along with the new Re-authentication ID' and 'Access Network Identity' information elements.

TABLE 9

"Authentication Request" message information elements: Bold denotes new information elements

| IEI | Information element | Type/Reference | Presence | Format | Length |
|---|---|---|---|---|---|
| | Protocol discriminator | Protocol discriminator 9.2 | M | V | 1/2 |
| | Security header type | Security header type 9.3.1 | M | V | 1/2 |
| | Authentication request message type | Message type 9.8 | M | V | 1 |

TABLE 9-continued

"Authentication Request" message information elements:
Bold denotes new information elements

| IEI | Information element | Type/Reference | Presence | Format | Length |
|---|---|---|---|---|---|
| | NAS key set identifier $_{ASME}$ | NAS key set identifier 9.9.3.21 | M | V | 1/2 |
| | Spare half octet | Spare half octet 9.9.2.9 | M | V | 1/2 |
| | Authentication parameter RAND (EPS challenge) | Authentication parameter RAND 9.9.3.3 | M | V | 16 |
| | Authentication parameter AUTN (EPS challenge) | Authentication parameter AUTN 9.9.3.2 | M | LV | 17 |
| | Re-authentication ID | UE's re-authentication identity, which will be used by the UE in an upcoming fast re-authentication procedure. | | | |
| | Access Network Identity | 'WLAN': Used to generate WLAN keys CK' and IK' | | | |

EAP: "EAP-Response/Identity" Message

Clause 9.2 of IETF FRC 4187 describes the "EAP-Response/Identity", which is sent by the UE to indicate its identity (Network Access Identifier). In step 3 of FIG. 13, we add a new information element, namely, 'Unified Authentication' to the "EAP-Response/Identity" message. The 'Unified Authentication' information element takes binary value (0 or 1). If the 'Unified Authentication' information element is set, it means that the UE desires to have unified authentication procedure.

Diameter-Based Messages Over the S6a Reference Point

"Authentication-Information-Request" Message

In multiple instances (e.g. step 4 of FIG. 12), the MME 202 sends the "Authentication-Information-Request" message to the HSS 210 to request the authentication vectors. The 'Access Network Identity=WLAN' information element is added in this message, so that the HSS 210 can generate keys (CK' and IK') for WLAN too. Table 10 shows the standard information elements of the Authentication-Information-Request" message (Table 5.2.3.1.1/1 of 3GPP TS 29.272) as well as the new 'Access Network Identity' information element.

TABLE 10

"Authentication Information Request" message information elements:
Bold denotes new information elements

| Information element name | Mapping to Diameter AVP | Cat. | Description |
|---|---|---|---|
| IMSI (See IETF RFC 3588 [4]) | User-Name | M | This information element shall contain the user IMSI, formatted according to 3GPP TS 23.003 [3], clause 2.2. |
| Supported Features (See TS 29.229 [9]) | Supported-Features 3GPP | O | If present, this information element shall contain the list of features supported by the origin host. |
| Requested E-UTRAN Authentication Info (See 7.3.11) | Requested-EUTRAN-Authentication-Info | C | This information element shall contain the information related to authentication requests for E-UTRAN. |
| Requested UTRAN/ GERAN Authentication Info (See 7.3.12) | Requested-UTRAN-GERAN-Authentication-Info | C | This information element shall contain the information related to authentication requests for UTRAN or GERAN. |
| Visited PLMN ID (See 7.3.9) | Visited-PLMN-ID | M | This IE shall contain the MCC and the MNC of the visited PLMN, see 3GPP TS 23.003 [3]. |
| Access Network Identity | ANID | C | 'WLAN': Used to generate WLAN keys CK' and IK' This IE shall contain the access network identifier used for key derivation at the HSS. (See 3GPP TS 24. 302 [10] for all possible values). This IE shall be present if the Authentication Method is EAP-AKA'. |

"Authentication-Information-Answer" Message

In multiple instances (e.g. step 8 of FIG. 12), the HSS 210 sends the "Authentication-Information-Answer" message to the MME 202 to convey authentication vectors and keys. The 'CK", 'IK", and 're-authentication ID' information elements are added in this message. Table 11 shows the standard information elements of the Authentication-Information-Answer" message (Table 5.2.3.1.1/2 of 3GPP TS 29.272) as well as the new information elements.

TABLE 11

"Authentication Information Answer" message information elements:
Bold denotesnew information elements.

| Information element name | Mapping to Diameter AVP | Cat. | Description |
|---|---|---|---|
| Result (See 7.4) | Result-Code/ Experimental-Result | M | This IE shall contain the result of the operation. This IE shall contain the Result-Code AVP shall be used to indicate success/errors as defined in the Diameter Base Protocol. The Experimental-Result AVP shall be used for S6a/S6d errors. This is a grouped AVP which shall contain the 3GPP Vendor ID in the Vendor-Id AVP, and the error code in the Experimental-Result-Code AVP. The following errors are applicable in this case: User Unknown Unknown EPS Subscription Authentication Data Unavailable |
| Error-Diagnostic | Error-Diagnostic | O | If the Experimental Result indicated "Unknown EPS Subscription", Error Diagnostic may be present to indicate whether or not GPRS subscription data are subscribed (i.e. whether or not Network Access Mode stored in the HSS indicates that only circuit service is allowed). |

TABLE 11-continued

"Authentication Information Answer" message information elements:
Bold denotes new information elements.

| Information element name | Mapping to Diameter AVP | Cat. | Description |
|---|---|---|---|
| Supported Features (See 3GPP TS 29.229 [9]) | Supported-Features | O | If present, this information element shall contain the list of features supported by the origin host. |
| Authentication Info (See 7.3.17) | Authentication-Info | C | This IE shall contain the Authentication Vectors. |
| Confidentiality Key AKA | Confidentiality-Key | M | This information element shall contain the confidentiality key CK'. It shall be binary encoded. |
| Integrity Key AKA Re-authentication ID | Integrity-Key | M | This information element shall contain the integrity key IK'. It shall be binary encoded. UE's re-authentication identity, which will be used by the UE in an upcoming fast re-authentication procedure. |

Diameter-Based Messages Over the New STb Reference Point

"Diameter-EAP-Request" Message

In Step 4 of FIG. 13 and FIG. 14, the message "Diameter-EAP-Request" is used over the new STb reference point between the TWAN 218 (particularly, TWAP 224) and MME 202. Furthermore, the 'Access Type=ISWN' and 'Access Network Identity=WLAN' AVPs are added to be carried from the TWAN 218 to the MME 202. The standard AVPs (Clause 3.1 of IETF RFC 4072) along with the new ones (in bold), are as follows.

```
<Diameter-EAP-Request> ::= < Diameter Header: 268, REQ, PXY >
< Session-Id >
{ Auth-Application-Id }
{ Origin-Host }
{ Origin-Realm }
{ Destination-Realm }
{ Auth-Request-Type }
[ Destination-Host ]
[ NAS-Identifier ]
[ NAS-IP-Address ]
[ NAS-IPv6-Address ]
[ NAS-Port ]
[ NAS-Port-Id ]
[ NAS-Port-Type ]
[ Origin-State-Id ]
[ Port-Limit ]
[ User-Name ]
{ EAP-Payload }
[ EAP-Key-Name ]
[ Service-Type ]
[ State ]
[ Authorization-Lifetime ]
[ Auth-Grace-Period ]
[ Auth-Session-State ]
[ Callback-Number ]
[ Called-Station-Id ]
[ Calling-Station-Id ]
[ Originating-Line-Info ]
[ Connect-Info ]
* [ Framed-Compression ]
[ Framed-Interface-Id ]
[ Framed-IP-Address ]
* [ Framed-IPv6-Prefix ]
[ Framed-IP-Netmask ]
[ Framed-MTU ]
[ Framed-Protocol ]
* [ Tunneling ]
* [ Proxy-Info ]
* [ Route-Record ]
[Access-Type = ISWN]
[Access-Network-Identity=WLAN]
* [ AVP ]
```

"Diameter-EAP-Answer" Message

In multiple instances (e.g., Step 12 of FIG. 13), the MME 202 sends "Diameter-EAP-Answer" message to the TWAN 218 over the new STb reference point. There is no need for any additional AVPs, other than the standard ones copied below from Clause 3.2 of IETF RFC 4072.

```
<Diameter-EAP-Answer> ::= < Diameter Header: 268, PXY >
< Session-Id >
{ Auth-Application-Id }
{ Auth-Request-Type }
{ Result-Code }
{ Origin-Host }
{ Origin-Realm }
[ User-Name ]
[ EAP-Payload ]
[ EAP-Reissued-Payload ]
[ EAP-Master-Session-Key ]
[ EAP-Key-Name ]
[ Multi-Round-Time-Out ]
[ Accounting-EAP-Auth-Method ]
[ Service-Type ]
* [ Class ]
* [ Configuration-Token ]
[ Acct-Interim-Interval ]
[ Error-Message ]
[ Error-Reporting-Host ]
* [ Failed-AVP ]
[ Idle-Timeout ]
[ Authorization-Lifetime ]
[ Auth-Grace-Period ]
[ Auth-Session-State ]
[ Re-Auth-Request-Type ]
[ Session-Timeout ]
[ State ]
* [ Reply-Message ]
[ Origin-State-Id ]
* [ Filter-Id ]
[ Port-Limit ]
[ Callback-Id ]
[ Callback-Number ]
[ Framed-Appletalk-Link ]
* [ Framed-Appletalk-Network ]
[ Framed-Appletalk-Zone ]
* [ Framed-Compression ]
[ Framed-Interface-Id ]
[ Framed-IP-Address ]
* [ Framed-IPv6-Prefix ]
[ Framed-IPv6-Pool ]
* [ Framed-IPv6-Route ]
[ Framed-IP-Netmask ]
* [ Framed-Route ]
[ Framed-Pool ]
[ Framed-IPX-Network ]
[ Framed-MTU ]
[ Framed-Protocol ]
[ Framed-Routing ]
* [ NAS-Filter-Rule ]
* [ QoS-Filter-Rule ]
* [ Tunneling ]
* [ Redirect-Host ]
[ Redirect-Host-Usage ]
[ Redirect-Max-Cache-Time ]
* [ Proxy-Info ]
* [ AVP ]
```

It is understood that the entities performing the steps illustrated in FIGS. 12-17 may be logical entities that may be implemented in the form of software (i.e., computer-executable instructions) stored in a memory of, and executing on a processor of, an apparatus configured for wireless and/or network communications or a computer system such as those illustrated in FIG. 21C or FIG. 21D. That is, the method(s) illustrated in FIGS. 12-17 be implemented in the form of software (i.e., computer-executable instructions) stored in a memory of an apparatus, such as the apparatus or computer system illustrated in FIG. 21C or FIG. 21D, which computer executable instructions, when executed by a processor of the apparatus, perform the steps illustrated in FIGS. 12-17. It is also understood that the functionality illustrated in FIGS. 12-17 may implemented as a set of virtualized network functions. The network functions may not necessarily communicate directly, rather, they may communicate via forwarding or routing function. It is also understood that any transmitting and receiving steps illustrated in FIGS. 12-17 may be performed by communication circuitry of the apparatus under control of the processor of the apparatus and the computer-executable instructions (e.g., software) that it executes. It is also understood that the functionality illustrated in FIGS. 12-17 may implemented as a set of virtualized network functions. The network functions may not necessarily communicate directly, rather, they may communicate via forwarding or routing function.

Figure 18:
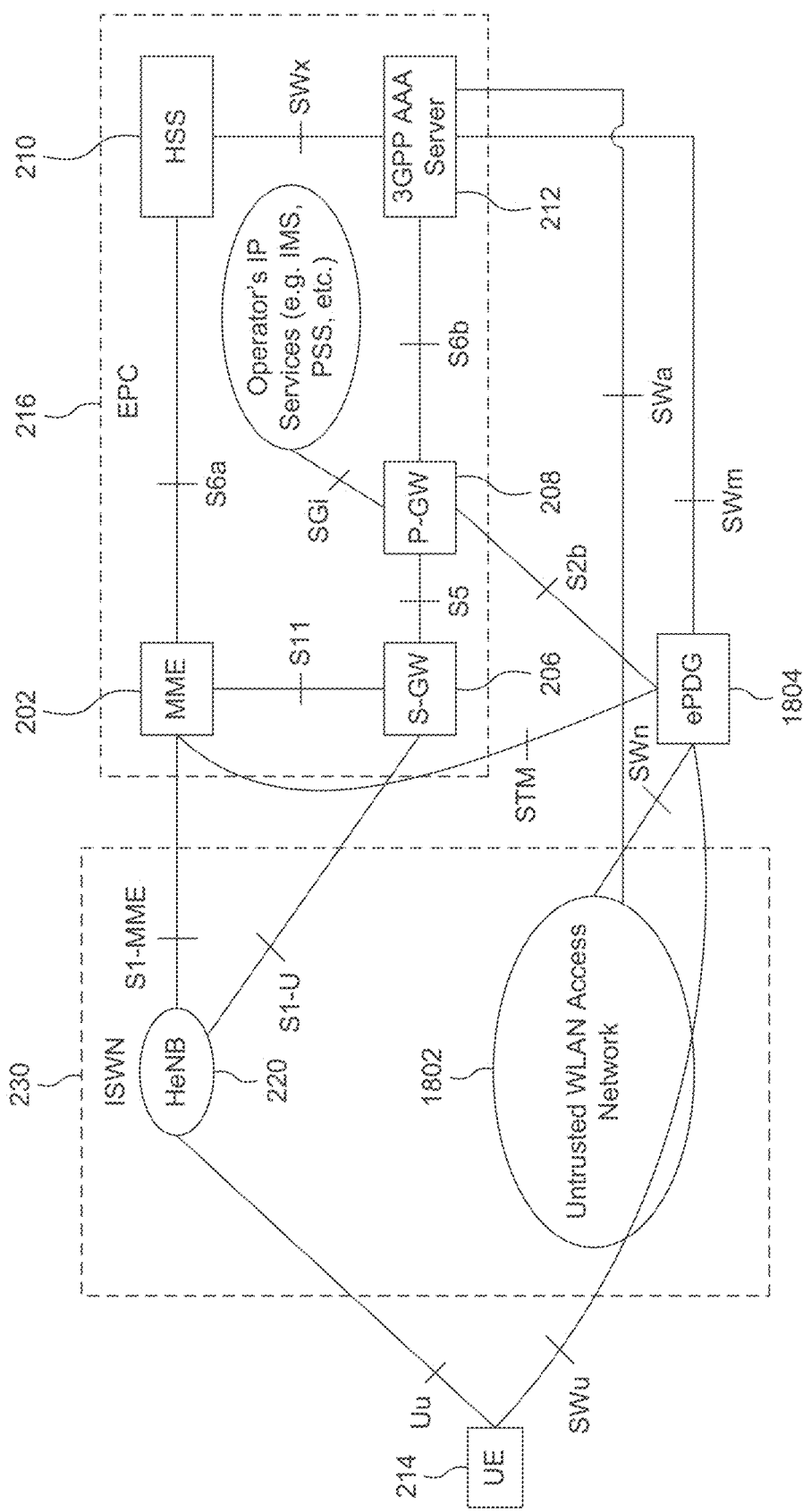
FIG. 18 is a diagram that illustrates an integrated EPC and untrusted WLAN network architecture.

FIG. 18 depicts the interworking architecture between the 3GPP and untrusted WLAN, presented in the 3GPP TS 23.402. As shown, the enhanced Packet Data Gateway (ePDG) 1804 is introduced as an intermediate entity between the UE 214 and the PDN-GW 208. On one hand, the ePDG 1804 communicates with the UE 214 through an IPSec tunnel over the SWu reference point. On the other hand, the ePDG 1804 communicates with the PDN-GW 208 over the S2b interface using GTP-U tunnel protocol.

The standard mutual authentication procedure between the UE 214 and HSS 210 in the untrusted WLAN case, described in 3GPP TS 33.402, consists of the following protocols:
1. EAP over Internet Key Exchange version 2 (IKEv2) (RFC 5996) protocol between the UE 214 and ePDG 1804 over the SWu reference point. On the contrary, we recall that the EAP protocol alone is used between the UE 214 and trusted WLAN 218 (TWAP) 224. In the untrusted WLAN 1802 case, initially the UE 214 sends EAP messages over IKEv2 to the ePDG 1804 and the standard IPSec tunnel is established between the ePDG 1804 and UE 214 using the standard IKEv2 protocol.
2. Diameter protocol between the ePDG 1804 and the 3GPP AAA Server 212 over the SWm reference point. More precisely, the ePDG extracts the EAP messages from IKEv2 messages sent by the UE 214, and forward them to the 3GPP AAA Server 212.
3. Diameter protocol between the 3GPP AAA Server 212 and the HSS 210 over the SWx. Such step is exactly similar to what happens in the trusted WLAN case, previously discussed.

The main authentication-related difference between the untrusted and trusted WLAN cases is the usage of IKEv2 protocol (UE-ePDG) to carry the EAP messages for the untrusted case. Equally important, we note the similarity of roles between step 2 above (ePDG-3GPP AAA Server 212 for the untrusted WLAN case) and the (TWAP-3GPP AAA Server 212) communication over STa for the trusted WLAN case, which was explained in details in FIG. 9 and FIG. 10. In particular, the same EAP messages are conveyed over the two reference points (SWm, STa).

Therefore, the interworking architecture for the untrusted WLAN case can be enhanced by adding a new reference point (namely STm in FIG. 18) between the ePDG 1804 and the MME 202. The new reference point STm will carry the EAP messages between the ePDG 1804 and MME 202, similar to the STb reference point (carrying EAP messages between TWAP 224 and MME 202).

It is understood that the functionality illustrated in FIG. 18, may be implemented in the form of software (i.e., computer-executable instructions) stored in a memory of, and executing on a processor of, a wireless device or other apparatus (e.g., a server, gateway, device, or other computer system), such as one of those illustrated in FIG. 21C or 21D described below. It is also understood that the functionality illustrated in FIG. 18 may implemented as a set of virtualized network functions. The network functions may not necessarily communicate directly, rather, they may communicate via forwarding or routing function. It is also understood that the functionality illustrated in FIG. 18 may implemented as a set of virtualized network functions. The network functions may not necessarily communicate directly, rather, they may communicate via forwarding or routing function.

Figure 19:
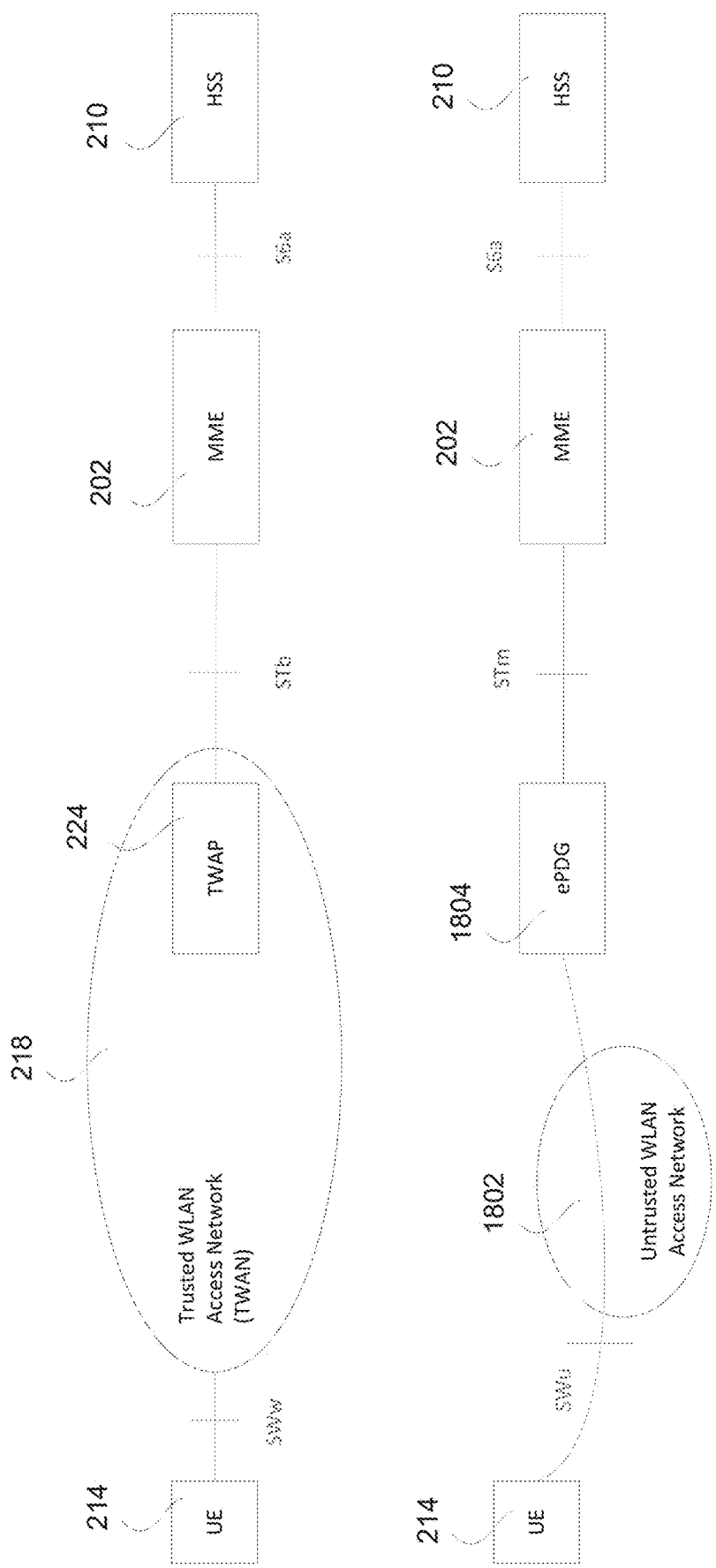
FIG. 19 is a diagram that illustrates an UE-HSS path in the untrusted WLAN (lower) and trusted WLAN (upper) scenarios.

FIG. 19 shows the path between the UE 214 and HSS 210 in the trusted and untrusted WLAN scenarios. As shown, the STb and STm reference points are analogous to each other. Accordingly, it will be straightforward to extend the unified authentication and fast re-authentication procedures, to the untrusted WLAN scenario as follows.
1. Carrying the modified EAP messages, defined previously between the UE 214 and TWAP 224 in FIG. 13 and FIG. 14, over the standard IKEv2 protocol between the UE 214 and ePDG 1804. The usage of the standard IKEv2 protocol will not be changed and will be the same as used in 3GPP TS 33.402.
2. The "Diameter-EAP-Request" and "Diameter-EAP-Answer" messages introduced over the STb reference point (TWAP-MME) will be exactly used over the STm reference point (ePDG-MME). They will be carrying the same EAP messages extracted from the ePDG or HSS.

It is understood that the functionality illustrated in FIG. 19, may be implemented in the form of software (i.e., computer-executable instructions) stored in a memory of, and executing on a processor of, a wireless device or other apparatus (e.g., a server, gateway, device, or other computer system), such as one of those illustrated in FIG. 21C or 21D described below. It is also understood that the functionality illustrated in FIG. 19 may implemented as a set of virtualized network functions. The network functions may not necessarily communicate directly, rather, they may communicate via forwarding or routing function. It is also understood that the functionality illustrated in FIG. 18 may implemented as a set of virtualized network functions. The network functions may not necessarily communicate directly, rather, they may communicate via forwarding or routing function.

User Interfaces

Interfaces, such as Graphical User Interfaces (GUIs), can be used to assist user to control and/or configure functionalities related to the unified authentication. A Graphical User Interface (GUI) can allow the UE 214 to decide which access network (LTE or Wi-Fi) to utilize (during initial attachment and handover), and whether to use the unified authentication procedure or not.

Figure 20:
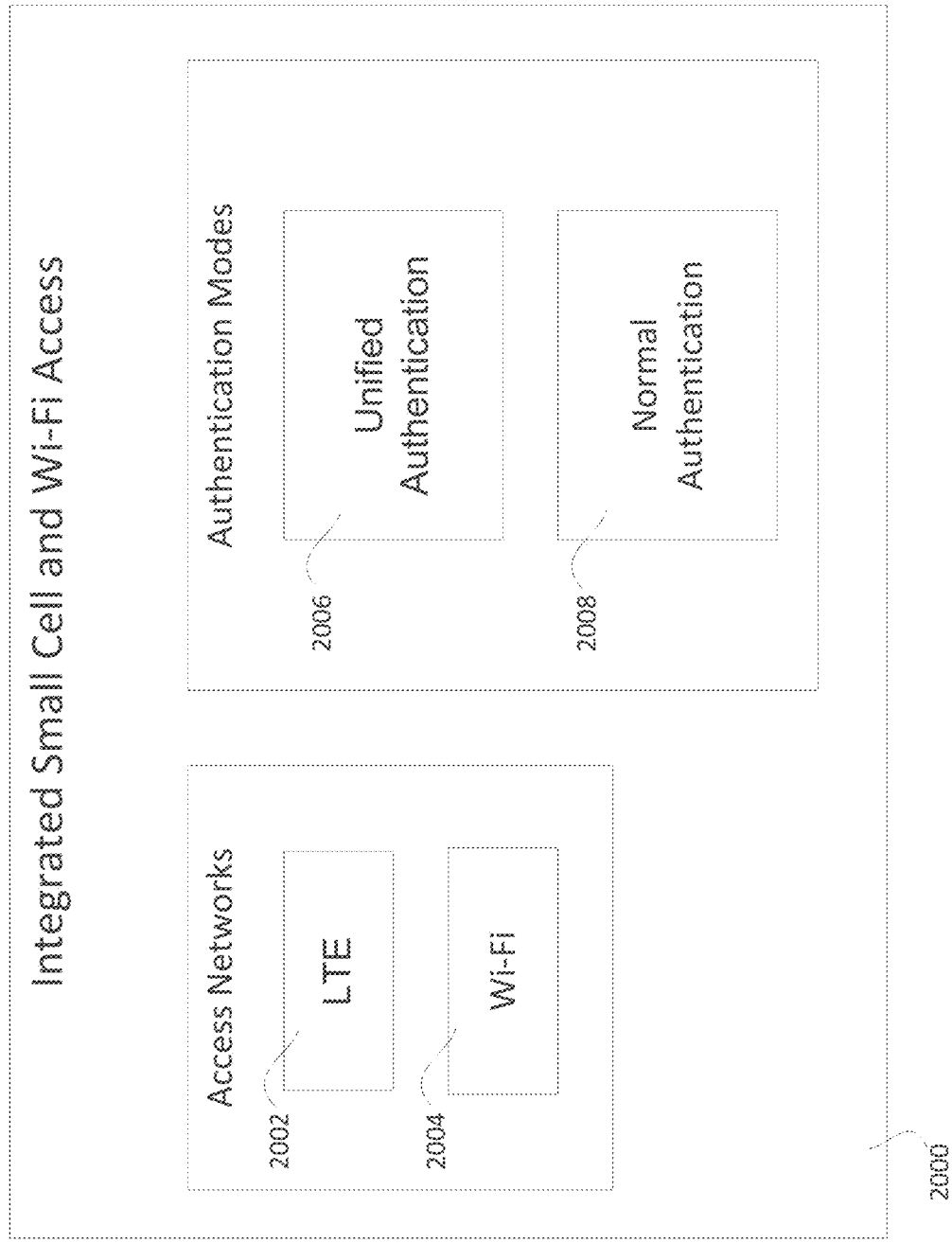
FIG. 20 is a diagram that illustrates an exemplary graphical user interface for use with embodiments of the present invention.

FIG. 20 depicts a Graphical User Interface (GUI) 2000, which first enables a user with the multi-RAT (LTE/Wi-Fi) UE 204 to choose to connect to either LTE (bottom 2002) or Wi-Fi (bottom 2004) (at initial attachment or handover). If one access network is not available, then its button can be disabled. The "Unified Authentication" flag has been added (step 2 in FIG. 12 and step 3 in FIG. 13) such that the UE can indicate its desire, to the HeNB 220 or TWAN 218, to perform the unified authentication procedure. Such UE's 214 decision can be determined using the GUI 2000, shown in FIG. 20. So for example the HeNB-initiated unified authentication/attachment procedure will be executed once the UE 214 chooses the 'LTE' bottom 2002 and 'Unified Authentication' button 2006 at initial attachment. Similarly, the TWAN-initiated unified authentication/attachment procedure will be implemented once the UE 214 clicks the 'Wi-Fi' button 2004 and 'Unified Authentication' button 2006 of the GUI 2000 at initial attachment. Alternately, the normal authentication button 2008 can be selected. It is to be understood that interface 2000 can be produced using displays such as those shown in FIGS. 21C-D described below.

Example M2M/IoT/WoT Communication System

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

The term "service layer" refers to a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a-service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

FIG. 21A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc. Communication system 10 can be used to implement functionality of the disclosed embodiments and can include functionality and logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20.

As shown in FIG. 21A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 21A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g. cellular and non-cellular) as well as fixed network M2M devices (e.g., PLC) to communicate either through operator networks, such as the communication network 12 or direct radio link. For example, the M2M terminal devices 18 may collect data and send the data, via the communication network 12 or direct radio link, to an M2M application 20 or other M2M devices 18. The M2M terminal devices 18 may also receive data from the M2M application 20 or an M2M terminal device 18. Further, data and signals may be sent to and received from the M2M application 20 via an M2M service layer 22, as described below. M2M terminal devices 18 and gateways 14 may communicate via various networks including, cellular, WLAN, WPAN (e.g., Zigbee, 6LoWPAN, Bluetooth), direct radio link, and wireline for example.

Exemplary M2M terminal devices 18 include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Referring to FIG. 21B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include functionality and logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20.

The M2M service layer 22 may be implemented by one or more servers, computers, devices, virtual machines (e.g. cloud/storage farms, etc.) or the like, including for example the devices illustrated in FIGS. 21C and 21D described below. It will be understood that the M2M service layer 22 may communicate with any number of M2M applications, M2M gateways 14, M2M terminal devices 18, and communication networks 12 as desired. The M2M service layer 22 may be implemented by one or more nodes of the network, which may comprises servers, computers, devices, or the like. The M2M service layer 22 provides service capabilities that apply to M2M terminal devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12 in the infrastructure domain. M2M service layer 22' also provides services for the M2M gateways 14 and M2M terminal devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 21B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through networks 12 in connection with the services that the service layers 22 and 22' provide.

The methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and oneM2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may be used in conjunction with the disclosed systems and methods. The M2M applications 20 and 20' may include the applications that interact with the UE or gateway and may also be used in conjunction with other disclosed systems and methods.

In one embodiment, the logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20 may be hosted within a M2M service layer instance hosted by an M2M node, such as an M2M server, M2M gateway, or M2M device, as shown in FIG. 21B. For example, the logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20 may comprise an individual service capability within the M2M service layer instance or as a sub-function within an existing service capability.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 21C or FIG. 21D described below.

Further, logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20 can implemented as part of an M2M network that uses a Service Oriented Architecture (SOA) and/or a Resource-Oriented Architecture (ROA) to access services of the present application.

FIG. 21C is a block diagram of an example hardware/software architecture of a M2M network node 30, such as an M2M device 18, an M2M gateway 14, an M2M server, or the like. The node 30 can execute or include logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20.

The device 30 can be part of an M2M network as shown in FIG. 21A-B or part of a non-M2M network. As shown in FIG. 21C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 21C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 21C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. The current disclosure defines a RESTful user/application API in the oneM2M embodiment. A graphical user interface, which may be shown on the display, may be layered on top of the API to allow a user to interactively establish and manage an E2E session, or the migration or sharing thereof, via the underlying service layer session functionality described herein.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., figure print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52. Alternately, the node 30 may comprise apparatuses or devices, such as a sensor, consumer electronics, a wearable device such as a smart watch or smart clothing, a medical or eHealth device, a robot, industrial equipment, a drone, a vehicle such as a car, truck, train, or airplane.

FIG. 21D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Computing system 90 can execute or include logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20.

Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIG. 21A and FIG. 21B, to enable the computing system 90 to communicate with other nodes of the network.

User equipment (UE) can be any device used by an end-user to communicate. It can be a hand-held telephone, a laptop computer equipped with a mobile broadband adapter, or any other device. For example, the UE can be implemented as the M2M terminal device 18 of FIGS. 21A-B or the device 30 of FIG. 21C.

It is understood that any or all of the systems, methods, and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities such as MME 202, WLAN AN 204, S-GW 206, P-GW 208, HSS 210, 3GPP AAA server 212, UE 214, EPC 216, TWAN 218, HeNB 220, TWAP 224, ISWN 230, TWAG 232, S-GwIP-GW 1002, Macro eNB 1702, untrusted WLAN 1802, and ePDG 1804 and logical entities to produce user interface 2000 shown in FIG. 20 may be embodied in the form of the computer executable instructions stored on a computer-readable storage medium. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. An apparatus, comprising:
a processor; and
a memory coupled with the processor, wherein the memory is configured to store executable instructions that when executed by the processor cause the processor to:
connect with a network through a first access point that uses a first radio access technology, wherein upon a connection with the network through the first access point, the apparatus is configured to perform a full authentication; and
thereafter, switch to a connection with the network through a second access point that uses a second radio access technology, wherein
the first access point and the second access point are configured with a plurality of configuration parameters related to an Integrated Small Cell and Wi-Fi Network (ISWN) in which the first access point and second access point are integrated,
the plurality of configuration parameters includes at least an access type that indicates integration with the ISWN,
upon the connection with the network through the second access point, the apparatus is configured to perform a fast authentication,
based on the indication of the integration with the ISWN, the fast authentication does not perform at least one authentication step performed in the full authentication,
in the full authentication, the apparatus is configured to interact with an authentication center, in the fast authentication, the apparatus does not interact with the authentication center, and
one of the first access point or the second access point is a Wi-Fi access point and another of the first access point or the second access point is a cellular access point,
wherein in both the fast authentication and the full authentication, both the first access point and the second access point interact with a Mobility Management Entity (MME).

2. The apparatus of claim 1, wherein the Wi-Fi access point is for one of a trusted wireless local area network (WLAN) or an untrusted wireless local area network (WLAN).

3. The apparatus of claim 1, wherein the cellular access point is for an eNodeB.

4. The apparatus of claim 1, wherein a request from the apparatus to connect with the first access point includes information that indicates a need to perform authentication for both the first access point and the second access point.

5. The apparatus of claim 1, wherein
the processor is further configured to control reception of a re-authentication identifier (ID) over the first access point, and
the re-authentication ID is provided to the second access point during the fast authentication.

6. The apparatus of claim 1, wherein the apparatus is a user equipment.

7. An apparatus, comprising:
a processor; and
a memory coupled with the processor, wherein the memory is configured to store executable instructions that when executed by the processor cause the processor to:
upon a connection with user equipment through one of a first access point that uses a first radio access technology or a second access point that uses a second radio access technology, perform a full authentication with the user equipment, wherein
the first access point and the second access point are configured with a plurality of configuration parameters related to an Integrated Small Cell and Wi-Fi Network (ISW N) in which the first access point and second access point are integrated, and the plurality of configuration parameters includes at least an access type that indicates integration with the ISWN; and thereafter, upon switching to a connection through another of the first access point or the second access point, perform a fast authentication, wherein based on the indication of the integration with the ISWN, the fast authentication does not require a mutual authentication step between the apparatus and the user equipment, in the full authentication, the apparatus is configured to interact with an authentication center, in the fast authentication, the apparatus does not interact with the authentication center, and one of the first access point or the second access point is a Wi-Fi access point and another of the first access point or the second access point is a cellular access point, wherein in both the fast authentication and the full authentication, both the first access point and the second access point interact with a Mobility Management Entity (MME).

8. The apparatus of claim 7, wherein the processor is further configured to perform mobile management functions.

9. The apparatus of claim 7, wherein the processor is further configured to provide, in the full authentication, the user equipment with at least one of a re-authentication-ID or an access network identity.

10. The apparatus of claim 7, wherein based on the indication of the integration with the ISWN, the apparatus does not run an Authentication and Key Agreement (AKA) in the fast authentication.

11. The apparatus of claim 7, wherein one of the first access point or the second access point is the Wi-Fi access point; and wherein the processor is further configured to use an interface to connect with the Wi-Fi access point.

12. The apparatus of claim 11, wherein the Wi-Fi access point is connected with a virtualized Network Function via the interface.

13. A method, comprising:

connecting, by an apparatus, to a network through a first access point that uses a first radio access technology, wherein upon a connection with the network through the first access point, the apparatus is configured to perform a full authentication; and thereafter, switching to a connection with the network through a second access point that uses a second radio access technology, wherein the first access point and the second access point are configured with a plurality of configuration parameters related to an Integrated Small Cell and WiFi Network (ISW N) in which the first access point and second access point are integrated, the plurality of configuration parameters includes at least an access type that indicates integration with the ISWN, upon the connection with the network through the second access point, the apparatus is configured to perform a fast authentication, based on the indication of the integration with the ISWN, the fast authentication does not perform at least one authentication step performed in the full authentication, in the full authentication, the apparatus is configured to interact with an authentication center, in the fast authentication, the apparatus does not interact with the authentication center, and one of the first access point or the second access point is a Wi-Fi access point and another of the first access point or the second access point is a cellular access point, wherein in both the fast authentication and the full authentication, both the first access point and the second access point interact with a Mobility Management Entity (MME).

14. The method of claim 13, wherein the apparatus is a user equipment.

15. The method of claim 13, wherein a re-authentication identifier (ID) is provided to the apparatus over the first access point, and the re-authentication ID is provided to the second access point during the fast authentication.

16. The method of claim 13, wherein a request from the apparatus to connect with the first access point includes information that indicates a need to perform authentication for both the first access point and the second access point.

17. A method, comprising:

upon a connection with user equipment through one of a first access point that uses a first radio access technology or a second access point that uses a second radio access technology, performing a full authentication with the user equipment, wherein the first access point and the second access point are configured with a plurality of configuration parameters related to an Integrated Small Cell and Wi-Fi Network (ISWN) in which the first access point and second access point are integrated, and the plurality of configuration parameters includes at least an access type that indicates integration with the ISWN; and thereafter, upon switching to a connection through another of the first access point or the second access point, performing a fast authentication, wherein based on the indication of the integration with the ISWN, the fast authentication does not require a mutual authentication step between an apparatus and the user equipment, in the full authentication, the apparatus is configured to interact with an authentication center, in the fast authentication, the apparatus does not interact with the authentication center, and one of the first access point or the second access point is a Wi-Fi access point and another of the first access point or the second access point is a cellular access point, wherein in both the fast authentication and the full authentication, both the first access point and the second access point interact with a Mobility Management Entity (MME).

18. The method of claim 17, wherein, in the full authentication, the apparatus provides the user equipment with at least one of a re-authentication-ID or an access network identity.

19. The method of claim 17, wherein based on the indication of the integration with the ISWN, the apparatus does not run an Authentication and Key Agreement (AKA) in the fast authentication.

* * * * *